United States Patent [19]

Hori et al.

[11] Patent Number: 5,455,603
[45] Date of Patent: Oct. 3, 1995

[54] IMAGE FORMING APPARATUS WITH FEEDER CONTROL BASED ON PIXEL CONVERSION STATUS

[75] Inventors: Kenjiro Hori; Satoshi Akiyama, both of Yokohama; Takashi Nakahara, Kawasaki; Toshio Yoshimoto, Tokyo; Yoshimi Kuramochi, Yokohama; Shunichi Masuda, Kawasaki; Makoto Takeuchi, Yokohama; Hiroshi Hashimoto, Tokyo; Akio Noguchi, Ebina; Takahiro Inoue; Masahiro Goto, both of Yokohama; Junichi Kato, Sagamihara; Koichi Hiroshima, Yokohama; Shinichi Tsukida, Okegawa; Koichi Suwa; Hideyuki Yano, both of Yokohama, all of Japan

[73] Assignee: Canon Kabushiki Kaisha, Tokyo, Japan

[21] Appl. No.: 227,695

[22] Filed: Apr. 14, 1994

Related U.S. Application Data

[63] Continuation of Ser. No. 998,770, Dec. 29, 1992, abandoned, which is a continuation of Ser. No. 558,322, Jul. 26, 1990, abandoned.

[30] Foreign Application Priority Data

| Jul. 28, 1989 | [JP] | Japan | 1-195626 |
| Sep. 11, 1989 | [JP] | Japan | 1-236313 |
| Sep. 25, 1989 | [JP] | Japan | 1-250251 |
| Oct. 17, 1989 | [JP] | Japan | 1-271058 |

[51] Int. Cl.$^6$ .............. G03G 15/00; H04N 1/00
[52] U.S. Cl. .............. 346/134; 347/139; 358/300; 395/111
[58] Field of Search ............... 355/317, 274, 355/277; 346/134, 160; 358/296, 300; 395/111; 347/139, 153

[56] References Cited

U.S. PATENT DOCUMENTS

| 4,264,188 | 4/1981 | Tomosada et al. | 355/14 R |
| 4,611,903 | 9/1986 | Fukushi | 355/14 R |
| 4,851,960 | 7/1989 | Nakamura et al. | 361/225 |
| 4,866,595 | 9/1989 | Shimiza | 346/154 |
| 4,933,772 | 6/1990 | Ikenoue et al. | 358/300 |
| 4,941,108 | 7/1990 | Aoyagi et al. | 395/275 |
| 4,958,199 | 9/1990 | Yamashita et al. | 355/317 |
| 4,991,972 | 2/1991 | Ikenoue et al. | 364/519 |
| 4,992,882 | 2/1991 | Ikenoue et al. | 358/300 |
| 5,001,567 | 3/1991 | Atobe | 358/300 |

OTHER PUBLICATIONS

Patent Abstracts of Japan, vol. 13, No. 449 (M-878), Oct. 9, 1989 Japanese Patent Application 1-174453, Jul. 11, 1989.

Patent Abstracts of Japan, vol. 11, No. 284 (E-540), Sep. 12, 1987, Japanese Patent Application Nos. 62-082765, 62-082766, 62-082767, 62-082768, Apr. 16, 1987.

*Primary Examiner*—Joan H. Pendegrass
*Attorney, Agent, or Firm*—Fitzpatrick, Cella, Harper & Scinto

[57] ABSTRACT

An image forming apparatus comprises a data receiver for receiving encoded character or graphic information in the unit of a page from the outside; a pixel converter for converting the encoded character or graphic information into pixel information; an image forming device for forming an image on a recording medium based on the pixel information; and a feeder for feeding the recording medium to said image forming device. In the apparatus, the feeder is adapted to feed the recording medium to a predetermined position prior to the completion of pixel conversion of a page by the pixel converter.

50 Claims, 42 Drawing Sheets

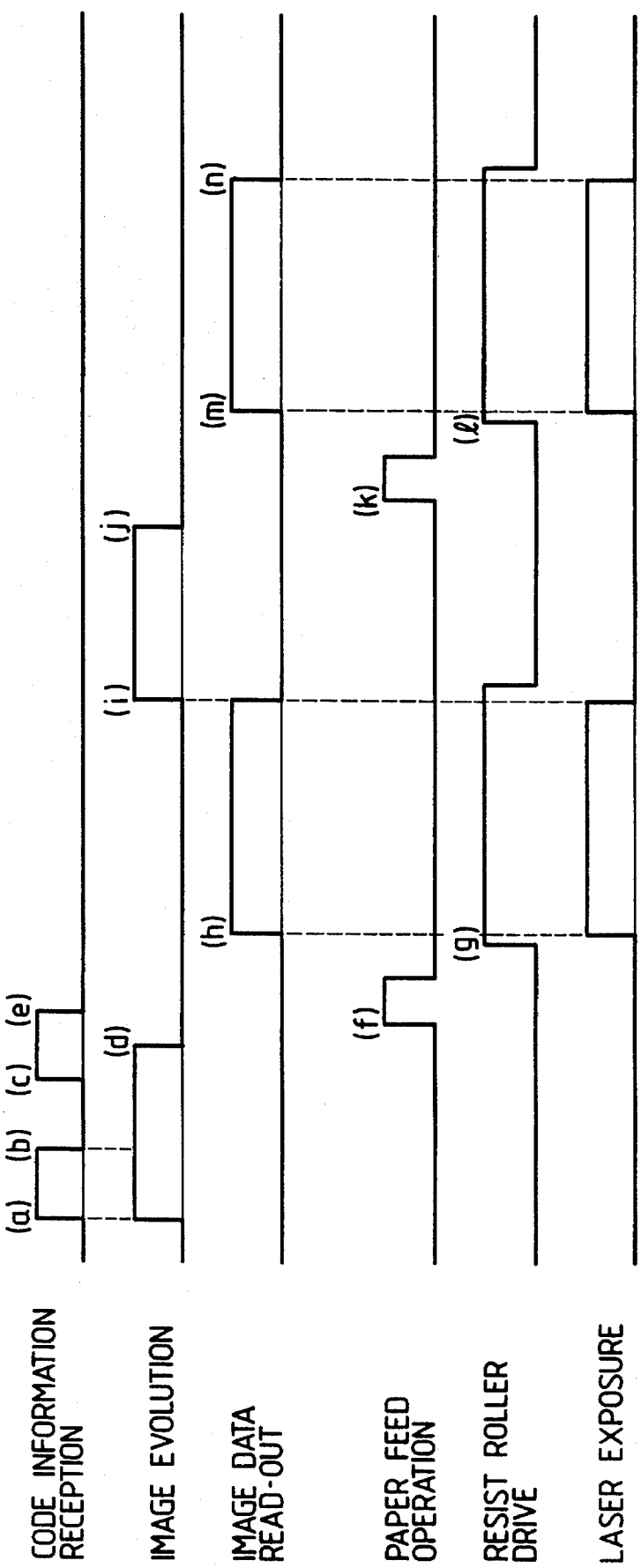

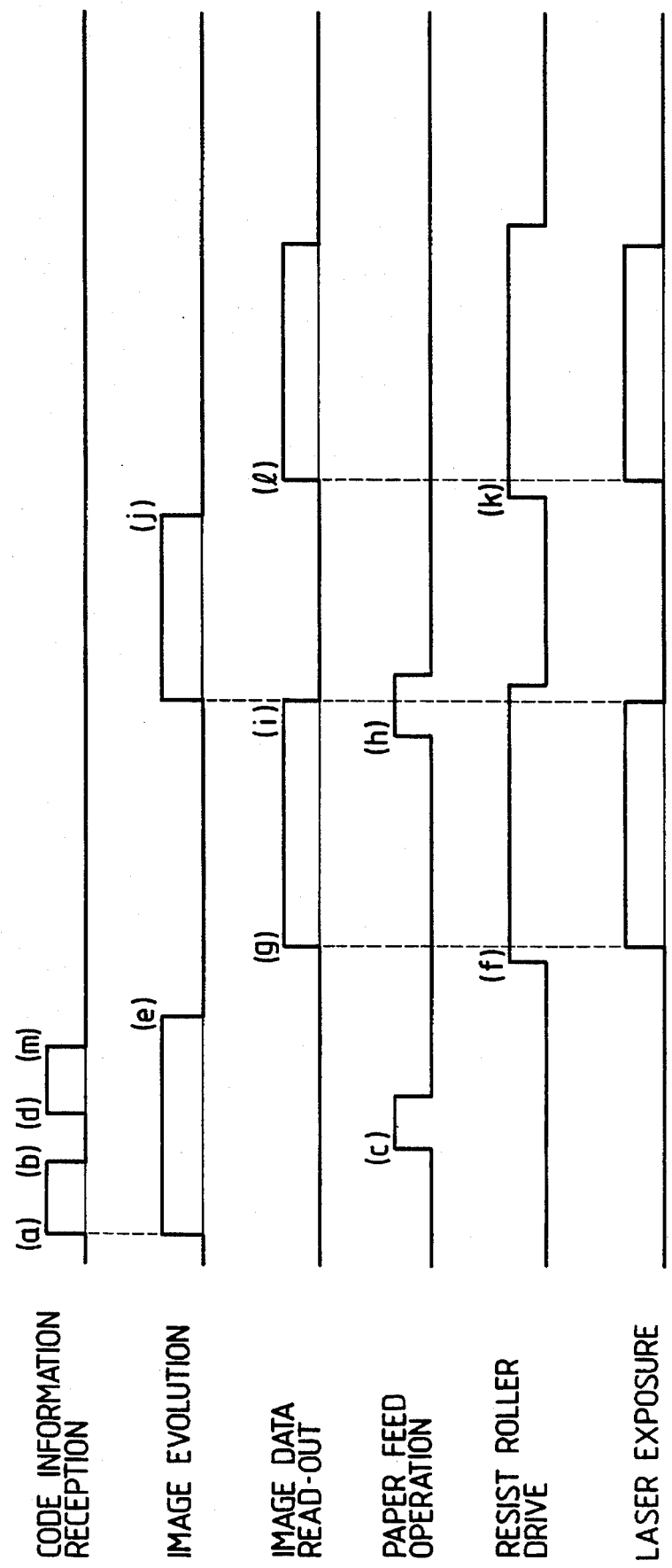

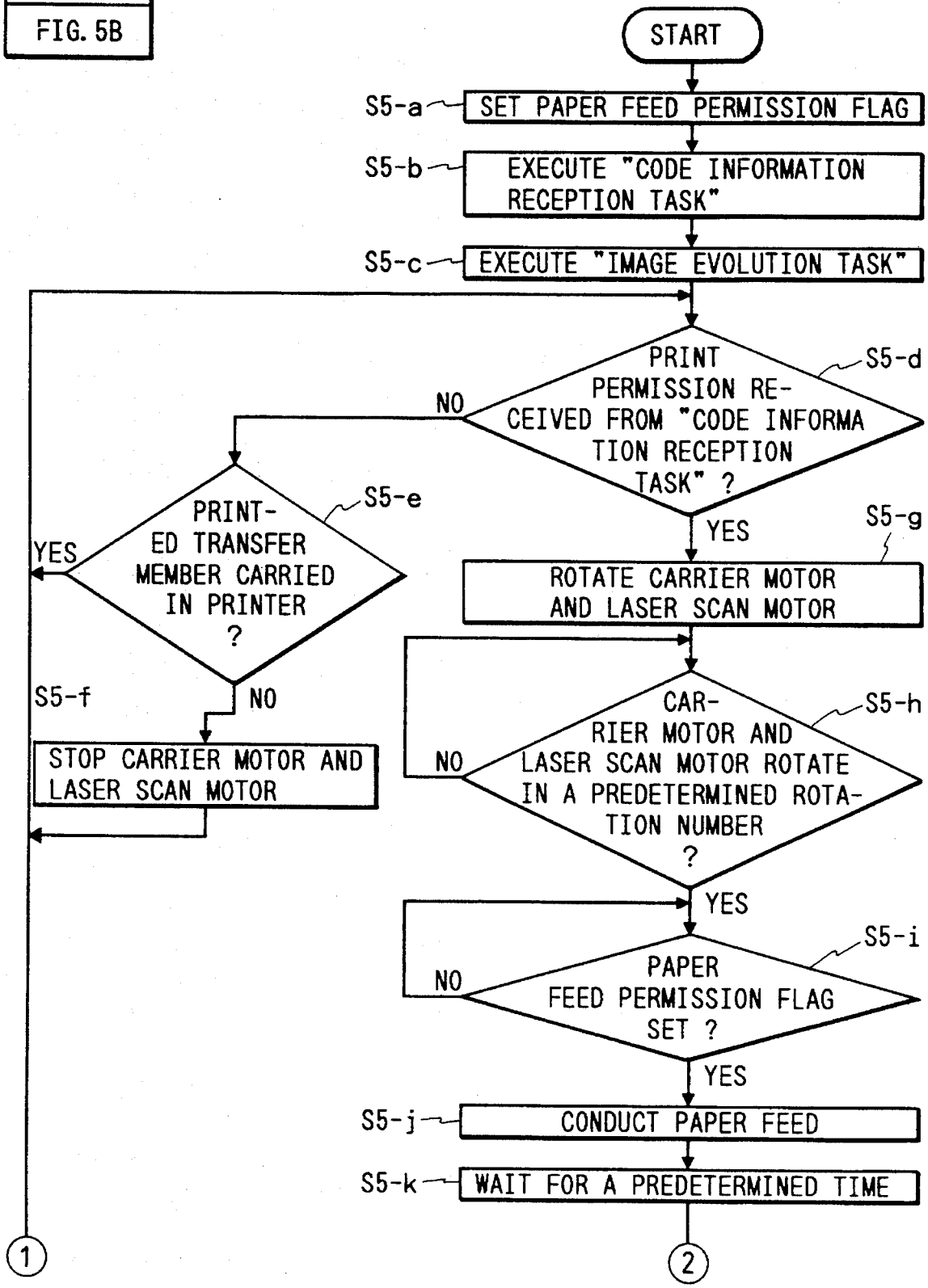

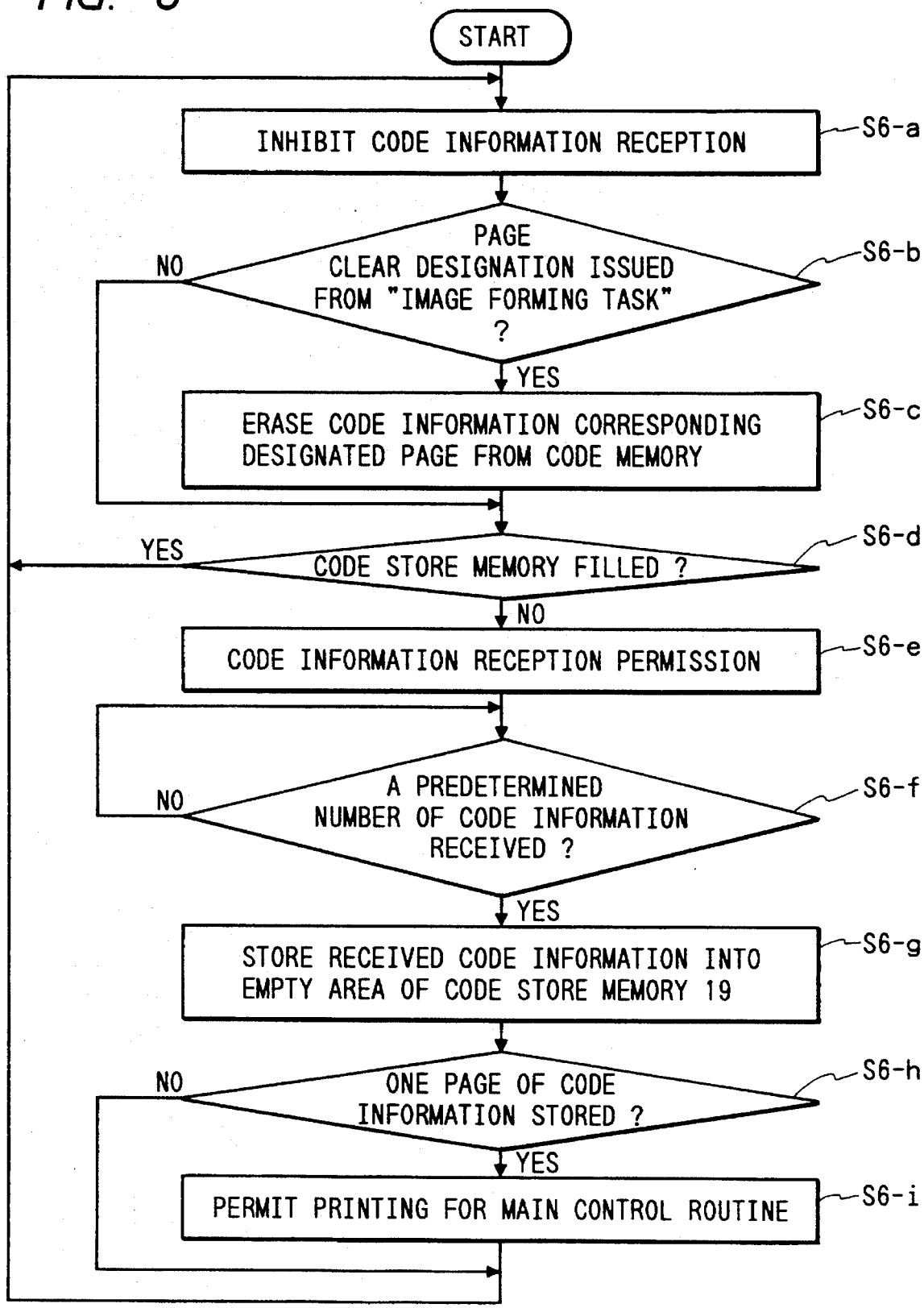
FIG. 6 CODE INFORMATION RECEPTION TASK

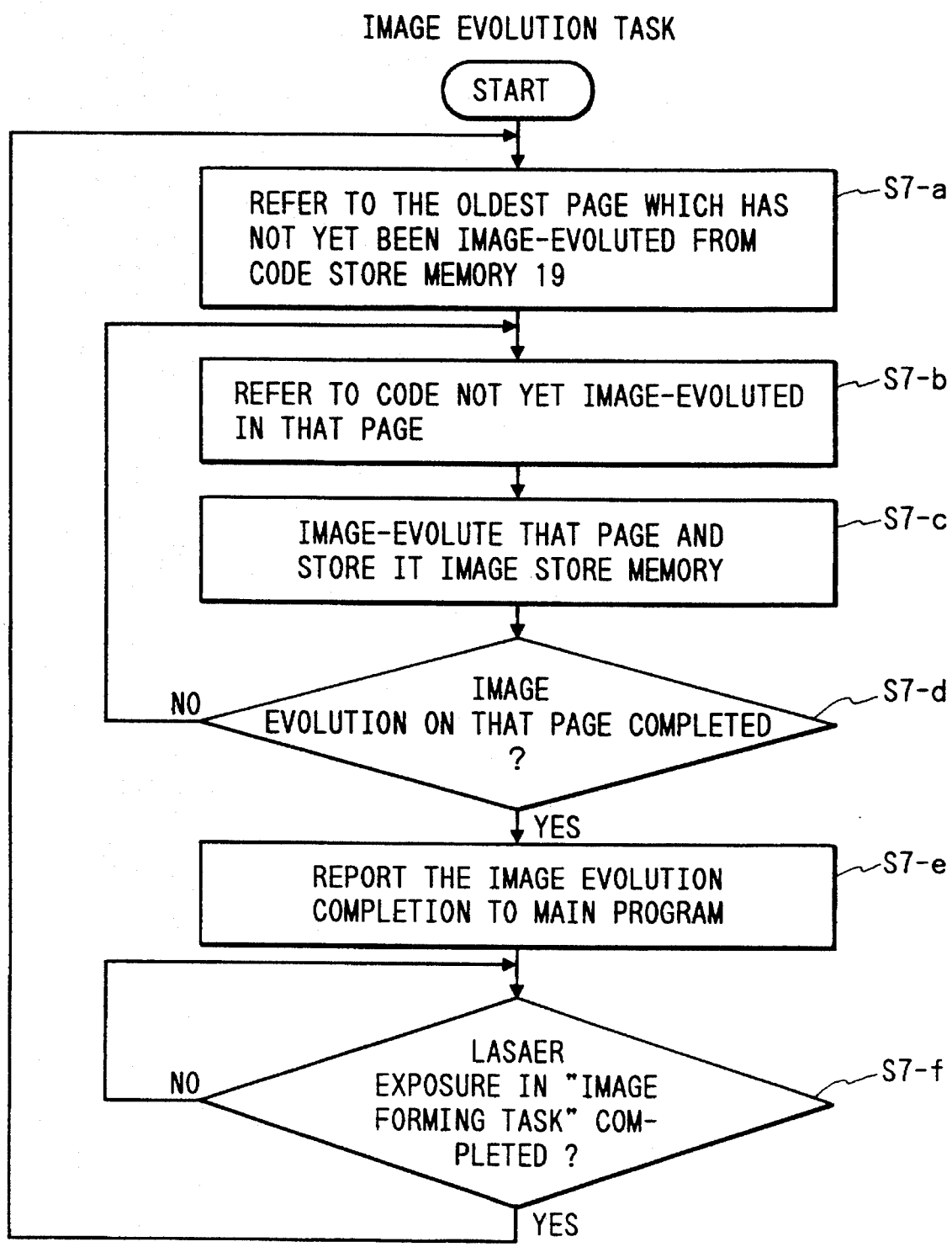

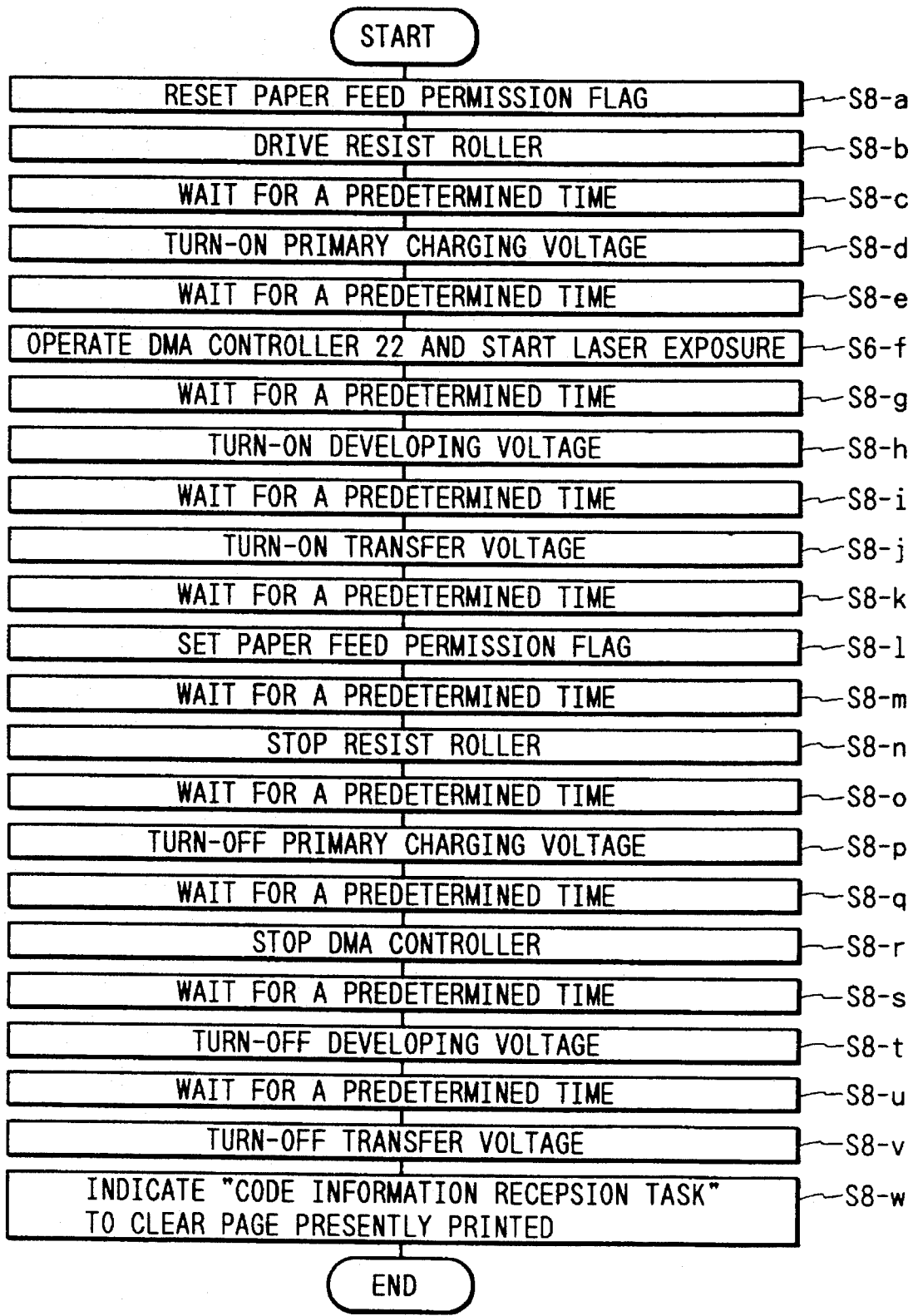

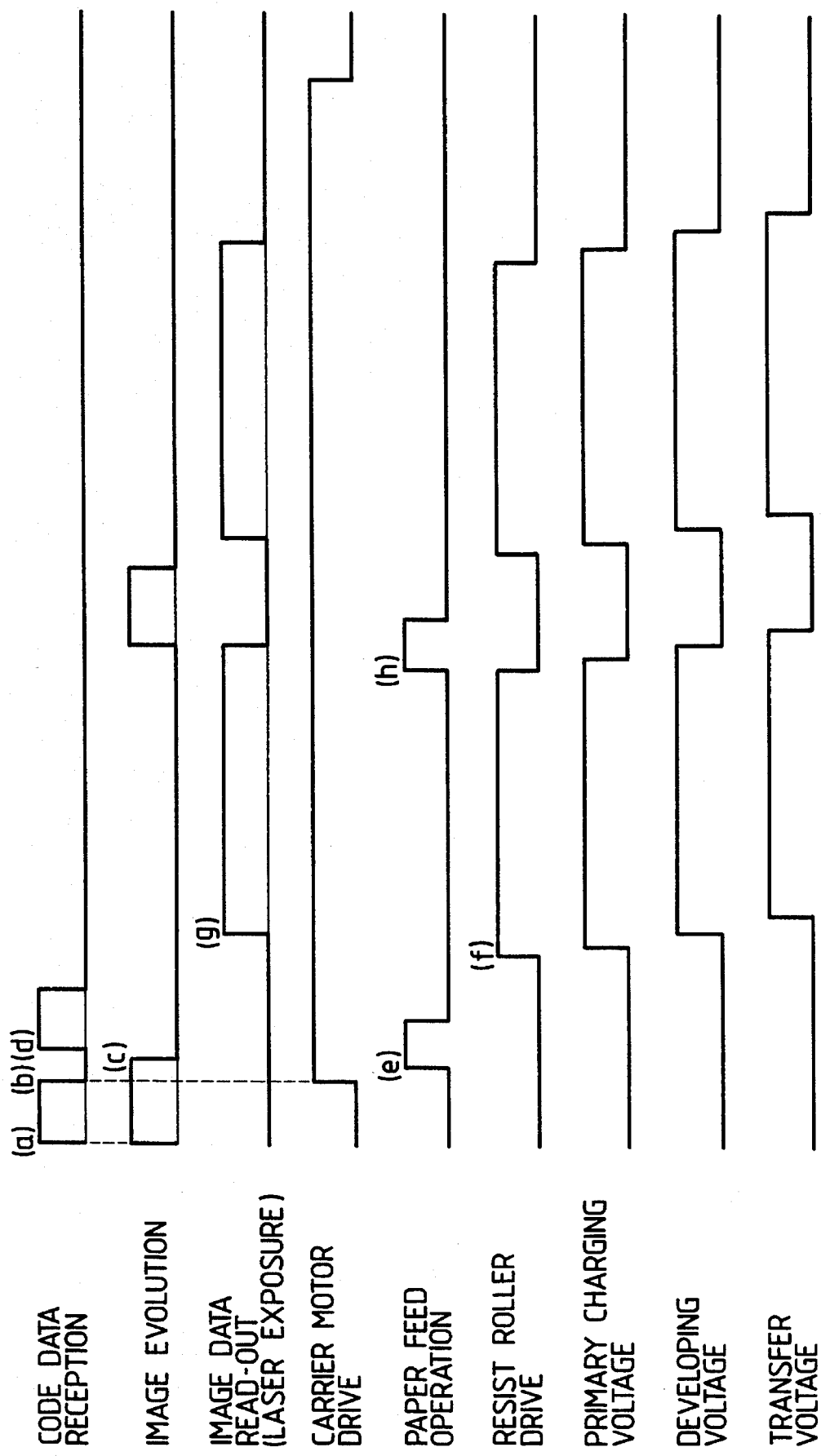

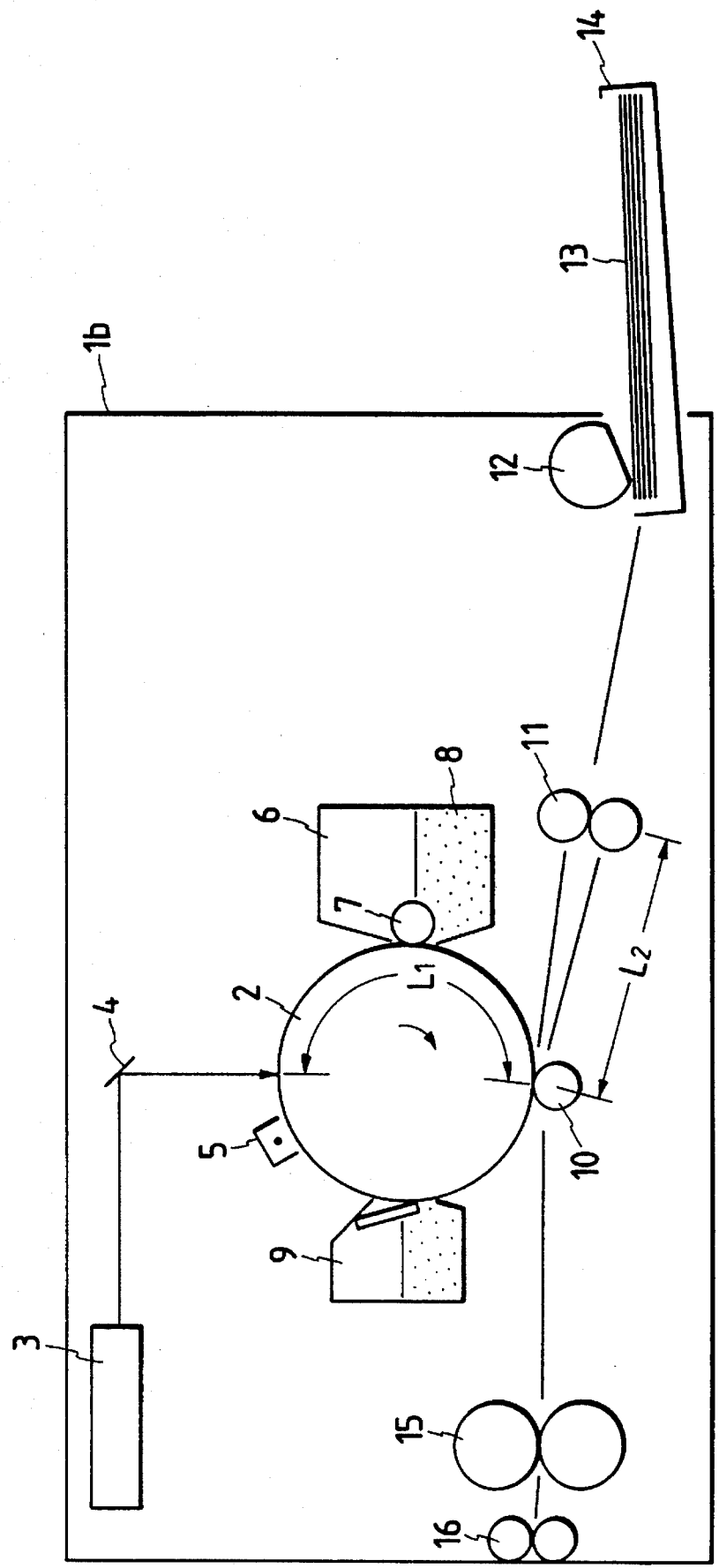

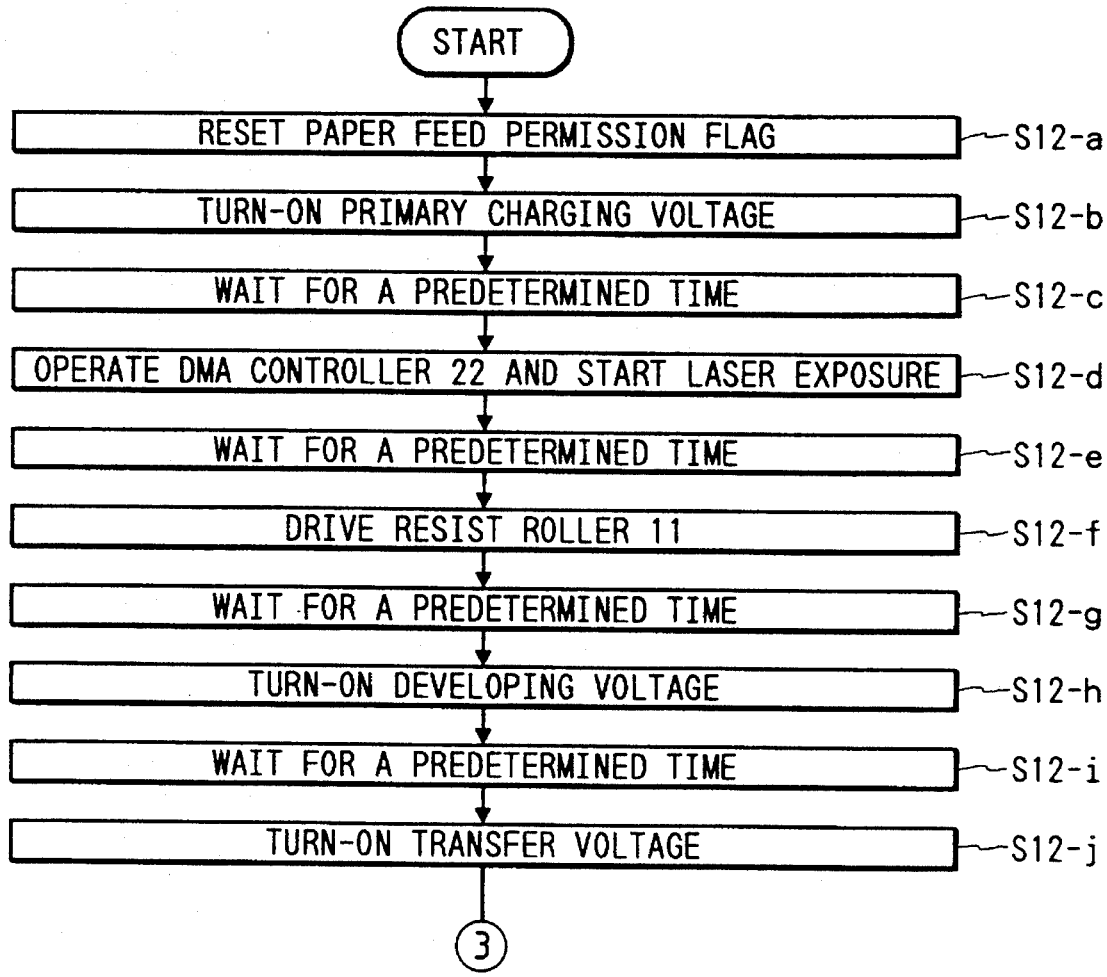

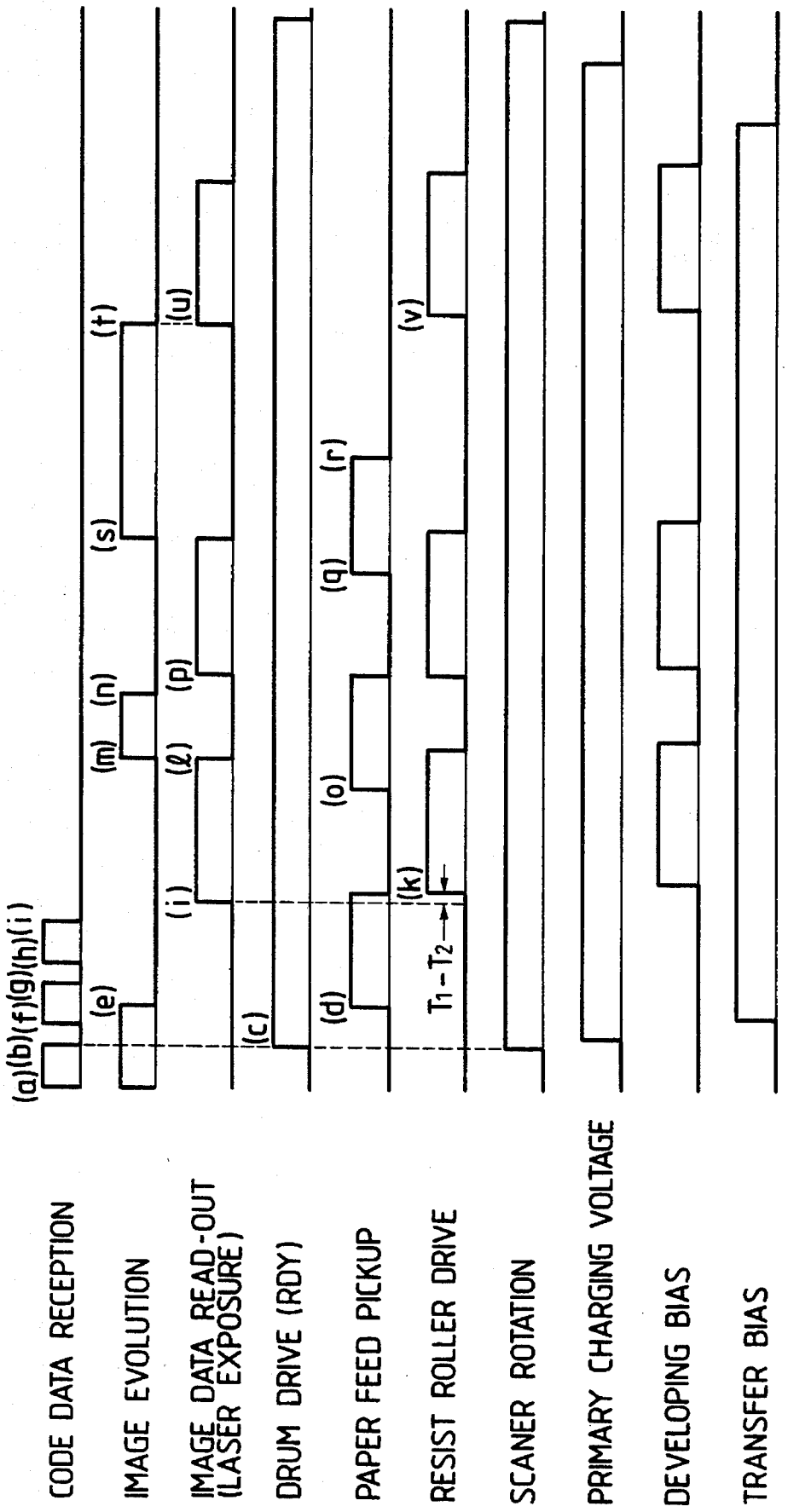

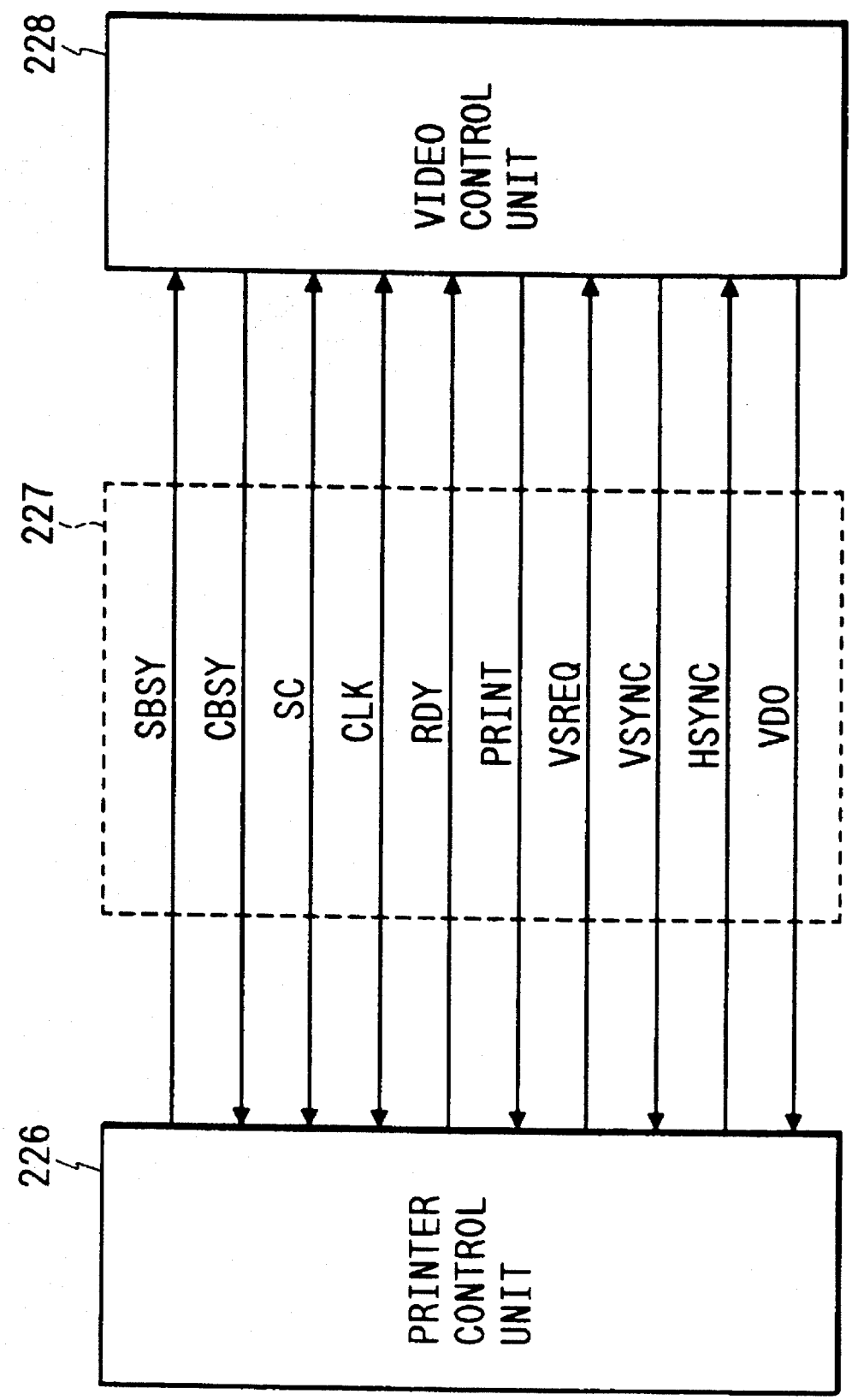

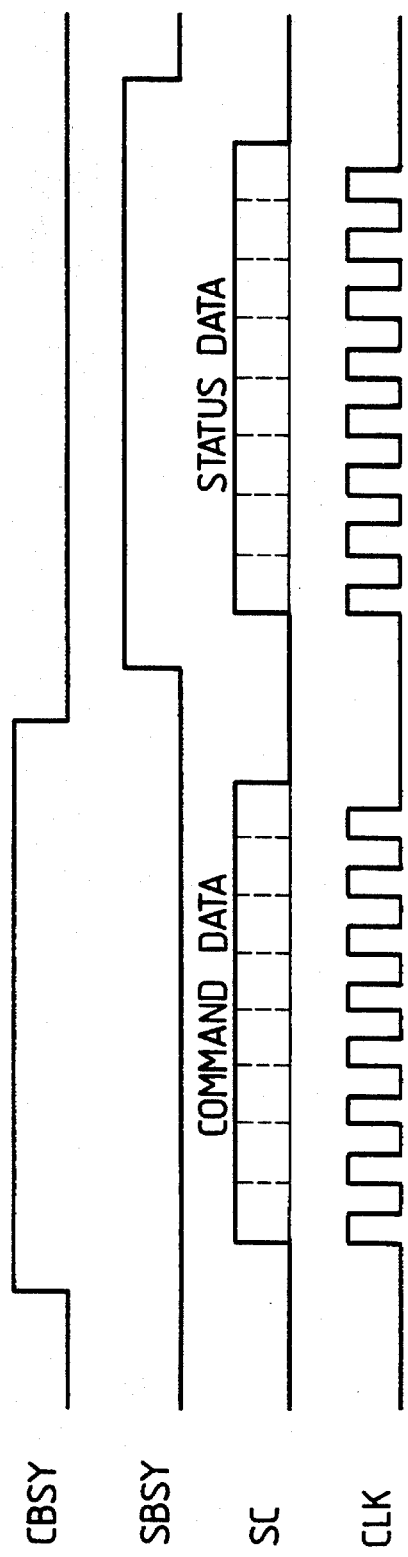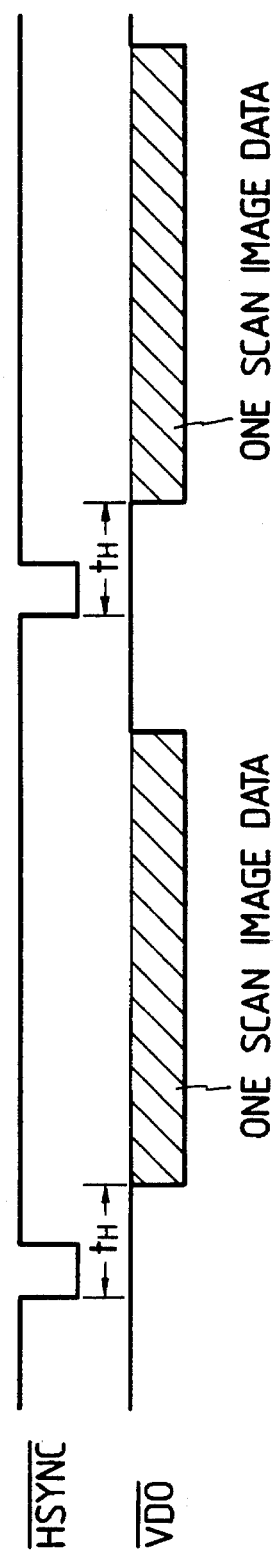

IMAGE FORMING APPARATUS WITH FEEDER CONTROL BASED ON PIXEL CONVERSION STATUS

This application is a continuation of application Ser. No. 07/998,770, filed Dec. 29, 1992, now abandoned, which was a continuation of application Ser. No. 07/558,322, filed Jul. 26, 1990, now abandoned.

BACKGROUND OF THE INVENTION

1. Field of the Invention

The present invention relates to an apparatus for forming an image on a recording-medium according to externally supplied image information.

2. Related Background Art

Electrophotographic printers are capable of image recording with high resolution and high quality. For this reason, there has been developed and widely commercialized various types of printers such as a laser beam printer, LED printer, liquid crystal printer etc. These printers are used for the recording of complex patterns and images, exploiting the feature of high quality image recording.

A controller for generating a complex pattern over a page, for example a postscript controller, requires an image memory for at least a page, such memory being hereinafter called page memory. For example, a page memory of a capacity as large as 1 Mbyte will be required for printing an A4-sized page with a resolution of 300 dpi.

In this manner the output of a high-quality printer contains a considerable amount of information. For this reason the image data handled in the memories of computers or other information processing systems are often encoded or programmed data rather than unprocessed raster image data. Therefore, the performance of a page printer is measured by how rapidly encoded image data of a page can be converted and printed as raster image data of a page.

FIG. 1 schematically shows a laser beam printer (LBP) as a representative example of such a page printer, and FIG. 2 is a block diagram of the control system of such a laser beam printer.

In FIG. 2, external information processing equipment 125 (such as a personal computer or a work station) sends encoded image information (for example in ASCII code, hereinafter referred to as code information) to the laser beam printer through an external interface 127 such as Centronix or RS232C. The code information is received by an interface 118 of the laser beam printer, and then by a microprocessor 117 through an internal bus 128, which has united functions of control bus, address bus and data bus. The microprocessor 117 functions according to a control program stored in a memory 121 composed of a non-volatile ROM.

The microprocessor 117 stores the code information, obtained from the interface 118, after certain processing, in a memory 119 which is a RAM for code information storage. In addition to the storage mentioned above, the microprocessor 117 converts the code information into dot image data and stores the converted data into a memory 120 which is a RAM for image data storage (bit map memory).

A DMA controller 122 reads the data stored in the memory 120 and sends the data to a raster conversion circuit 124. This DMA controller 122 can use the internal bus 128, independently from the microprocessor 117. Upon detecting the image data of a page in the memory 120 (namely completion of conversion of code information of a page into image data), the microprocessor 117 activates the DMA controller 122, which sends the image data from the memory 120 to the raster conversion circuit 124 in response to the request therefrom, occupying the internal bus 128 alternately with the microprocessor 117. The raster conversion circuit 124 converts the parallel image data from the DMA controller 122 into serial image data, which are supplied, in synchronization with a horizontal synchronization signal, to a laser driving circuit in a mechanical control unit 126 for modulating a laser beam.

In addition to the evolution of the code information into the image data, the microprocessor 117 sends various instructions for the printing process to the mechanical control unit of the laser beam printer. An I/O driver 123 functions as an interface between the microprocessor 117 and the mechanical control unit 126.

In the following there will be explained the mechanical control of the laser beam printer, with reference to FIG. 1, in which 1 indicates the main body of the printer. Upon completion of evolution of the code information of a page into image data and their storage in the memory 120, the microprocessor 117 activates a transport motor (not shown). At the same time activated are a photosensitive drum 2, a primary charger 5, a developing roller 7, a transfer charger 34, fixing rollers 15 and discharge rollers 16. The rotation of the above-mentioned motor is controlled by the mechanical control unit 126.

A laser scan unit 3 includes a laser scanning mirror, a laser scanning motor, a laser device, a laser drive circuit etc. The I/O driver 123 activates the laser scan motor in the laser scan unit 3, in addition to the transport motor, and sends high voltages to the primary charger 5, developing roller 7 and transfer charger 34. Furthermore, the I/O driver 123 energizes a clutch (not shown) on a sheet feeding roller, thereby advancing a recording sheet 13 stored in a paper cassette 14. The recording sheet is first stopped at registration rollers 11, and the mechanical control unit 126 informs the I/O driver 123 of the arrival of the recording sheet 13 at the registration rollers 11. When the recording sheet 13 is stopped at the registration rollers 11, the microprocessor 117 activates the DMA controller 122, thereby sending the serial image data from the raster conversion circuit 124 to the laser scan unit 3. The laser beam modulated by the image data irradiates the photosensitive drum to form a latent image thereon, which is then developed into a visible toner image in the developing unit 6.

The recording sheet 13 stopped at the registration rollers 11 is then advanced by these rollers, and the toner image is transferred onto the recording sheet 13 by the transfer charger 34. The sheet 13 bearing the toner is then subjected to thermal fixation by the fixing rollers 15, and is discharged from the apparatus by the discharge rollers 16.

The toner not transferred by the transfer charger 34 is collected by a cleaner 9.

The code information supplied from the external information processing apparatus 135 is thus printed as an image.

Printing of data of plural pages is conducted in according with the timings shown in FIG. 3. At first the microprocessor 117 starts the reception of code information at a timing (a). At the same time the microprocessor 117 starts evolution of the image data and stores the image data in the memory 120. The reception of code information of the 1st page is completed at a timing (b), and that of 2nd page is started at (c). The image data evolution of the 1st page is completed at (d). The transport motor is in rotation in this state, and sheet feeding is conducted at (f). Then the registration rollers 11 are activated at (g), and the DMA controller 122 starts image data reading at (h). Also at the timing (h), the raster conversion circuit 124 generates the serial image data, thus initiating the exposure with the laser beam. At (i), the exposure for the 1st page is completed, and the image data evolution for the 2nd page is started. Thereafter the printing of the 2nd page is conducted with the same sequence as that for the 1st page.

In the chart shown in FIG. 3, the periods from (a) to (d) and from (i) to (j) for image data evolution, and the periods from (h) to (i) for image data reading (also for exposure with the laser beam) are mutually separate and do not mutually overlap, because the capacity of the image memory is limited to one page.

In such process, no access is made to the image memory 120 in the periods from (f) to (h) from (k) to (m), and these is a loss of throughput (number of printed pages per unit time) in the laser beam printer having a long distance from the sheet feed roller 12 to the registration rollers 11. Such loss in the throughput can be avoided by using image memories of two pages and overlapping the period of image data evolution with that of image data reading. However, in such structure, the cost of the image memory will have to be doubled.

SUMMARY OF THE INVENTION

As explained in the foregoing, the throughput will be lowered, depending on the arrangement of the sheet feeding unit, if the sheet feeding is conducted after the image data evolution of a page.

In consideration of the foregoing, an object of the present invention is to provide an image forming apparatus capable of improving the throughput of image formation.

Another object of the present invention is to provide an image forming apparatus capable of improving the throughput of image formation, without an increase in the cost.

The above-mentioned objects can be attained, according to the present invention, by an image forming apparatus in which the recording medium is transported to a predetermined position, prior to the completion of conversion of received code information into pixel information by converting means, whereby the throughput can be significantly improved in comparison with the case in which the transportation of the recording medium is conducted after the above-mentioned conversion.

Still another object of the present invention is to resolve drawbacks resulting from prolonged sojourn of the recording medium in the above-mentioned predetermined position.

Still other objects of the present invention, and the advantages thereof, will become fully apparent from the following description which is to be taken in conjunction with the attached drawings.

BRIEF DESCRIPTION OF THE DRAWINGS

FIG. 3 is a timing chart showing an example of the function of a laser beam printer in prior technology;

FIG. 4 is a timing chart showing an example of the function in a first embodiment;

FIGS. 5 to 8 are flow charts showing the function of the laser beam printer in a second embodiment;

FIGS. 9 and 10 are timing charts showing an example of the function of the second embodiment;

FIG. 11 is a schematic cross-sectional view of a laser beam printer of a third embodiment;

FIG. 13 is a timing chart showing an example of the function of the third embodiment;

FIG. 20 is a block diagram relating to an interface 227 in the sixth embodiment;

FIG. 21 is a timing chart of signals used in serial communication through the interface 227;

FIG. 22 is a timing chart of image signal or the like transmitted through the interface 227;

DETAILED DESCRIPTION OF THE PREFERRED EMBODIMENTS

[Embodiment 1]

Figure 1:
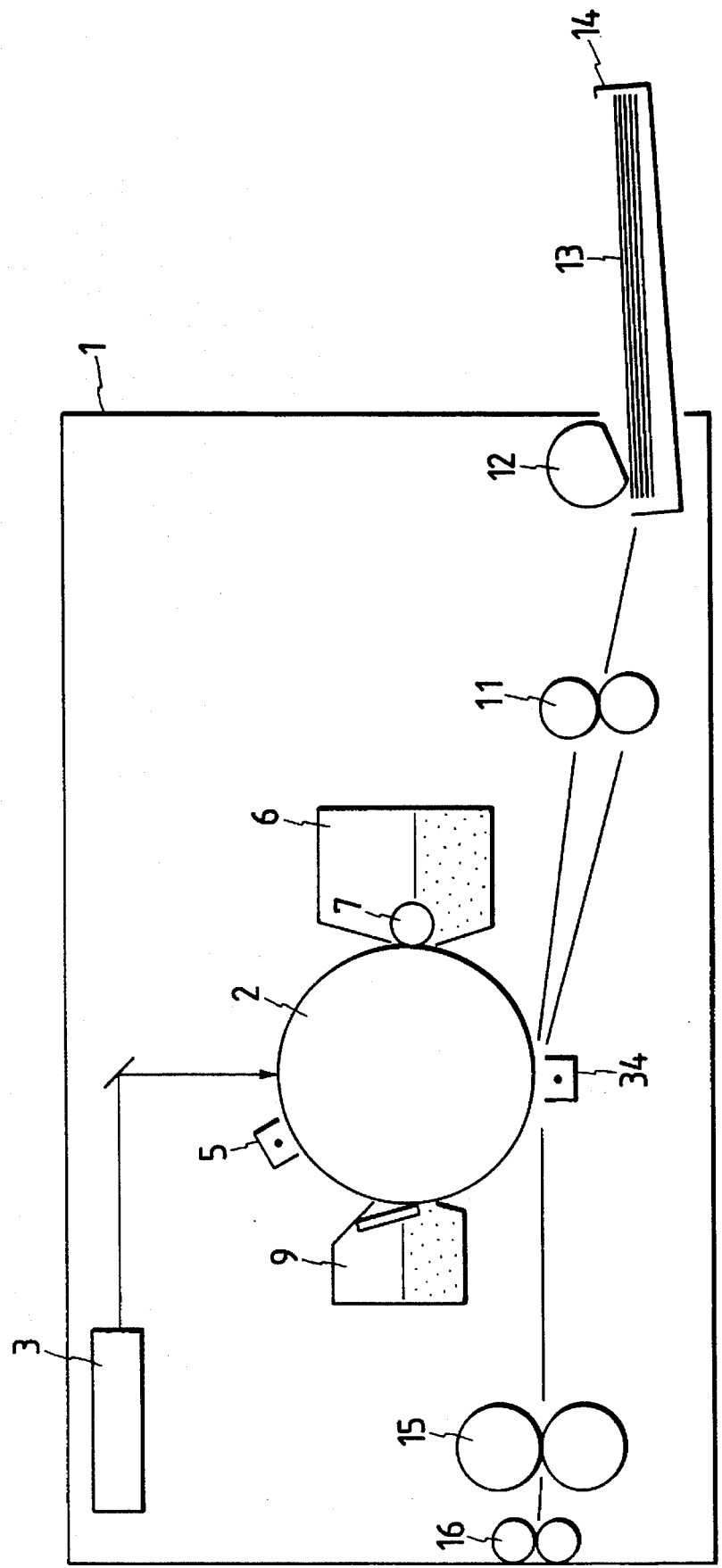
FIG. 1 is a schematic cross-sectional view of a laser beam printer.

In the following there will be explained a 1st embodiment with reference to attached drawings.

As already explained in the foregoing, the printing operation with the image memory of a page usually results in a loss of throughput. In the following there will be explained the function of the 1st embodiment which does not result in such loss of throughput with reference to a timing chart shown in FIG. 4. The hardware structure will not be explained because it can be same as that shown in FIGS. 1 and 2.

Referring to FIG. 4, the microprocessor 117, which serves as the processing means and a pixel convertor, starts the reception of code information at (a), and completes the reception of the 1st page at (b). The microprocessor 117 activates the transport (main) motor and the laser scanning motor, and thereafter effects the sheet feeding at (c).

Then the microprocessor starts to receive the code information of the 2nd page at (d), and terminates the reception at (m). Also the microprocessor completes the image data evolution of the 1st page at (e), and activates the registration rollers 11 at (f). It then starts the image data reading (exposure with laser beam) at (g), and completes the image data reading at (i). Also at (i), it starts the image data evolution of the 2nd page. Therefore, the sheet feeding for the 2nd page is conducted at a timing (h) before the completion of image data read-out (exposure with laser beam) for the 1st page.

The image data evolution for the 2nd page is completed at (j), and the printing of the 2nd page is conducted with the same sequence as that of the 1st page. This sequence is featured by a fact that the image data evolution or the exposure with laser beam is conducted in the period from (c) to (f), (h), (k), namely from the sheet feeding to the activation of the registration rollers 11, thereby reducing the dead time and improving the throughput. Also, even if the distance from the sheet feed roller 12 to the registration rollers 11 is long, it is possible to prevent the loss in the throughput by advancing the timing (e), (h) of the sheet feeding to the 2nd and subsequent pages.

The sequence shown in FIG. 4 is also featured by a fact that the sheet feeding is conducted after the reception of code information of a page (before the completion of image data evolution,) and the registration rollers 11 are activated after the completion of image data evolution.

If the time required for image data evolution is short, the registration rollers may be activated immediately after the recording sheet has arrived at the registration rollers. On the other hand, if the time required for image data evolution is long, the fed sheet is to be stopped at the registration rollers until the end of the image data evolution.

[Embodiment 2]

In the first embodiment, if the image data evolution requires a long time, the photosensitive drum is charged with a high voltage and continues to rotate without recording operation with the laser beam until the image data evolution is completed. Consequently, in case of evolution of complex graphic information, the photosensitive drum continues to rotate for a long time, eventually resulting in abrasion.

The present 2nd embodiment is to improve the throughput and to minimize the abrasion of the photosensitive drum.

Figure 2:
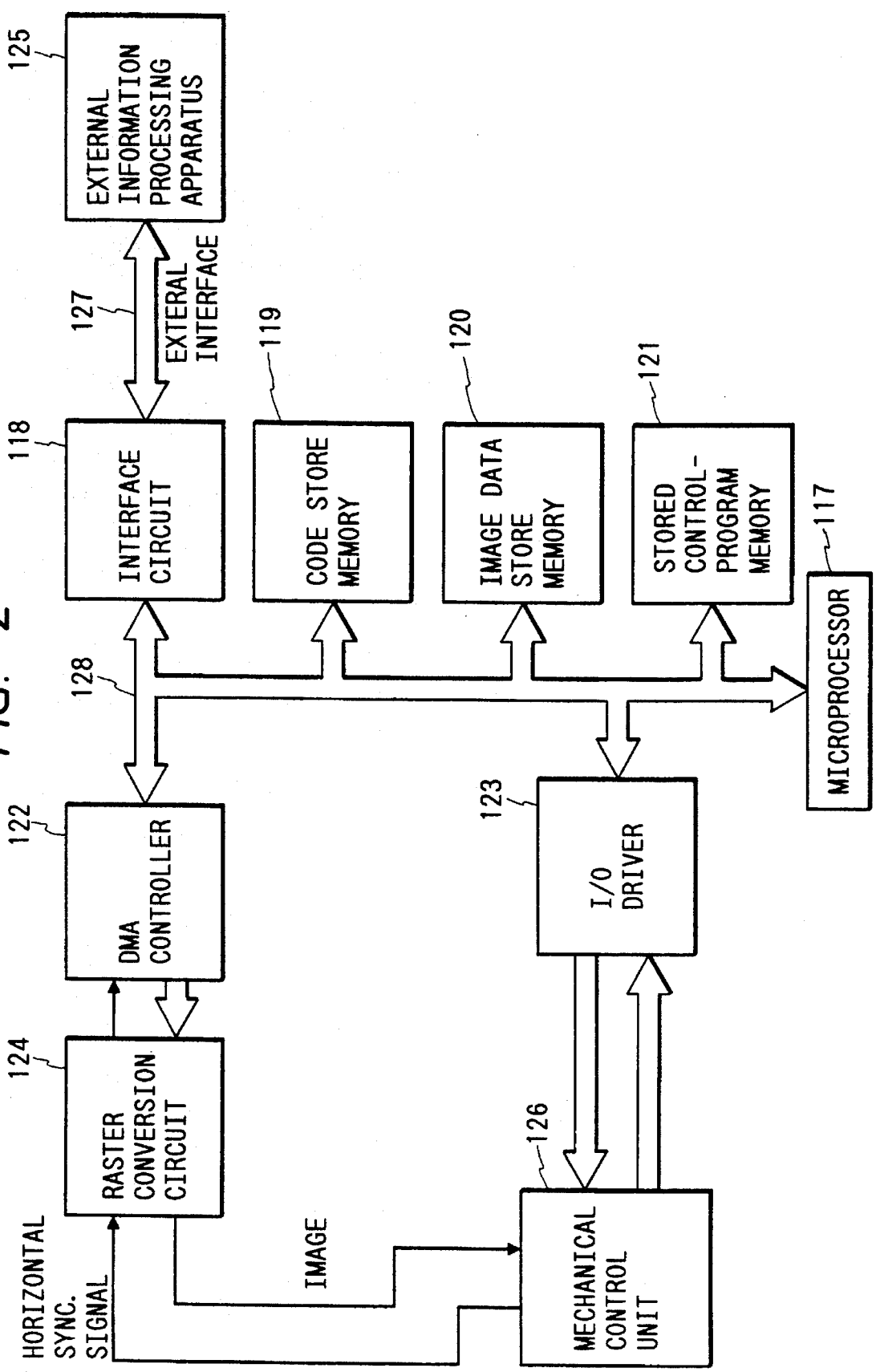
FIG. 2 is a schematic block diagram of a control unit of the laser beam printer.

Also in the 2nd embodiment, the hardware structure is same as that shown in FIGS. 1 and 2, but the control sequence is different as will be explained in the following.

Figure 5B:
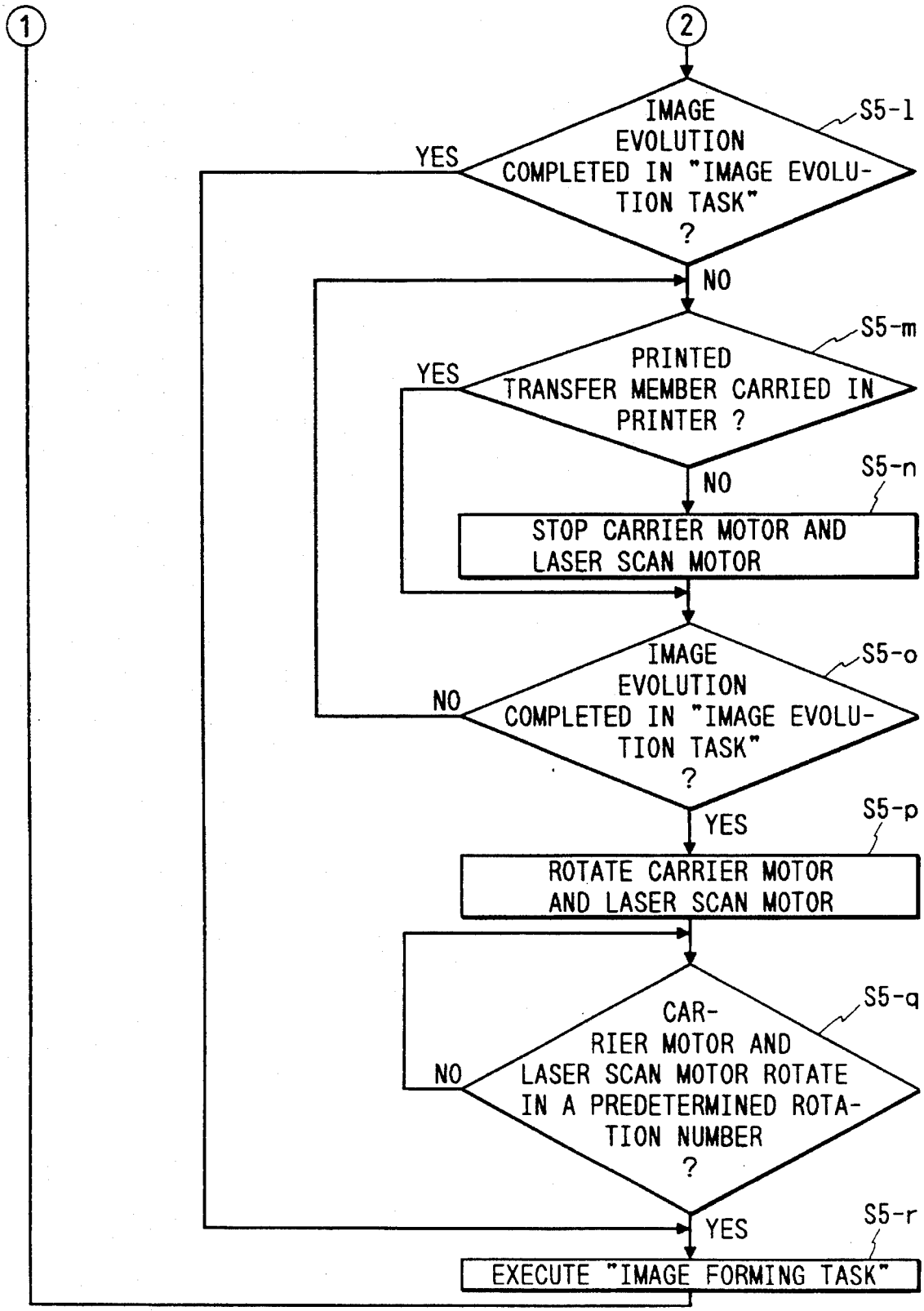
FIG. 5, which consists of FIGS. 5A and 5B combined.

FIGS. 5 to 8 are flow charts of the control sequence of an electrophotographic printer constituting the 2nd embodiment, wherein FIG. 5 shows a main control routine; FIG. 6 shows a "code information reception task" to be activated in the main control routine, for receiving code information from an external information processing apparatus 125 and storing data in the code storage memory 119; and FIG. 7 shows an "image evolution task" to be activated in the main control routine, for reading the code information stored in the code storage memory 119, converting the code information into image data (image data evolution) and storing the image data in the image data storage memory 120.

FIG. 8 shows an "image formation task" routine which is activated, for the printing of each page, in the main control routine (FIG. 5). These routines will be explained in the following.

Referring to FIG. 5, the microprocessor 117 at first sets a paper feed permission flag (step S5-*a*), which is used in the main control routine and the image formation task, for determining the timing of feeding the recording sheet 13 from the paper cassette 14. The microprocessor 117 then activates the code information reception task (FIG. 6) (step S5-*b*), and the image evolution task (FIG. 7) (step S5-*c*).

When the code information reception task is activated, the reception of code information from the external information processing apparatus 125 is prohibited (step S6-*a*). Then the "image formation task" routine is executed to discriminate whether a page clear designation has been issued (step S6-*b*). The page clear designation means that the "image formation task" has completed the printing operation and erases the data of the printed page from the code storage memory 119. If the page clear designation is issued, the code information corresponding to the designated page is cleared (step S6-*c*).

Then there is discriminated whether the code storage memory 119 is filled with data, namely whether this memory 119 has any vacancy (step S6-*d*). If it is full, the sequence immediately returns to the start of this task routine. If vacancy is available, the reception of the code information from the external information processing apparatus is enabled (step S6-*e*). Then there is discriminated whether codes of a predetermined number of bytes have been received (step S6-*f*), and, if received, the received codes are stored in the vacant area of the code storage memory 119 (step S6-*g*). Subsequently there is discriminated whether the received code information has reached one page (step S6-*h*), and the printing operation is enabled in the main control routine (step S6-*i*).

As explained in the foregoing, the "code information reception task" routine receives the codes if vacancy is available in the code storage memory 119, but suspends the reception if the memory 119 is full. Then, when the code information of a page is accumulated, the printing instruction is given to the main control routine. Upon completion of image formation of a page, the code information corresponding to the printed image is erased from the code storage memory 119.

The "image evolution task" routine converts the code information, stored in the code storage memory 119, into image data. Referring to FIG. 7, the microprocessor 117 searches among the code information stored in the code storage memory 119 for the oldest page not yet subjected to image evolution (step S7-*a*), and searches, within said page, the codes which have not been subjected to image evolution (step S7-*b*). The microprocessor 117 executes the image evolution on such codes, and stores the image data in the image storage memory 120 (step S7-*c*). Then it discriminates whether the image evolution for that page has all been completed (step S7-*d*), and, if completed, information on the completion of image evolution is given to the main program (step S7-*e*). If not complete, the image evolution of that page is continued. This image evolution is conducted parallel to the reception of the code information.

Once the image evolution is completed, the obtained image data (dot data) are read by the DMA controller 122, and exposure with laser beam is executed under the control by the "image formation task" routine. The image evolution and the exposure are not conducted simultaneously, because the capacity of the image memory is limited to one page. Then a step S7-*f* awaits the completion of the exposure with laser beam in the "image formation task" routine, and, upon completion of the exposure, the sequence returns to the start of the "image evolution task" routine to start the image evolution for the next page.

A step S5-*d* in the main control routine (FIG. 5) discriminates whether a print permission has been received from the "code information reception task" routine. If the code information of a page has been received from the external information processing apparatus 125 and the printing of that page is enabled, there are activated the transport motor and the laser scan motor (step S5-*g*). Otherwise, the sequence enters a discriminating routine in a step S5-*e*. If step S5-*e* identifies that an already printed sheet is transported in the printer, the sequence returns to step S5-*d*. Otherwise, the transport motor and the laser scan motor are stopped (step S5-*f*) and the sequence returns to step S5-*d*. As explained above, the transport motor and the laser scan motor are stopped if the printing operation is not enabled. The transport motor drives the sheet feed roller 12, registration rollers 11, fixing unit 15, discharge rollers 16 and photosensitive drum 2. However the rotation is transferred to the sheet feed roller 12 and the registration rollers 11 respectively through a sheet feed clutch and a registration clutch which are not illustrated. Also the laser scan motor rotates a polygon mirror (not shown) thereby putting the laser beam into a scanning motion.

After the step S5-*g* has started the transport motor and the laser scan motor, a step S5-*h* awaits a state of stable rotation of these motors, and there is then discriminated whether a sheet feed permission flag has been set (step S5-*i*). This flag is reset at the start of the "image formation task" as will be explained later and is set again in the course of image formation (step S8-*l*). This flag determines the interval of sheet feeding, in case of continuous printing. If the step S5-*i* identifies the set state of this flag, the unrepresented sheet feed clutch is turned on to drive the sheet feed roller 12, thereby feeding a recording sheet 13 from the cassette 14 (step S5-*j*). Then the arrival of the fed sheet 13 at the registration rollers 11 is awaited (step S5-*k*). Subsequently there is discriminated whether the image evolution of the page to be printed is already completed (step S5-*l*), based on the image completion information of the "image evolution task", step S7-*e*. If the image evolution is completed, the "image formation task" routine is activated (step S5-*r*).

If the image evolution is not complete, the sequence enters a discrimination routine (step S5-*m*), for discriminating whether an already printed sheet 13 is transported in the printer. If not, the transport motor and the laser scan motor are stopped (step S5-*n*). Then it is again discriminated whether the image evolution has been completed in the "image formation task" (step S5-*o*, and, if not, the sequence returns to the step S5-*m*). In the routine of the steps S5-*m*, S5-*n* and S5-*o*, if the already printed sheet 13 is discharged from the printer before the completion of image evolution, the transport motor and the laser scan motor are stopped at such sheet discharge. Also these motors are stopped if the image evolution is completed before the sheet discharge from the printer. Also these motors are immediately stopped if the already printed sheet 13 is not present, and these motors are activated again at the completion of the image evolution (step S5-*p*). Subsequently a step S5-*q* awaits these motors to reach predetermined revolutions, and a step S5-*r* starts the "image formation task" routine.

In the routine of the steps S5-*l* to S5-*r*, the transport motor is not stopped if the completion of image evolution is earlier than the arrival of the recording sheet 13 at the registration rollers 11. In the inverse case, the transport motor is stopped if the already printed sheet 13 is not present in the printer. As explained above, the transport motor and the laser scan motor are started or stopped, depending on the timing of completion of the image evolution.

The "image formation task" routine, when activated, executes the printing process for the page for which the image evolution is conducted. Referring to FIG. 8, at first there is reset a paper feed permission flag (step S8-*a*), in order to avoid, in the course of printing a page, the sheet feeding for the next page. Then the registration rollers are activated, and the high voltage for the primary charger is turned on after a predetermined time (step S8-*d*). Then, after another predetermined time, the DMA controller is activated (step S8-*f*) to start the image memory read-out and the exposure operation with laser beam. After a predetermined time from the start of the exposure operation the high voltage for the developing unit is turned on (step S8-*h*), and the high voltage for the transfer charger is turned on after another predetermined time (step S8-*i*).

The time from the activation of the registration rollers 11 to that of the primary charging voltage (step S8-*c*), the time therefrom to the start of exposure (step S8-*e*), the time therefrom to the activation of the developing voltage (step S8-*g*), and the time therefrom to the start of the transferring voltage (step S8-*i*) are determined according to the positions of high-voltage components and registration rollers.

After the start of the transfer voltage, the paper feed permission flag is set at a predetermined time (step S8-*l*). If the reception of code information of the next page is complete at this point, the sheet feeding operation for the next page is conducted. This is discriminated in the steps S5-*d* and S5-*i* in the main control routine.

Referring to FIG. 8, the registration rollers are stopped after a predetermined time from the setting of the paper feed flag (steps S8-*m*, S8-*n* and S8-*o*). Subsequently the high voltages for the primary charger, laser exposure, developing unit and transfer charger are terminated in succession (steps S8-*p* to S8-*v*).

Finally, when the completion of image formation is identified, and the clearing of the printed page is designated in the "code information reception task" routine (step S8-*w*). Thus the area of the code storage memory occupied by the data of the above-mentioned page is opened, thereby enabling the data reception from the external information processing apparatus 125.

This "image formation task" is activated at each page printing.

FIG. 9 is a timing chart of the sequence (FIGS. 5 to 8) of the present embodiment, showing an example in which a short time is required for image evolution. The reception of code information is started at (a), and is completed at (b), whereupon the transport motor and the laser scan motor are activated. Upon detection of stable rotation of these motors, the sheet feeding operation is conducted at (e), and the image evolution is terminated at (c) before the fed sheet reaches the registration rollers 11. Consequently the transport roller is not stopped, and the registration rollers 11 are activated at (f). Thereafter the high voltages and the laser beam are emitted in succession. Before the exposure is completed for a page, the sheet for the next page is fed.

Figure 10:
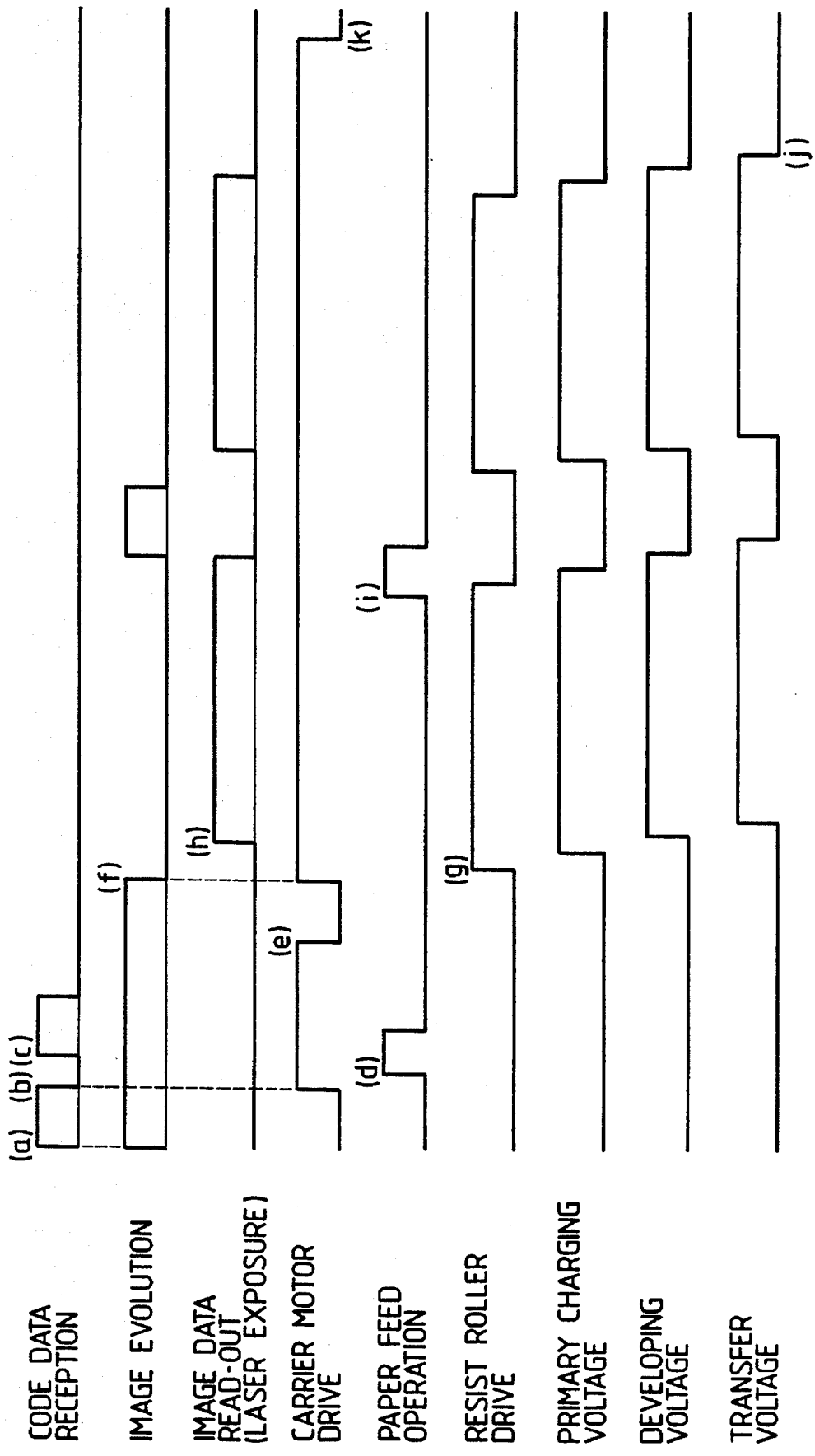

FIG. 10 is a timing chart showing the function in cases where image evolution takes a longer time. When the reception of the code information of the 1st page is completed at (b), the transport motor and the laser scan motor are activated. Upon detection of stable rotation of these motors, the sheet feeding is started at (d). If the image evolution is not yet complete when the feed sheet arrives at the registration rollers 11, the transport motor is once stopped (e). The transport motor is activated again at the completion of the image evolution at (f). The registration roller 11 is activated when the transport motor reaches stable rotation state at (g).

In case of FIG. 10, the transport motor is stopped from (e) to (f) because the image evolution requires a longer time.

For the 1st page, the high voltages are not applied from the sheet feeding to the activation of the registration rollers. Thus, if the photosensitive drum 2 is stopped at (e), there will be no remaining charge on the drum. Also in case of continuous printing, after the printing of a page and the discharge of the sheet, the photosensitive drum is stopped. Thus, from a period from (j) to (k), the photosensitive drum 2 is rotated without high voltages. Consequently the photosensitive drum 2 is stopped without surface charge.

Therefore, the deterioration of the photosensitive drum 2 does not occur, because, in the sequence of the present embodiment, the photosensitive drum 2 is not stopped while the charge is remaining thereon. Also the sequence of the present embodiment does not deteriorate the throughput if the time required for image evolution is short. On the other hand, if the time required for image evolution is very long, the transport motor and the photosensitive drum 2 are temporarily stopped, whereby the abrasion of the drum can be minimized.

In the foregoing description, the transport motor is immediately stopped if the image evolution is not yet complete when the fed sheet reaches the registration rollers 11, but the above-mentioned stopping of the motor may be somewhat delayed. Such delay will increase the printing operations without temporary stopping of the transport motor, and extend the rotating time of the photosensitive drum 2. Thus, if the drum has sufficient durability, such delay may be extended.

[Embodiment 3]

FIG. 11 illustrates an electrophotographic printer 1b constituting a third embodiment of the present invention. The control unit for generating image signals and for controlling the printer is constructed the same as in FIGS. 1 and 2, and will not, therefore, be explained further.

In this 3rd embodiment, as in the 2nd embodiment, an electrophotographic photosensitive drum 2 is uniformly charged with a primary charger 5, and then exposed to an image by a laser scanning unit 3 to form a latent image, which is developed by a developing roller 7, utilizing toner 8 contained in a developing unit 6. On the other hand, one of recording sheets 13 stacked in a paper cassette 14 is advanced by a sheet feeding roller 12, then waits in a state in which the leading end of the sheet impinges on registration rollers 11, subsequently advanced to a transfer roller 10 in synchronization with the image formed on the photosensitive drum 2, and is subjected to the transfer of the image, as will be explained later. The image transferred onto the sheet 13 is fixed thermally in a fixing unit 15, and the sheet is discharged from the printer by discharge rollers 16.

On the other hand, the toner remaining on the photosensitive drum after the image transfer is cleaned by a cleaner 9, and the image forming process is thereafter repeated, starting from the charging step.

The 3rd embodiment is featured by a fact that the distance $l_1$ from the position of laser exposure to the transfer roller 10 is larger than the distance $l_2$ from the registration rollers 11 to the transfer roller 10 ($l_1 > l_2$). In the above-explained printer 1b, the functions except the "image forming task" are the same as those in the foregoing 2nd embodiment. In the following, therefore, explained only is the "image formation task" routine.

Figure 12B:
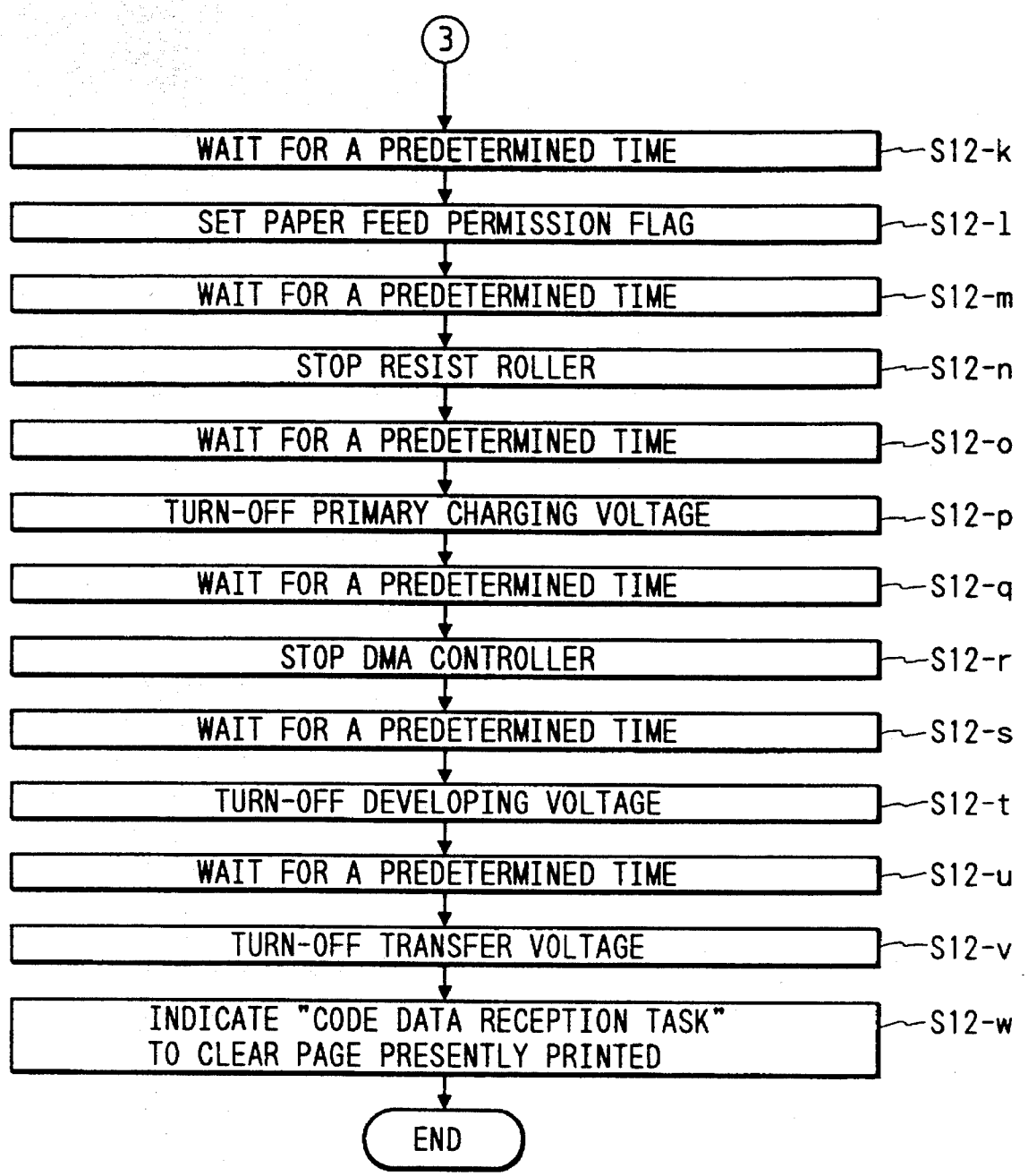
FIG. 12, which consists of FIG. 12A and 12B combined, is a flow chart showing the function featuring the third embodiment.

When the "image formation task" routine shown in FIG. 12 is activated, there is conducted the printing process of a page for which the image evolution has been conducted. Referring to FIG. 12, a paper feed permission flag is at first set (step S12-a), in order to prevent, in the course of printing a page, the feeding of the sheet for the next page. Then the primary charger is turned on (step S12-b). Then, after a predetermined time, the DMA controller 122 is activated (step S12-d), thereby effecting the image memory read-out and the exposure with laser beam. After a predetermined time from the start of exposure, the registration rollers 11 are activated (step S12-f), then the high voltage for development unit is turned on after another predetermined time (step S12-h), and the high voltage for transfer charger is turned on after still another predetermined time (step S12-i).

The intervals and sequence of the starts of registration rollers 11, primary charging voltage, exposure, and developing high voltage are determined according to the arrangement of high-voltage elements and registration rollers 11.

After a predetermined time from the start of high voltage for the transfer charger, the paper feed permission flag is set (step S12-l). The sheet feeding for the next page is not conducted if the reception of code information of the next page is not yet complete at this point. This is discriminated in the steps S5-d and S5-i in the main control routine.

Referring to FIG. 12, the registration rollers 11 are stopped after a predetermined time from the setting of the paper feed flag (steps S12-m, S12-n and S12-o). Then the high voltage for primary charger, exposure, high voltage for development and high voltage for transfer charger are terminated in succession (steps S12-p to S12-v).

Finally, when the image formation is identified as complete, the data of the printed page is cleared to the "code information reception task" routine (step S12-w). Thus the area of the code storage memory 119 occupied by the data of said page is made available for the reception of the data from the external information processing apparatus.

The "image formation task" routine is activated for each page printing. FIG. 13 is a timing chart showing an example of the sequence of the present embodiment.

It is assumed that code information of 3 pages are received in periods (a) to (b), (f) to (g) and (h) to (i).

At first, the control unit including a microprocessor 117 starts the image data evolution of the code information of the 1st page, received in the period (a) to (b). Upon completion of reception of the code information of the 1st page, the transport motor is activated for rotating the photosensitive drum 2, and the laser scan motor is also activated at (c). Then the high voltage for primary charger and the transfer charger are supplied in succession, thereby starting a print preparation operation, called pre-rotation step, for obtaining uniform charged state on the photosensitive drum 2 and laser beam output adjustment. Then, at a timing (d) when the image on the photosensitive drum 2 can be synchronized with the recording sheet 13, the sheet feed roller 12 is activated to advance the recording sheet 13 to the registration rollers 11. The image data read-out is however not conducted if the pre-rotation step is not yet complete at (e) when the image data evolution for the 1st page is completed. Upon completion of the pre-rotation step, the image data read-out is started at (j). At the same time the image is written on the photosensitive drum 2 by the laser scanning unit 3. The recording sheet 13 that has arrived at the registration rollers 11 is advanced by the registration rollers 11 in synchronization with the image recording on the photosensitive drum 2. More specifically, the registration rollers 11 are activated at a timing (k), which is delayed corresponding to the difference between the time $T_1$ required by the photosensitive drum 2 to move from the exposure position to the position of the transfer roller 10 and the time $T_2$ required by the recording sheet 13 to move from the registration rollers 11 to the transfer roller 10. This difference is usually interpreted as the difference in distance, because both have a same moving speed. In the present 3rd embodiment, there is selected a condition $l_1 > l_2$. A condition $l_1 < l_2$ will result in a loss in the throughput because the exposure with the laser beam is conducted after the registration rollers 11 are activated. The present 3rd embodiment further improves the throughput because of the above-mentioned condition $l_1 > l_2$.

When the electrostatic latent image formed on the photosensitive drum 2 by the exposure with the laser beam reaches the developing position, the developing bias voltage is applied to effect the image development.

After the image data read-out of the 1st page is completed at (l), the image data evolution for the code information of the 2nd page received in the period (f) to (g) is started at (m).

As the microprocessor 117 is receiving the code information of the 2nd page in this state, the sheet feeding operation for the 2nd page is conducted at a timing (o) in the course of image data read-out for the 1st page.

If the image data evolution of the 2nd page in the period from (m) to (n) is finished earlier than the interval of recording sheet processing, the image data read-out of the 2nd page waits until the lapse of the above-mentioned interval, and is started at a timing (p).

As the microprocessor 117 has received the code information of the 3rd page, the sheet feeding is conducted for the 3rd page is conducted at (q) in the course of the image data read-out of the 2nd page. Upon completion of the image data read-out of the 2nd page, the image data evolution for the 3rd page is started at (s). If the period (s) to (t) required for the image evolution of the 3rd page is longer than the interval of recording sheet processing, the recording sheet 13, with the leading end thereof impinging on the registration rollers 11, awaits the completion of the image evolution ((r) to (v)). Then, after the image evolution is terminated at (t), the image data read-out is started at (u), and the recording sheet 13 is advanced at (v).

As the microprocessor 117 has not received the code information after the 3rd page, the sheet feeding for the 4th page is not conducted. After the image is transferred for the 3rd page there is started a post-rotation step in which the image transfer bias voltage is turned off, whereby the surface potential of the photosensitive drum 2 is made uniform by the primary charger only. When the recording sheet 13 is discharge from the apparatus, the drum and the scanner are deactivated, and the function of the printer is terminated.

[Embodiment 4]

Figure 14:
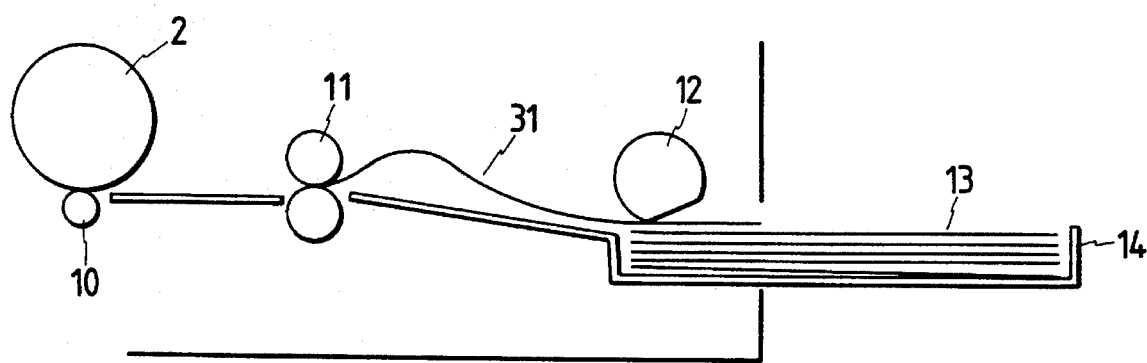
FIG. 14 is a view showing a transport system for the recording medium 13 shown in FIG. 11.

In the foregoing embodiments 1–3, the fed recording sheet 13 is stopped by impingement on the registration rollers 11 as shown in FIG. 14, which illustrates the transport system for the recording sheet 13 in FIG. 11, in order to regulate the front end position of the image by the registration rollers 11. The recording sheet 13 impinging on the registration rollers 11 forms a loop as indicated by 31. If the transport motor or the registration rollers 11 is stopped for a long period in this state, the recording sheet 13 eventually curls, resulting in defective printing. The present 4th embodiment eliminates such drawback by a structure shown in FIG. 15, which is different from the structure shown in FIG. 14 in the present of a photosensor for detecting the leading end of the recording sheet 13 (hereinafter called sheet feed sensor 30) between the registration rollers 11 and the transfer roller 10. The exposure with laser beam is conducted based on the timing of detection of the leading end of the recording sheet 13, by the sheet feed sensor 30.

Figure 15:
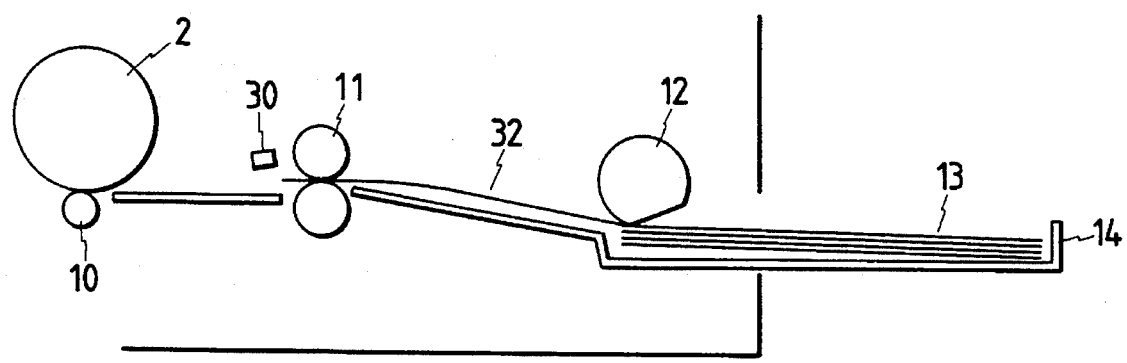
FIG. 15 is a view showing a transport system for the recording medium 13 in a fourth embodiment.

In the 4th embodiment, the fed recording sheet 13 is pinched by the registration rollers 11 as indicated by 32 in FIG. 15, and does not form a loop.

Figure 16:
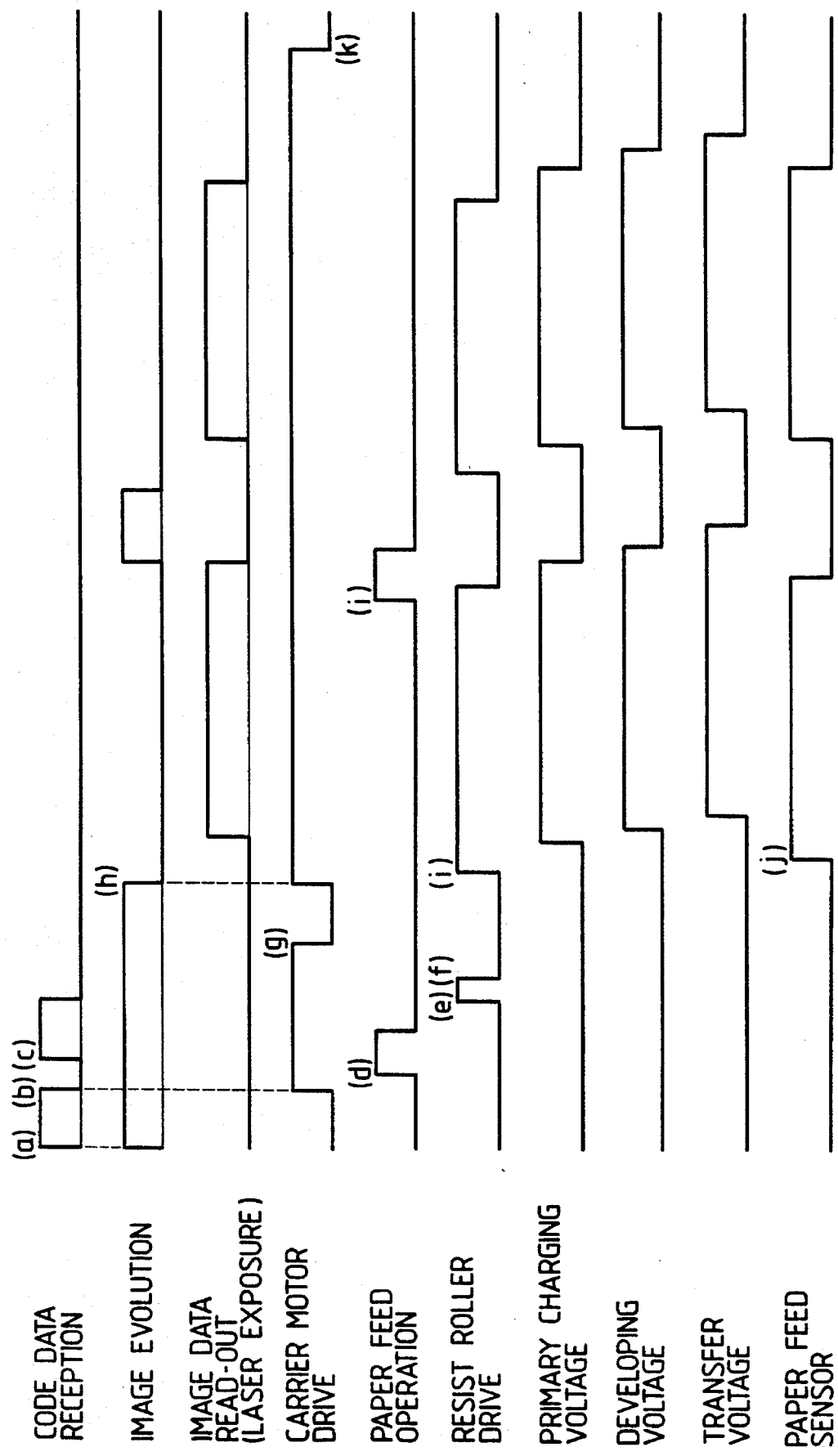
FIG. 16 is a timing chart showing an example of the function of the fourth embodiment.

In the following there will be explained the control sequence in the structure of FIG. 15, with reference to a timing chart shown in FIG. 16. Referring to FIG. 16, the sheet feeding is conducted at a timing (d), and the registration rollers 11 are activated at (e). Subsequently the registration rollers 11 are turned off at (f). The recording sheet 13 can be pinched between the registration rollers by the presence of a new period from (e) to (f).

After the image data evolution, the registration rollers 11 are activated again at (i), and the recording sheet 13 thereafter reaches the sheet feed sensor at (j). The supplies of high voltages and the exposure with the laser beam are effected, using the timing (j) as reference.

In the present 4th embodiment, as the recording sheet 13 stops as it is pinched between the registration rollers 11, the sheet feed sensor 30 is provided for compensating the fluctuation in the stop position of the recording sheet 13.

In the foregoing embodiments 1–4, if the image evolution is completed earlier, the recording sheet 13 with its leading end impinging on or pinched by the registration rollers 11 waits only momentarily for the registration, so that the sheet is not deformed in the nip of the rollers. However, if the image evolution requires a longer time, the recording sheet is subjected to deformation as it awaits the completion of the image evolution in a state in which the leading end is pinched by the registration rollers 11. Such phenomenon is marked in a condition of high temperature and high humidity, but, even under low humidity, the deformation still occurs because the portions of the recording sheet 13 not pinched by the registration rollers 11 contract by drying while the portion pinched by the rollers does not contract. Thus, the image transfer with a transfer charger may result in defects such as image blur or uneven image density because of insufficient contact between the photosensitive drum 2 and the recording sheet 13.

However, in the embodiments 1–4, as the image transfer is conducted with the transfer roller 10, sufficient contact is realized between the photosensitive drum 2 and the recording sheet 13 even if it is deformed, so that a defective image transfer can be avoided.

Figure 17:
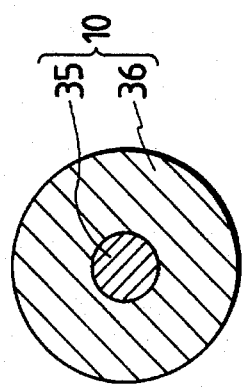
FIG. 17 is a cross-sectional view of a transfer roller 10.

The transfer roller 10 has, as shown in a cross-section in FIG. 17, a cylindrical core 35 composed of iron or stainless steel, and a solid or foamed elastic layer composed principally of urethane rubber, EPDM, neoprene rubber or silicone rubber. The elastic layer 36 has a volume resistivity of $10^5$–$10^{12}$ $\Omega$cm by dispersing carbon or zinc oxide therein. The transfer roller 10 presses the photosensitive drum 2 across the recording sheet 13, thereby forming a nip therebetween. The transfer roller 10 is given a voltage of a polarity opposite to that of the toner deposited on the photosensitive drum 2, and the toner is transferred onto the recording sheet 13 by the pressure of the transfer roller 10 and the electric field between the roller 10 and the photosensitive drum 2. The defective transfer can be avoided even if the recording sheet is somewhat deformed, because it contacts intimately with the photosensitive drum 2 by the pressure of the transfer roller 10 and the toner is attracted to the recording sheet 13 by the electric field.

[Embodiment 5]

Figure 18:
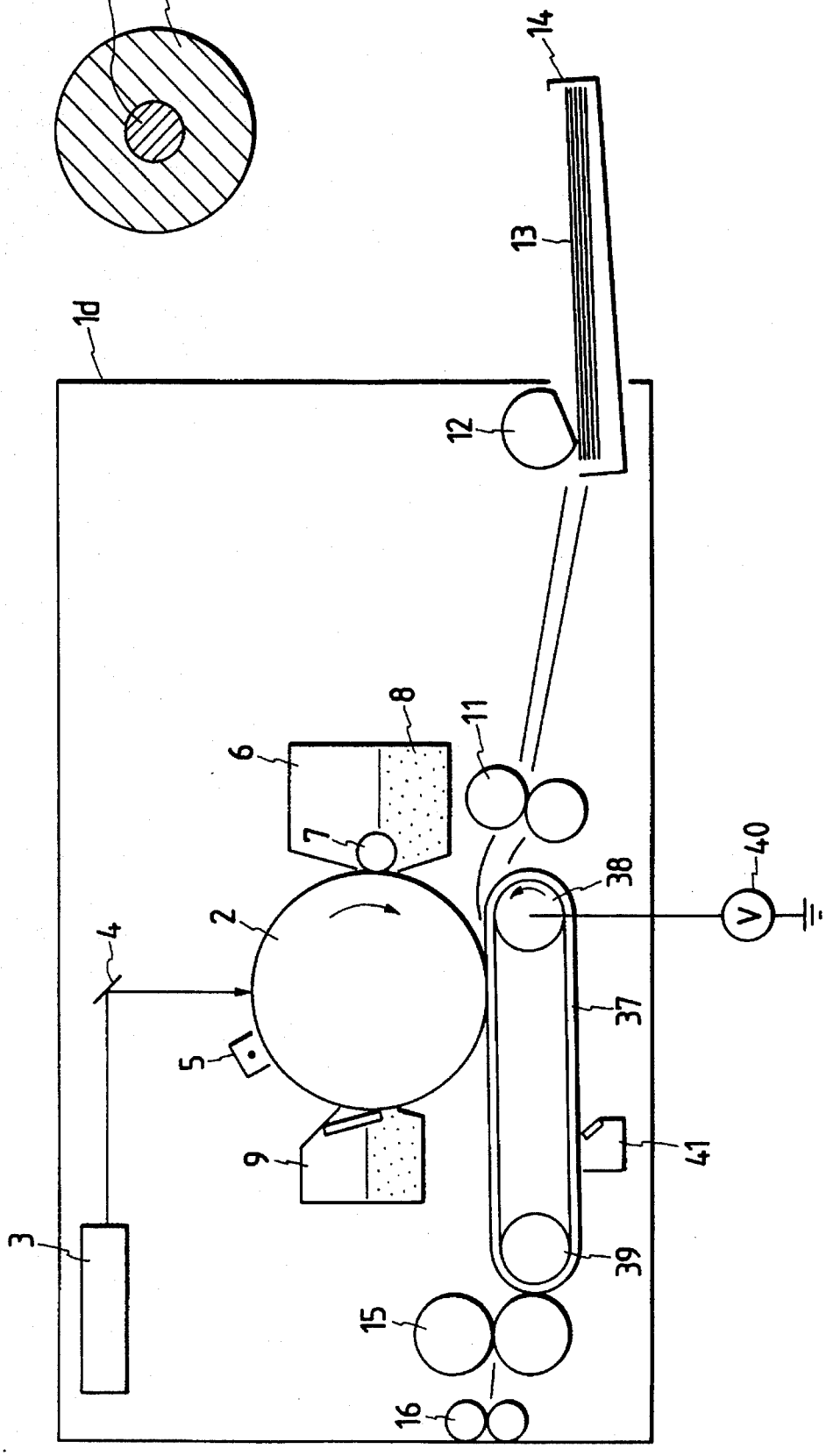
FIG. 18 is a cross-sectional view of a laser beam printer of a fifth embodiment.

FIG. 18 is a schematic view of an electrophotographic printer 1d constituting a 5th embodiment. The basic function and the electric structure of the present 5th embodiment is the same as those in the foregoing embodiments 1–4 except that the image transfer is conducted by a belt. In the following, therefore, there will only be explained the function featuring the present embodiment.

A belt 37 is supported between a roller 38 and an idler roller 39, and is driven by the roller 38 in turn driven by an unrepresented motor. The belt 37 is composed for example of urethane rubber, silicone rubber, EPDM or chloroprene in which a material of low resistance such as carbon is dispersed, so as to have a volume resistivity of $10^5$–$10^{12}$ $\Omega$cm. It is also possible to employ a multilayered structure composed of an insulating substrate and a conductive layer. The belt 37 is given, by a power source 40, a bias voltage of a polarity attracting the toner.

The recording sheet 13, which has been held at the registration rollers 11, is electrostatically attracted to the transfer belt 37 by the voltage applied thereto, and the toner image is transferred at the nip between the photosensitive drum 2 and the belt 37. After the image transfer, the recording sheet 13 is still transported by electrostatic attraction to the belt 37. Therefore the recording sheet 13, even if deformed somewhat, is smoothly transported in a state attracted by the belt 37, without image destruction by friction of the sheet 13 in the transport system or sheet jamming.

The belt 37 is then cleaned by a cleaner 41 and is used in the next cycle.

The recording sheet bearing the transferred image is fixed in the fixing unit 15 and is discharged by the discharge rollers 16 from the apparatus.

In the foregoing embodiments 1–5, the laser scan motor is stopped whenever the transport motor is stopped. However it is also possible to stop the transport motor only, if the laser scan motor has enough durability.

Also the foregoing embodiments 1–5 have been explained by an application to a laser beam printer, but the present invention is also applicable to a LED printer or a liquid crystal printer. In case of LED printer, the laser scanning unit is replaced by an LED array head, and, in case of a liquid crystal printer, the laser scan unit is replaced by a liquid crystal array head.

[Embodiment 6]

In the foregoing embodiments 1–5, the microprocessor 117 executes not only the reception of code information and the conversion of the code information into the image data, but also the mechanical control of the laser beam printer. In order to reduce the load of the microprocessor 117, the mechanical control of the laser beam printer may be executed by another independent microcomputer, as will be explained in the present embodiment.

Figure 19:
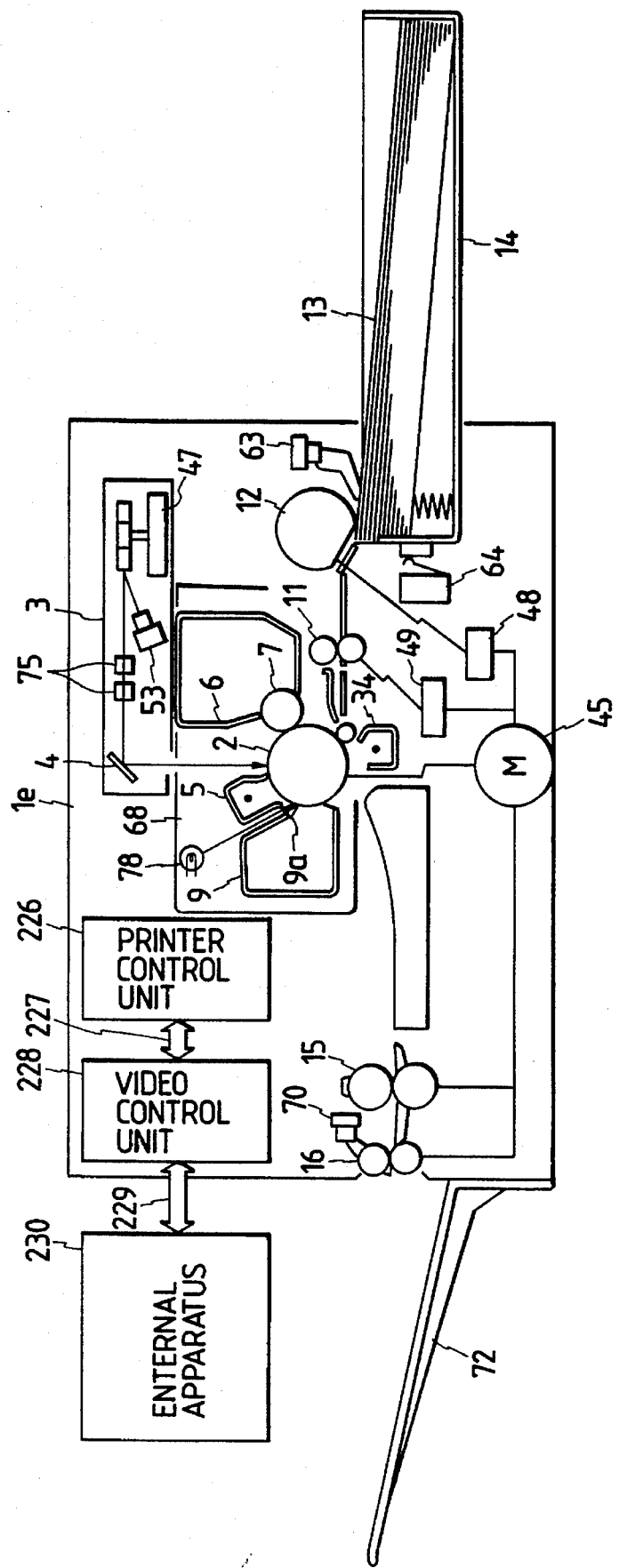
FIG. 19 is a cross-sectional view of a laser beam printer of a sixth embodiment.

FIG. 19 is a cross-sectional view of a laser beam printer 1e constituting a 6th embodiment.

The laser beam printer 1e is provided with a cassette 14 housing recording sheets 13; a cassette sheet sensor 63 for detecting the presence of recording sheet in the cassette 14; a cassette size sensor 64, composed of plural microswitches, for detecting the recording sheet 13 in the cassette 14; and a sheet feed roller 12 for advancing a recording sheet 13 from the cassette 14.

At the downstream side of the sheet feed roller 12, there are provided registration rollers 11 for advancing the sheet 13 in a synchronized manner; and then an image forming unit 68 for forming a toner image on the recording sheet 13, utilizing a laser beam from a laser scanning unit 3, to be explained later.

At the downstream side of the image forming unit 68, there are provided, in succession, a fixing unit 15 for thermally fixing the toner image formed on the recording sheet 13; a sheet discharge sensor 70 for detecting the state of sheet transportation; discharge rollers 16 for discharging the recording sheet 13; and a stacker tray 72 for receiving the recorded sheets 13.

The laser scanning unit 3 is composed of a semiconductor laser 53 for emitting a modulated laser beam based on an image signal VDO supplied from a video controller 128 to be explained later; a laser scanning motor 214 for scanning the photosensitive drum 2 with the laser beam from the semiconductor laser 53; imaging lenses 75; and a deflecting mirror 4.

The above-mentioned image forming unit 68 is composed, according to the known electrophotographic process, of a photosensitive drum 2; a pre-exposure lamp 78; a primary charger 5; a developing unit 6; a transfer charger 34; and a cleaner 9 with a cleaner blade 9a. A high voltage output circuit 51 to be explained later (FIG. 23) controls the primary charger 5, developing unit 6 and transfer charger 34 according to signals from a printer control unit 226.

A main motor 45 transmits rotation to the sheet feed roller 12 through a sheet feed clutch 48 and to the registration rollers 11 through a registration clutch 49, and also drives the photosensitive drum 2, fixing unit 15 and discharge rollers 16.

The printer control unit 226 for controlling the laser beam printer 1e is connected, through an interface 227, to the video controller 128, which is connected through a general-purpose interface 229, to an external apparatus 230.

FIG. 20 shows the structure relating to the interface 227.

Signals SBSY, CBSY, SC and CLK are used in handshake serial communication, according to a timing chart shown in FIG. 21.

A status busy signal SBSY is sent from the printer control unit 226 to the video controller 228.

A command busy signal CBSY is sent from the video controller 228 to the printer control unit 226.

A status/command data signal SC is sent, when the signal SBSY is true, as status data indicating the internal state of the printer, from the printer control unit 226 to the video controller 228, and, when the signal CBSY is true, as command data indicating the command from the video controller 228 to the printer control unit 226.

A synchronization clock signal CLK for the status/command data signal is sent from the video controller 228 to the printer control unit 226, or sent in a direction same as that of the signal SC.

In response to a command from the video controller 228, the printer control unit 226 returns a corresponding command.

Further referring to FIG. 20, a ready signal RDY assuming the true state when the printer control unit 226 is ready for printing, is sent from the printer control unit 226 to the video controller 228.

A print signal PRINT, sent from the video controller 228 to the printer control unit 226, assumes the true state when the video controller 228 instructs the start of a printing operation.

A vertical synchronization request signal VSREQ is used by the printer control unit 226 for requesting, to the video controller 228, the release of a vertical synchronization signal VSYNC to be explained later.

A vertical synchronization signal VSYNC is used for vertical synchronization (in sub scanning direction or sheet transporting direction) of the image signal sent from the video controller 228 to the printer control unit 226.

A horizontal synchronization signal HSYNC is used for horizontal synchronization (in main scanning direction or laser scanning direction) of the image signal sent from the printer control unit 226 to the video controller 228.

The aforementioned image signal VDO is serial dot data which are sent from the video controller 228 to the printer control unit 226, in synchronization with the signals VSYNC and HSYNC. The timings of the signals HSYNC and VDO are shown in FIG. 22. After a predetermined period $t_H$ from the shift of the signal HSYNC to the true state, image data of a scanning (hatched part in FIG. 22) are released as the signal VDO. This operation is repeated to effect the release of image signal of a page.

Figure 23:
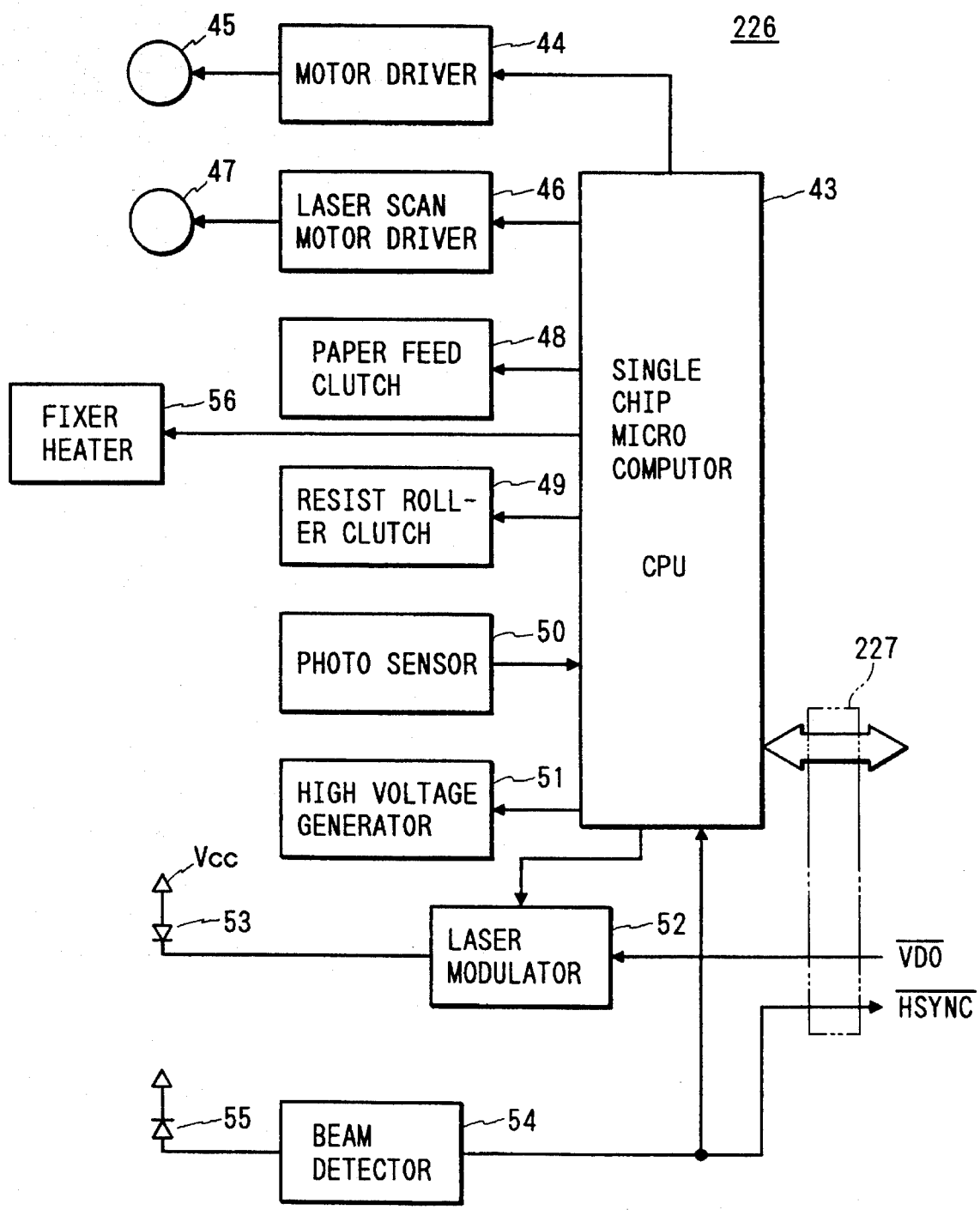
FIG. 23 is a block diagram of a printer control unit 226 in the sixth embodiment.

FIG. 23 is a block diagram showing the structure of the printer control unit 226 of the present embodiment.

The mechanical control of the laser beam printer is executed by a single-chip microcomputer (CPU) 43. Under the control of the video controller 228, the CPU 43 controls various loads, including a motor driver 44; a laser scanning motor driver 46; a sheet feed clutch 48; a registration roller clutch 49; a photosensor 30, a high voltage generator 51; a laser modulator 52; and a beam detector 54.

The VDO signal is supplied to the laser modulator 52 and used for modulating the laser beam emitted from the semiconductor laser 53. The laser beam scans the photosensitive drum 217 by the laser scanning mirror, and also enters the photodiode 55, of which detection signal is converted into a pulse signal by the beam detector 54. The pulse signal from the beam detector 54 is supplied, as the HSYNC signal, to the video controller 228.

Figure 24:
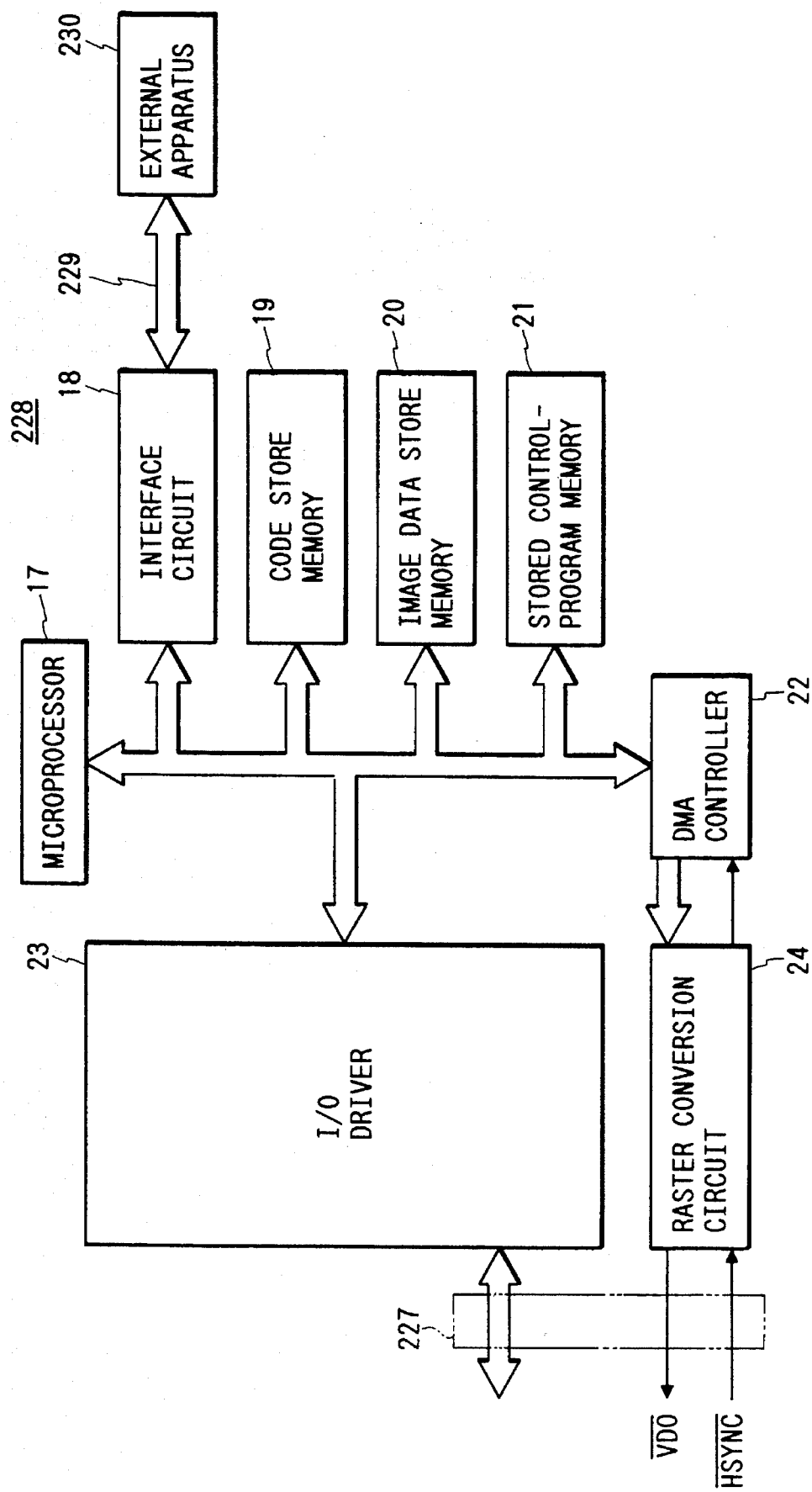
FIG. 24 is a block diagram of a video controller unit 228 in the sixth embodiment.

As shown in FIG. 24, the video controller 228 is provided for example, as shown in FIG. 24, a microprocessor 17, memories 19–21 and an I/O driver 23.

An external apparatus 230 such as a personal computer or a work station sends code information to the laser beam printer through a general-purpose interface such as Centronix or RS232C. The code information is received by an interface 18 in the laser beam printer, and then by the microprocessor 17 through an internal bus 28 which has united functions of control bus, address bus and data bus. The microprocessor 17 functions according to a control program stored in a memory 21 composed of a non-volatile ROM.

The microprocessor 17 stores the code information, obtained from the interface 18, after certain processing, in a memory 19 which is a RAM for code information storage. In addition to the storage mentioned above, the microprocessor 17 converts the code information into dot image data and stores the converted data into a memory 20 which is a RAM for image data storage (bit map memory). A DMA controller 22 reads the data stored in the memory 20 and sends the data to a raster conversion circuit 24. This DMA controller 22 can use the internal bus 28, independently from the microprocessor 17. Upon detection of image data of a page in the memory 20 (namely completion of conversion of code information of a page into image data), the microprocessor 17 activates the DMA controller 22, which sends the image data from the memory 20 to the raster conversion circuit 24 in response to the request therefrom, occupying the internal bus 28 alternately with the microprocessor 17. The raster conversion circuit 24 converts the parallel image data from the DMA controller 22 into serial image data, which are supplied, in synchronization with a horizontal synchronization signal, to a laser driver in a mechanical control unit 26 for modulating a laser beam.

In addition to the evolution of the code information into the image data, the microprocessor 17 sends various instructions for printing process to the mechanical control unit 26 of the laser beam printer. An I/O driver 23 functions as an interface between the microprocessor 17 and the mechanical control unit 26.

In the following there will be explained the state of interface signals and the control method of the microcomputer 43, with reference to FIG. 25. When the signal RDY is in the true state and the microprocessor 17 has received the code information of a page, the I/O driver 23 shifts the PRINT signal to false and the VSYNC signal to true (FIG. 25(a)), whereupon the microcomputer 43 activates the transport motor and the laser scanning motor (FIG. 25(b)). Subsequently, after a predetermined time, the sheet feed clutch is turned on (FIG. 25(c)).

When the microprocessor 17 has completed the image evolution of a page, the signal VSYNC is shifted to false and the signal PRINT is shifted to true (FIG. 25(d)). Subsequently, upon arrival of the fed sheet at the registration rollers, the microcomputer 43 shifts the signal VSREQ to the true state (FIG. 25(e)). Thus the I/O driver 23 knows the arrival of the sheet at the registration roller, and shifts the VSYNC signal to true while the PRINT signal is in the true state (FIG. 25(f)). Upon receiving the VSYNC signal in the true state, the microcomputer 43 shifts the VSREQ signal to false at (g).

After a predetermined time from the reception of the VSYNC signal in the true state at (f), the microcomputer 43 activates the registration rollers (FIG. 25(h)). Subsequently the microcomputer 43 turns on the high voltage for primary charger at (i), that for developing unit at (k), and that for transfer charger at (l). Also the microprocessor 17 activates the DMA controller 22 and releases the VDO signal at (j).

Figure 25:
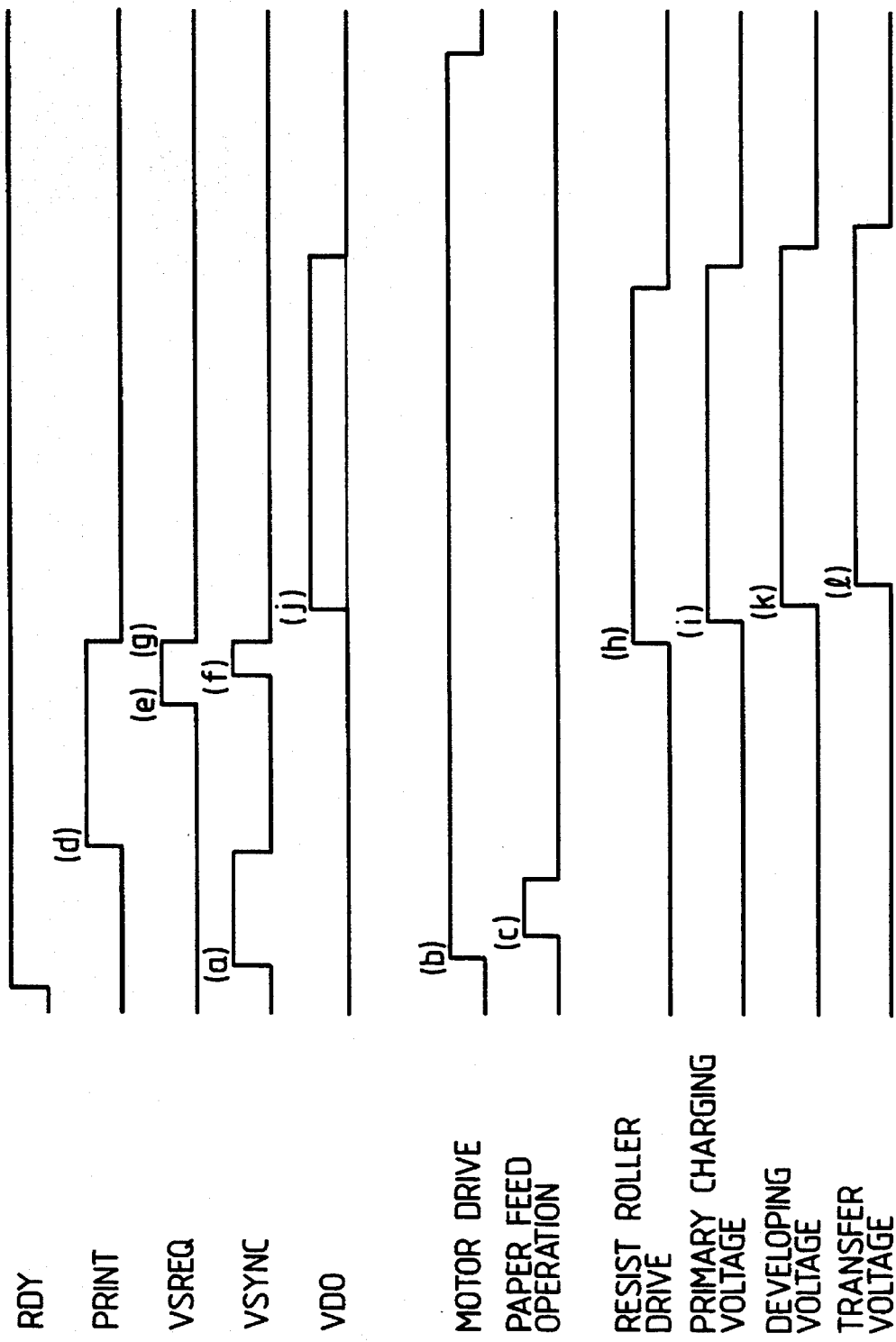
FIGS. 25 and 26 are timing charts showing an example of the function of the sixth embodiment.

FIG. 25 shows an example of function in case the time from the end of code information reception (at (a) in FIG. 25) to the end of image evolution (at (d) in FIG. 25) is short.

Figure 26:
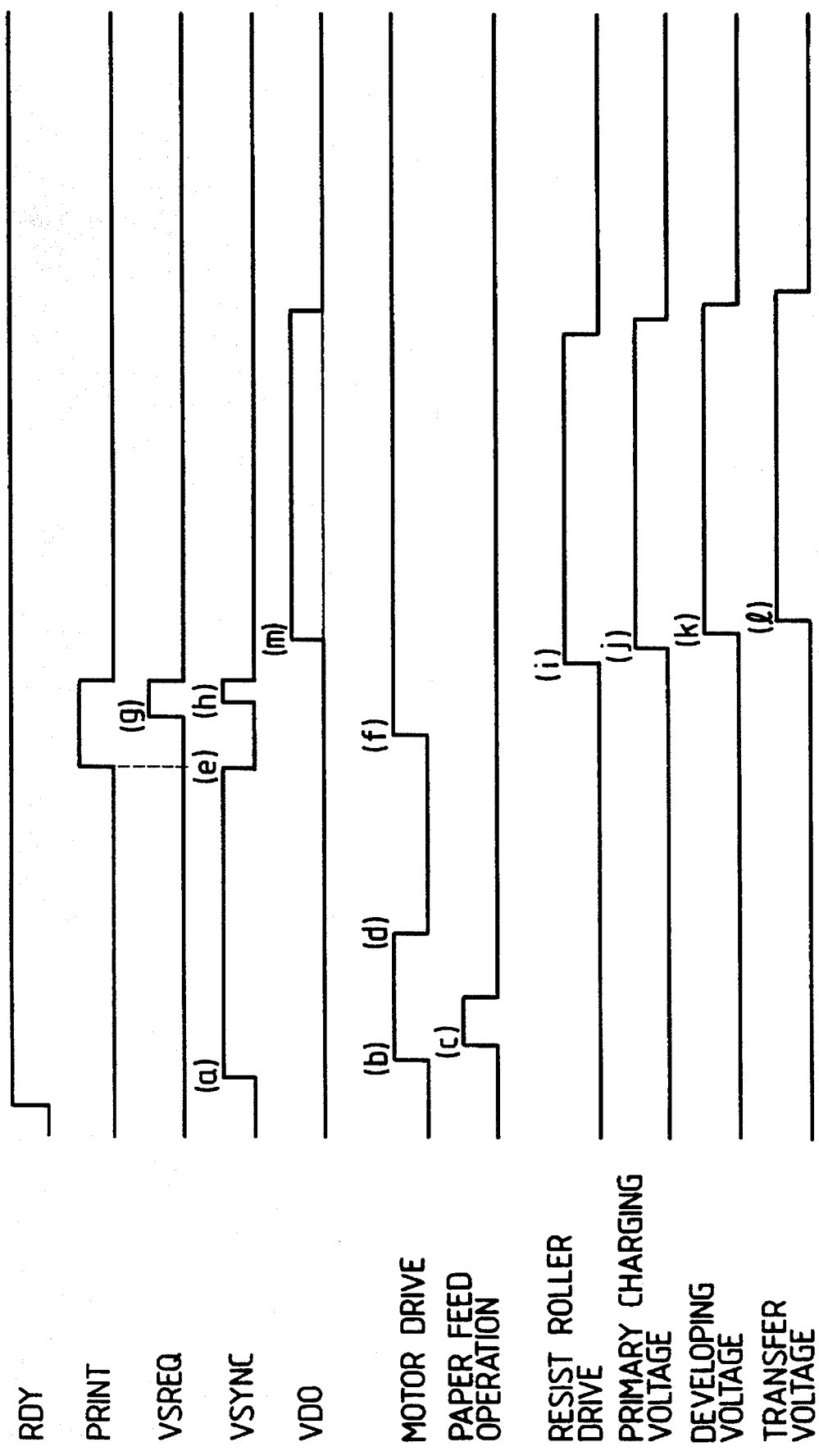

FIG. 26 shows an example of function in case the above-mentioned time is longer.

Referring to FIG. 26, if the true state of the PRINT signal cannot be detected after a predetermined from the sheet feeding operation at (c), the microcomputer 43 turns off the transport motor at (d). Subsequently, at the end of the image evolution, the I/O driver 23 shifts the VSYNC signal to false and the PRINT signal to true at (e). Then, the microcomputer 43 turns on the transport motor at (f), and turns on the VSREQ signal at (g) when the fed sheet stably reaches the registration rollers. The I/O driver 23 activates the registration rollers at (i), and subsequently releases the high voltages in succession.

Figure 27:
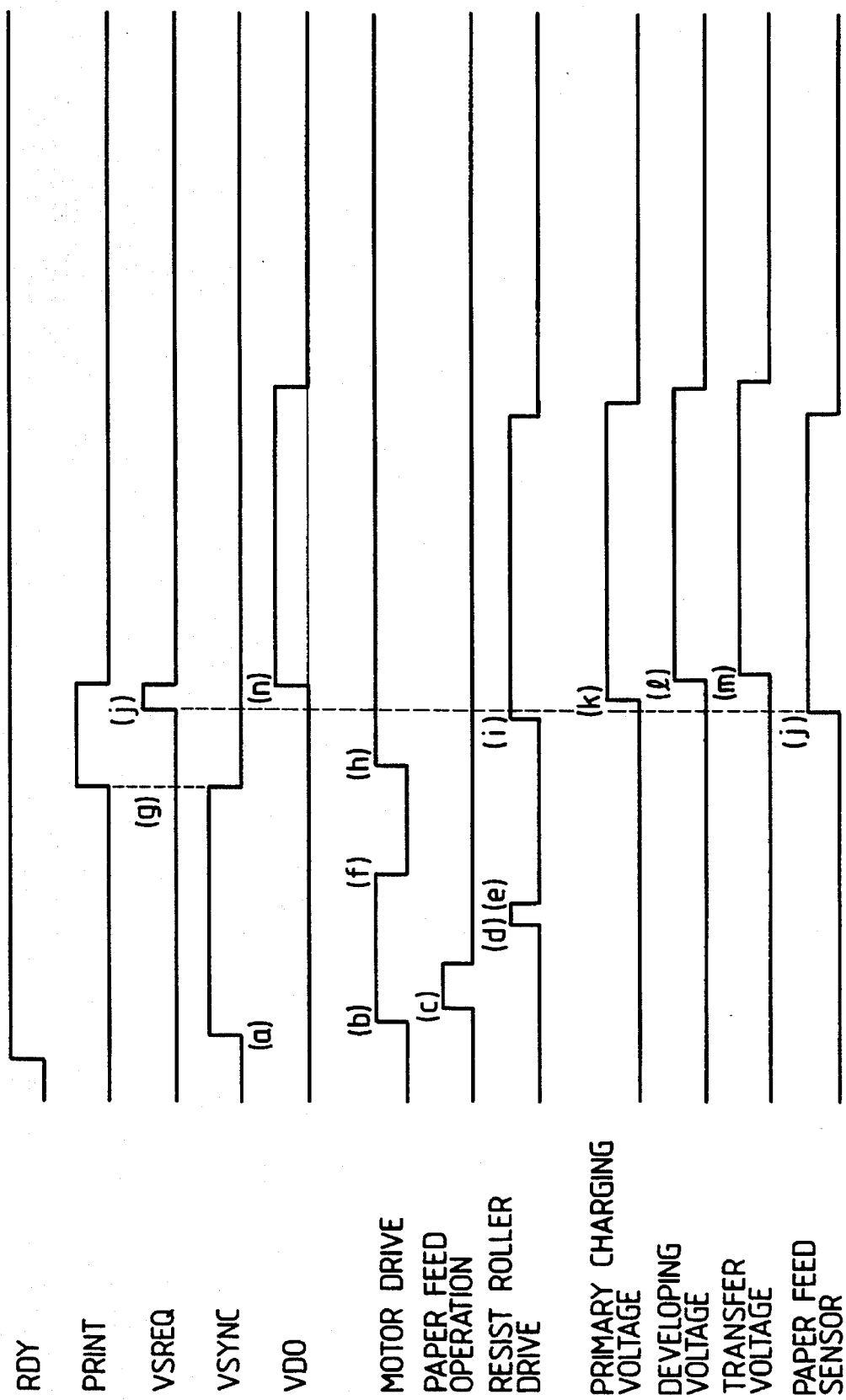
FIG. 27 is a timing chart showing an example of the function in a variation of the sixth embodiment.

In the foregoing there has been explained a control method in which the fed sheet is made to impinge on the registration rollers, thereby forming a loop in the sheet. However, in the foregoing 4th embodiment, there was explained a control method of not forming a loop in the sheet. Also in the present 6th embodiment, similar control as in the 4th embodiment can be achieved by giving instructions to the microcomputer 43 with the signals PRINT, VSREQ and VSYNC, as shown in a timing chart in FIG. 27. When the microprocessor 17 receives the code information of a page, the VSYNC signal is shifted to true while the PRINT signal is in the false state.

Upon receiving the VSYNC signal of the true state while the PRINT signal in the false state, at (a), the microcomputer 43 activates the transport motor at (b), and effects the sheet feeding at (c). Subsequently it activates the registration rollers at a timing (d) which is after a predetermined time, and then turns off the registration rollers at (e). In this state the fed sheet is stopped in a pinched state between the registration rollers. If the PRINT signal does not become true after a predetermined period from the stopping of the registration rollers, the motor is turned off at (f). Then, upon completion of the image evolution, the microprocessor 17 shifts tile VSYNC signal to false and the PRINT signal to true. The microcomputer 43 turns on the transport motor again at (h), and activates the registration rollers again at (i), whereby the sheet pinched between the registration rollers advances toward the paper feed sensor 30. When the leading end of the sheet passes through the paper feed sensor 30, the microcomputer 43 shifts the VSREQ signal to true at (j). When the microprocessor 17 detects the true state of the VSREQ signal, the DMA controller 22 releases the VDO signal in synchronization with the upshift of the VSREQ signal. Also the microcomputer 43 releases the high voltages in succession, in synchronization with the upshift of the VSREQ signal at (k) to (m) in FIG. 27.

The above-explained control sequence with the PRINT and VSYNC signals allows to achieve control similar to that of the 4th embodiment with the structure of the 6th embodiment shown in FIGS. 20 to 24.

In the 6th embodiment, the reception of the code information and the image evolution are conducted by the microprocessor 17, while the processes such as sheet transportation and high voltage control are conducted by the single-chip microcomputer 43. The I/O driver 23 and the microcomputer 43 are connected by the interface 227, and the sheet feeding and the sheet feed roller are controlled by three signals PRINT, VSREQ and VSYNC. These signals may be replaced by other serial signals. In such case, serial communication alone is conducted between the I/O driver 23 and the microcomputer 43, and the microprocessor 17 and the I/O driver 23 can control the microcomputer 43 by encoded information in the above-mentioned serial communication. It is also possible to effect the reception of code information and the image evolution by an external apparatus instead of the microprocessor 17 and to simplify the structure of the video controller 228.

In the above-explained laser beam printer, the on/off control of the transport motor is based on the timing of completion of image evolution of the code information to be printed. Consequently, a high throughput can be secured for the code information for which the image evolution can be completed within a short time. On the other hand, for the code information requiring a long time for image evolution, the photosensitive drum can be protected from the abrasion as the transport motor is stopped.

Also the sequence of the present 6th embodiment prevents the deterioration from unnecessary charge, because the photosensitive drum is maintained free of such charge after it is stopped.

[Embodiment 7]

Figure 28:
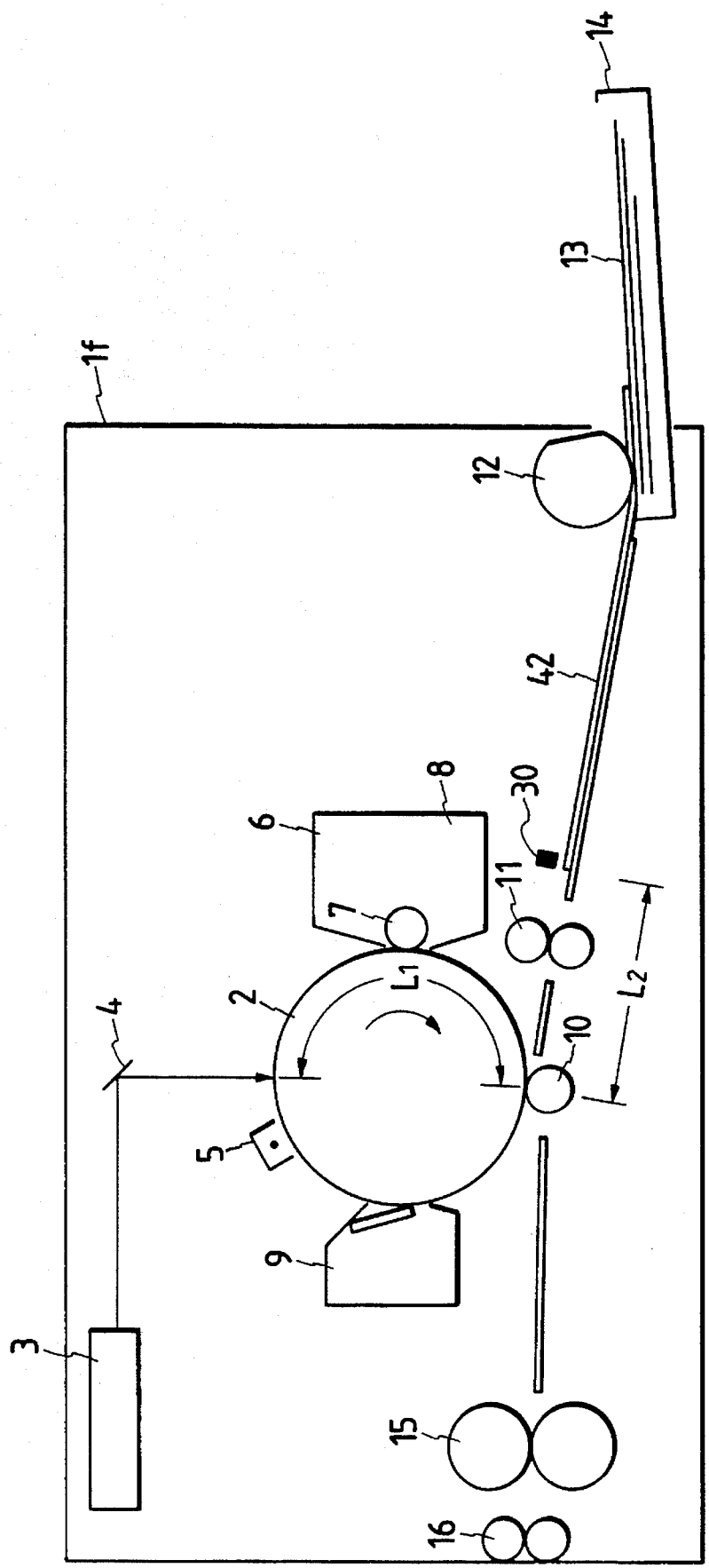
FIG. 28 is a cross-sectional view of a laser beam printer in a seventh embodiment.

FIG. 28 is a cross-sectional view of a laser beam printer of a 7th embodiment, which is same as the 3rd embodiment shown in FIG. 11, except for the sheet feeding portion.

In the structure shown in FIG. 28, the recording sheet 13 fed by the sheet feeding roller 12 is held while being pinched between the registration roller 11, at a position 42 detected by a photosensor such as the paper feed sensor 30. At this state, the sheet feed roller 12 is capable of immediately starting the sheet feeding.

Figure 29:
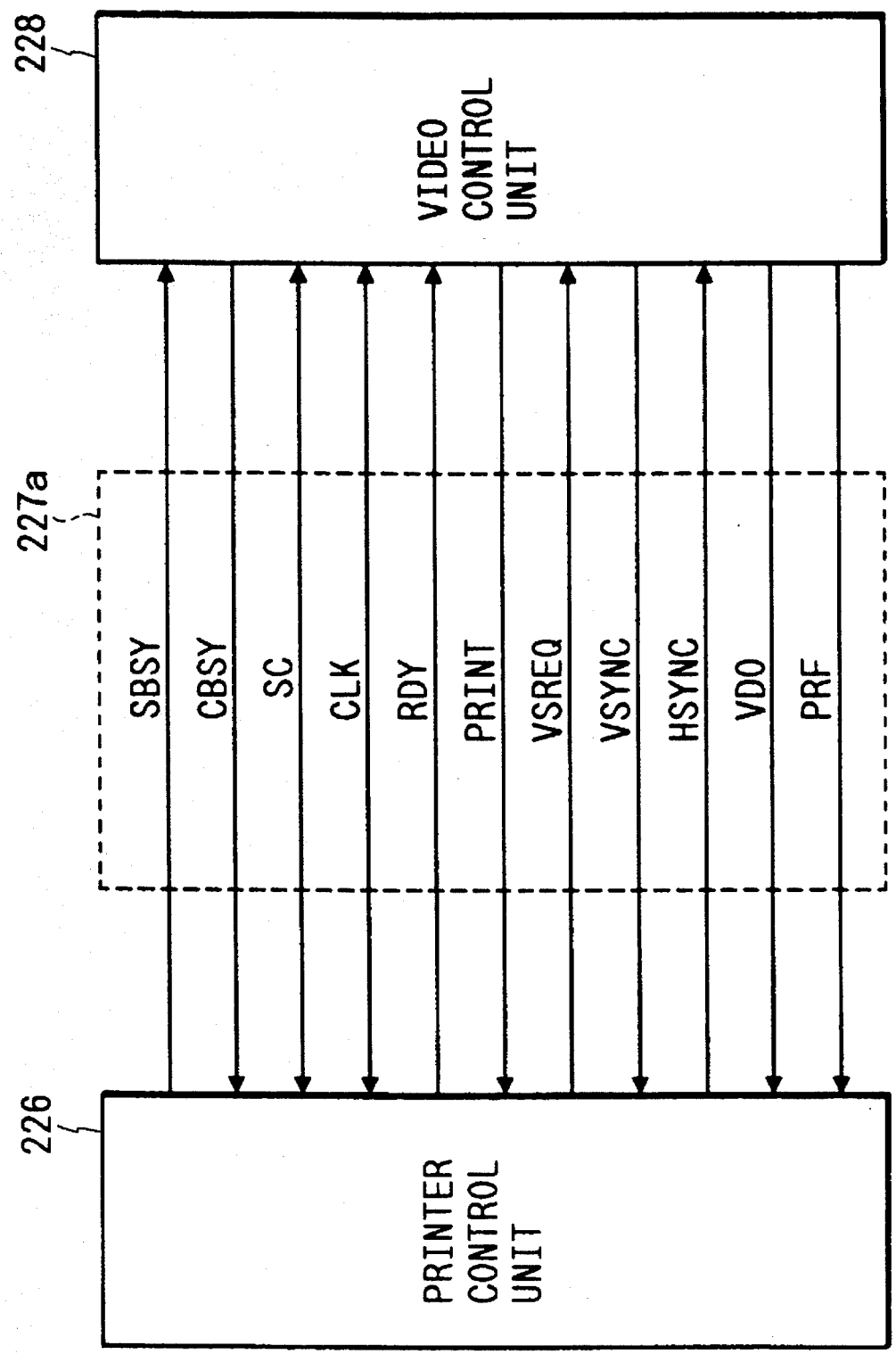
FIG. 29 is a block diagram relating to an interface 227a in the seventh embodiment.

FIG. 29 is a view of the structure relating to an interface 227a in the present 7th embodiment, which is different from the interface 227 in the foregoing 6th embodiment in the present of a line for a signal PRF to be sent from the video controller 228 to the printer control unit 226. The printer control unit 226 and the video controller 228 of the 7th embodiment are identical with those in the 6th embodiment, so that there will only be explained the functions featuring the 7th embodiment.

Figure 30:
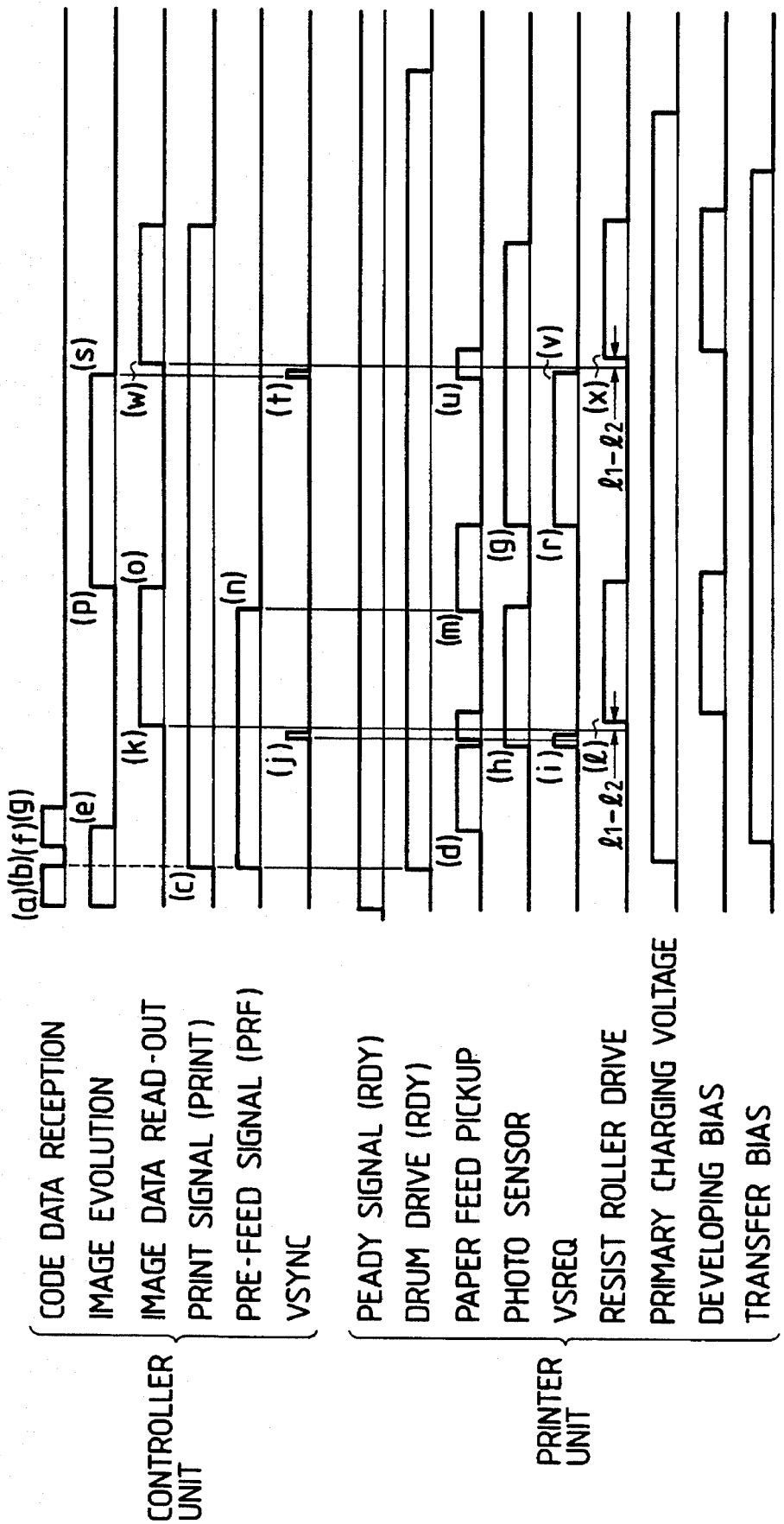
FIG. 30 is a timing chart showing an example of the function of the seventh embodiment.

FIG. 30 is a timing chart showing the functions of the laser beam printer of the 7th embodiment. When this printer is powered and is ready for receiving the print signal, the RDY signal supplied from the CPU 43 to the I/O driver 23 is in the true state. After the reception of code information of a page in a period (a) to (b), the I/O driver 23 supplies the CPU 43 with signals PRINT and PRF. In response, the printer control unit 226 activates the transport motor 45 and the laser scanning motor 47 at (c), and applies the high voltages for primary charger, transfer charger etc. in succession, thereby preparing for the reception of the image signal. Subsequently the paper feed clutch 48 is turned on to effect the sheet feeding at a timing (d). When the leading end of the sheet 13 reaches the photosensor 30, the output thereof is shifted to the H-level at (h), whereby the paper feed clutch 48 is turned off to terminate the sheet feeding operation, and the VSREQ signal is shifted to the true state at (i) in order to advise the I/O driver 23 that the image signal can be received. In response to the VSREQ signal, the I/O driver 23 releases the VSYNC signal indicating the start of an image at (j), then effects the image data read-out in a period (k) to (o) and sends the image data as the VDO signal to a laser modulating circuit 52.

When the printer unit 226 receives the VSYNC signal, the recording sheet 13 waiting in the position 42 is advanced to the registration rollers 11 by the re-activation of the sheet feed roller 12, then advanced toward the photosensitive drum 2 by the activation of the registration rollers 11 at a timing (l) so as to synchronize the leading end of the image with that of the recording sheet 13, and is subjected to image transfer by the transfer roller 10.

The PRF signal is in the true state, since the microprocessor 17 has already received the code information of the 2nd page in a period (f) to (g). Consequently, in the course of image data read-out and exposure for the 1st page, the printer control unit 226 effects the sheet feeding for the 2nd page at a timing (m). As the code information of the 3rd page has not been received, the video controller 228 shifts the PRF signal to false at (n). When the image data read-out for the 1st page is completed at (o), the image evolution of the 2nd page is started at (p).

When sheet 13 of the 2nd page reaches photosensor 30, the output thereof is shifted to the H-level at (q), and the VSREQ signal is shifted to the true state at (r).

If the image evolution requires a long time, the printer control unit 226 awaits the VSYNC signal from the I/O driver 23 in this state. When the image evolution is terminated at (s), the VSYNC signal is released at (t). Then the sheet feed roller 12 is activated at (u) and the registration rollers are activated at (x). When the image data read-out started at (w) is completed, the PRINT signal is shifted to false, whereby the printer control unit 226 enters the post-rotation step in which the high voltages for the transfer charger and primary charger, and the drum rotation are terminated in succession, whereby the sequence is terminated.

If the image evolution exceeds a predetermined time, the printer control unit 226 may enter the post-rotation step and thereafter stop for awaiting the completion of the image evolution.

The structure of the printer control unit 226 is principally based on the CPU 43 as in the 6th or 7th embodiment which allows it to deal with various page description languages, thereby providing flexibility.

Also since the printer control unit 226 effects the control on timing, the microprocessor 17 can function without consideration on the timing of sheet feeding, whereby the control can be simplified.

On the other hand, the waiting time of the recording sheet 13 tends to become longer, as there are conducted signal communications through the interface 227, 227a. However, in the structure of the 7th embodiment, the deformation of the recording sheet 13 in a prolonged hold is limited to the portion pinched by the sheet feed roller 12 and does not occur from the leading end portion to the central portion of the sheet, important in the sheet transportation. Consequently the possibility of sheet jamming is lowered. Besides the deformation in the rear portion of the sheet can be corrected in the nip of the transfer roller 10, so that image transfer failure resulting from defective contact of the sheet with the photosensitive drum can be prevented.

As explained in the foregoing, in the present 7th embodiment, the recording sheet 13 is advanced to a waiting position where the leading end of the sheet is distanced by $l_2$ ($>l_1$) from the transfer roller 10, in response to the reception of code information of a page. Then, after the image evolution, the recording sheet 13 is advanced to the transfer roller 10 in synchronization with the image formation. Consequently the throughput of the image recording can be improved in comparison with the case in which the recording sheet 13 is not advanced until the completion of the image evolution.

Even if the recording sheet 13 is deformed by a prolonged image evolution, the image transfer with the transfer roller 10 or the transfer belt 37 avoids defective image transfer such as image transfer failure, so that the quality of the recorded image does deteriorate.

[Embodiment 8]

In the foregoing embodiment 6 or 7, the photosensitive drum 2 is controlled by the printer control unit 226 when the image evolution requires a long time. In contrast, in the present 8th embodiment, the photosensitive drum 2 is controlled by instructions from the printer controller 228. The structure of the 8th embodiment is same as that of the 6th embodiment shown in FIGS. 19 to 24, and will not, therefore, be explained further.

In the following there will be explained the function featuring the 8th embodiment, with reference to flow charts shown in FIGS. 31 and 32, and a timing chart shown in FIG. 33.

Figure 31:
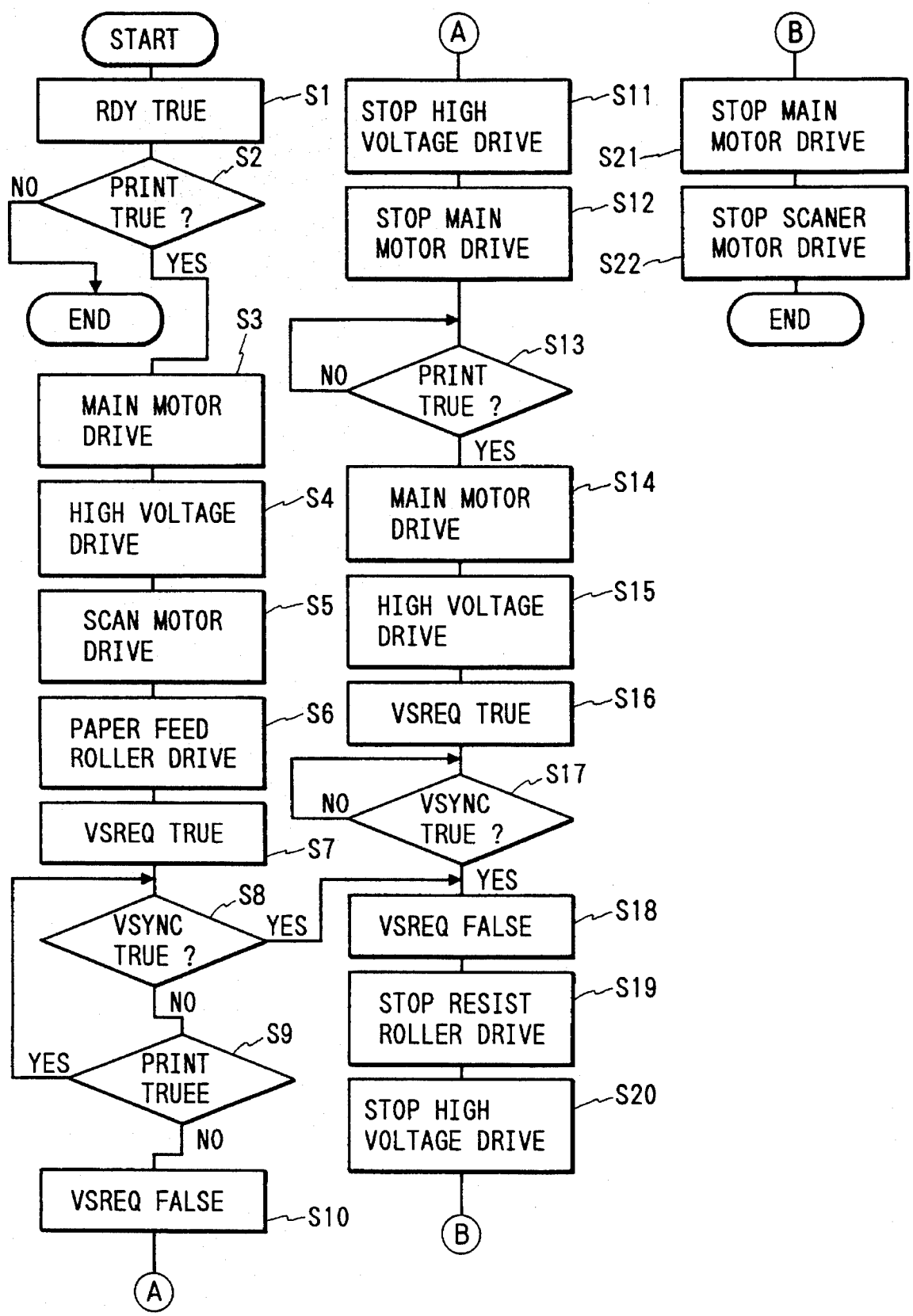
FIGS. 31 and 32 are flow charts showing the function of an eighth embodiment.
Figure 32:
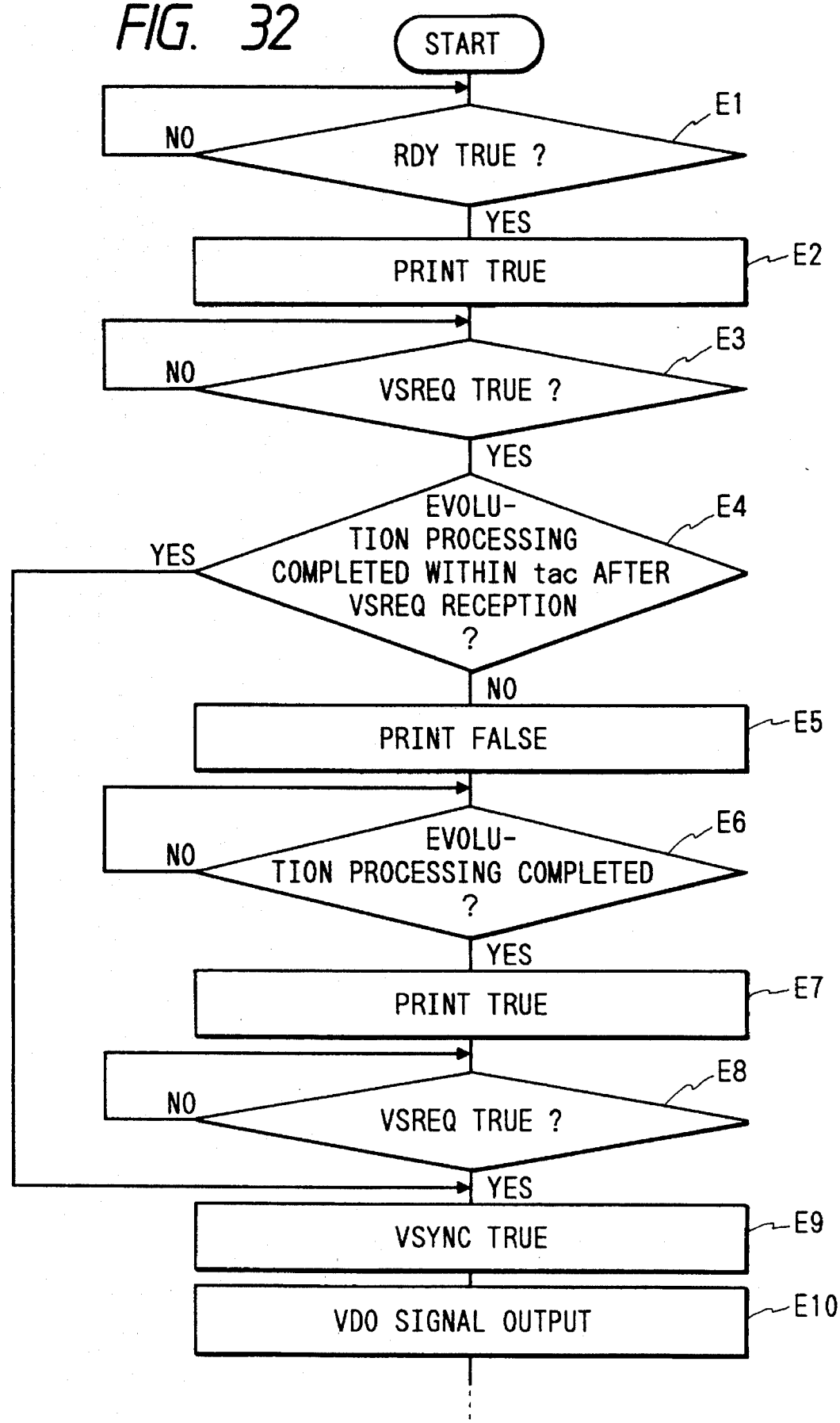

FIG. 31 shows the control sequence of the printer control unit 226, while FIG. 32 shows the control sequence of the video controller 228.

At first in a step S1 in FIG. 31, when the laser beam printer enters a state capable of printing operation, the printer control unit 226 shifts the RDY signal to true.

On the other hand, the video controller 228, after confirming the true state of the RDY signal in a step E1 in FIG. 31, shifts the PRINT signal to the true state (step E2).

After shifting the RDY signal to true and confirming the true state of the PRINT signal (step S2), the printing control unit 226 activates a main motor 45 (step S3), then supplies high voltages to the primary charger 5, developing unit 6 and transfer charger 34 (step S4), and activates the laser scanning motor 47 (step S5).

After a time t11 enough for the laser scan motor 47 to reach constant revolution, the paper feed clutch 48 is turned on to drive the sheet feed roller 12, thereby feeding the recording sheet 13 toward the registration rollers 11. At a time t11+t12 when the leading end of the sheet 13 reaches the registration rollers 11, the paper feed clutch 48 is turned off (step S6). In the meantime, a high voltage sequence is conducted on the photosensitive drum 2 for maintaining the image quality. Thereafter the VSREQ signal is shifted to true (step S7), and the true state of the VSYNC signal from the video controller 228 is awaited.

The video controller 228, if capable of releasing the VDO signal by completing the conversion of the image information into dot data, namely if capable of releasing the VSYNC signal within a predetermined time ($t_ac$) after the reception of the VSREQ signal in the step E3, proceeds from a step E4 to a step E9 to shift the VSYNC signal to true state, and to start the release of the VDO signal of a page after a time $t_v1$ (step E10). In this case, the printer control unit 226 proceeds from a step S8 to S18 for effecting the recording on the recording sheet as will be explained later.

Figure 33:
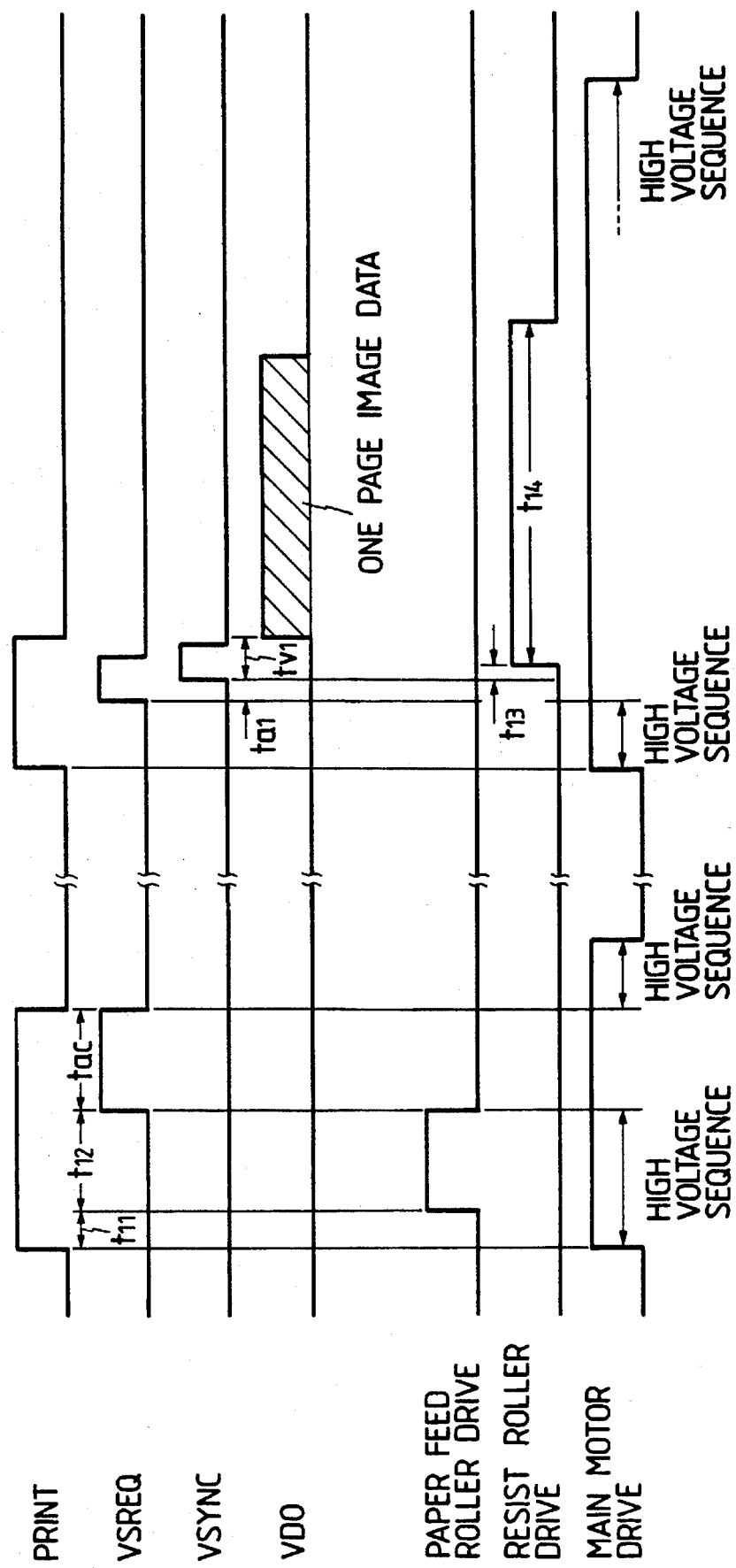
FIG. 33 is a timing chart showing an example of the function of the eighth embodiment.

On the other hand, if the video controller 228 is incapable of releasing the VSYNC signal as the image evolution is not completed within the time $t_ac$ from the reception of the VSREQ signal at the step E3 as shown in FIG. 33, the sequence proceeds from the step E4 to E5 in which the video controller 228 shifts the PRINT signal to false.

After shifting the VSREQ signal to true and upon receiving the PRINT signal in the false state, the printer control unit 226 proceeds from steps S8, S9 to a step S10 for shifting the VSREQ signal to false. Then, after the high-voltage sequence, it terminates the high voltages in succession (step S11), and stops the main motor 45 (step S12), whereby the photosensitive drum 2 is also stopped. The printer control unit 226 and the image forming unit 68 enter the standby state and await the PRINT signal to assume the true state again (step S13).

The video controller 228, if capable of releasing the VDO signal after the image evolution, namely if capable of releasing the VSYNC signal, proceeds from a step E6 to E7 for shifting the PRINT signal to true. Then, when the VSREQ signal in the true state is received in the step E8, the VSYNC signal is shifted to true after a time $v_a1$, shorter than $t_a c$ (step E9). In synchronization therewith and after a time $t_v 1$, there is started the release of the VDO signal consisting of image data of a page (hatched portion in FIG. 33) (step E10).

On the other hand, the printer control unit 226, after receiving the PRINT signal of the true state in a step S13, activates the main motor 45 (step S14), and activates the high voltages in succession thereby starting the high voltage sequence (step S15). After this high voltage sequence, the printer control unit 226 shifts the VSREQ signal to true (step S16) and awaits the entry of the VSYNC signal in the true state (step S17).

The printer control unit 226, after confirming the true state of the VSYNC signal, shifts the VSREQ signal to false (step S18), and, after a time t13, turns on the registration roller clutch 49 thereby activating the registration rollers 11 and advancing the recording sheet 13 to the image forming unit 68. Then, at time t13+t14, the registration roller clutch 49 is turned off (step S19).

In the step S19, the printer control unit 226 sends the HSYNC signal to the video controller 228 at a predetermined timing synchronized with the scanning of the laser beam, and modulates the laser beam from the semiconductor laser 53 according to the VDO signal, thereby effecting the image recording by the image forming unit 68.

Subsequently, after the high voltage sequence, the high voltages are terminated in succession (step S20). When the rear end of the sheet 13 passes through the sheet discharge sensor 70, the main motor 45 is stopped (step S21). Subsequently the laser scan motor 47 is stopped (step S22), whereby the function of the printer is terminated.

[Embodiment 9]

In the foregoing 8th embodiment, after the release of the VSREQ signal, the printer control unit 26 stops the main motor 45 based on the false state of the PRINT signal from the video controller 226, whereby the photosensitive drum 2 is prevented from abrasion even when the image evolution requires a long time.

Figure 34:
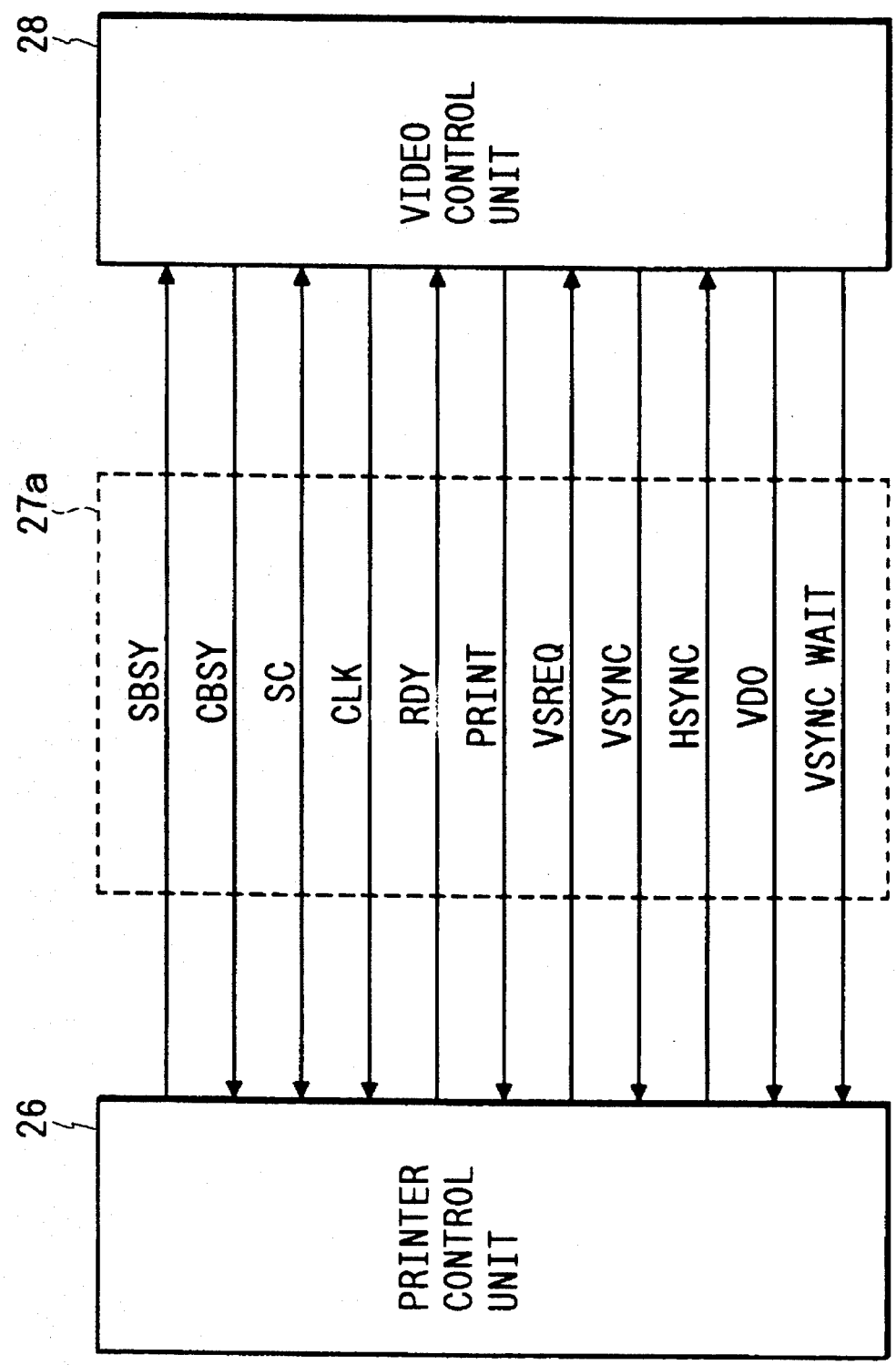
FIG. 34 is a block diagram relating to an interface 228a in a ninth embodiment.

FIG. 34 shows a structure relating to an interface 227b of the present 9th embodiment, featured by the addition of a signal line VSYNC WAIT for controlling the drive of the photosensitive drum 2. Other parts of the 9th embodiments are the same as those of the 8th embodiment.

In the following there will be explained the function of the present 9th embodiment, with reference to flow charts in FIGS. 35 and 36, and a timing chart in FIG. 37.

Figure 35:
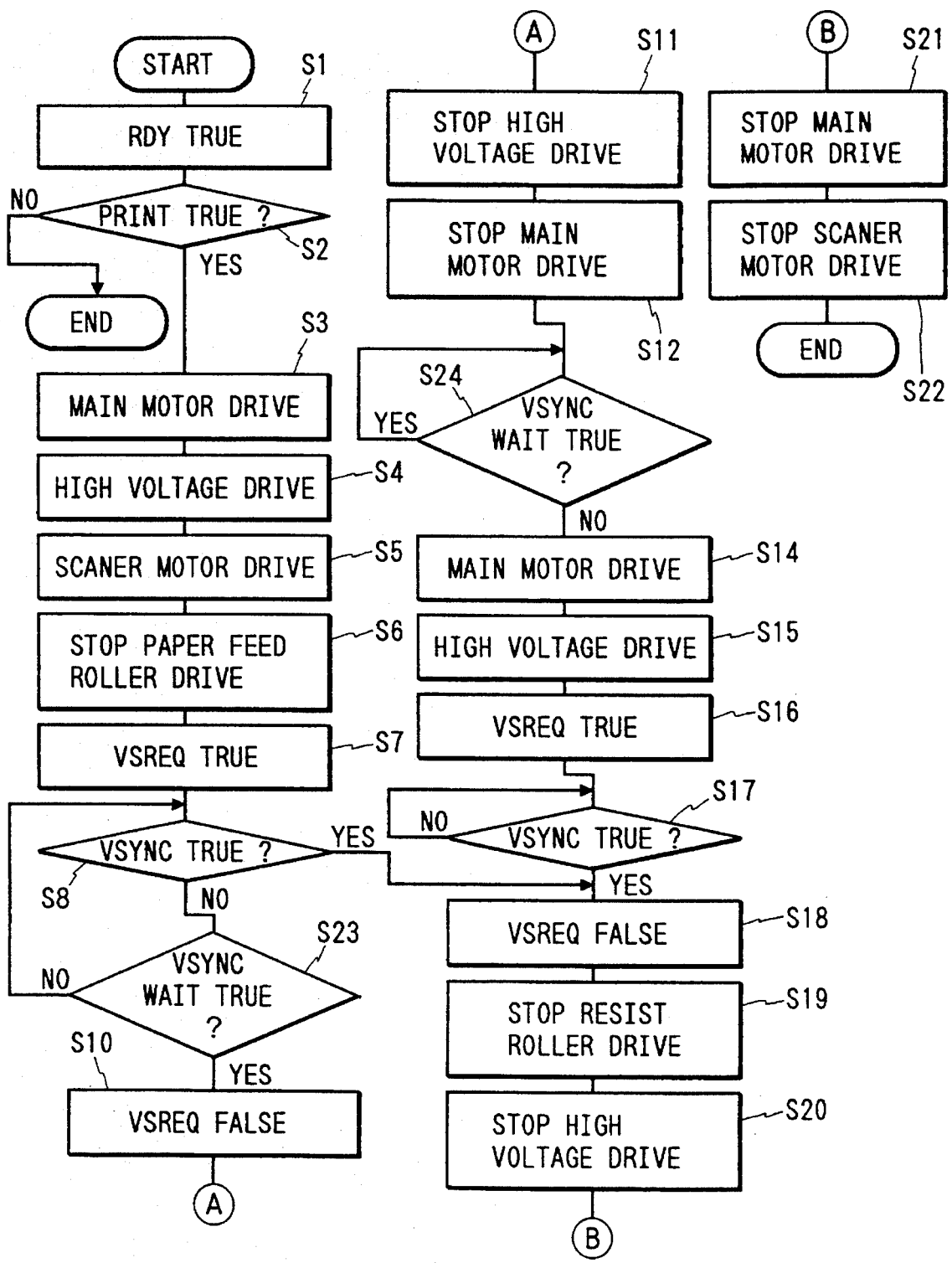
FIGS. 35 and 36 are flow charts showing the function of the ninth embodiment.
Figure 36:
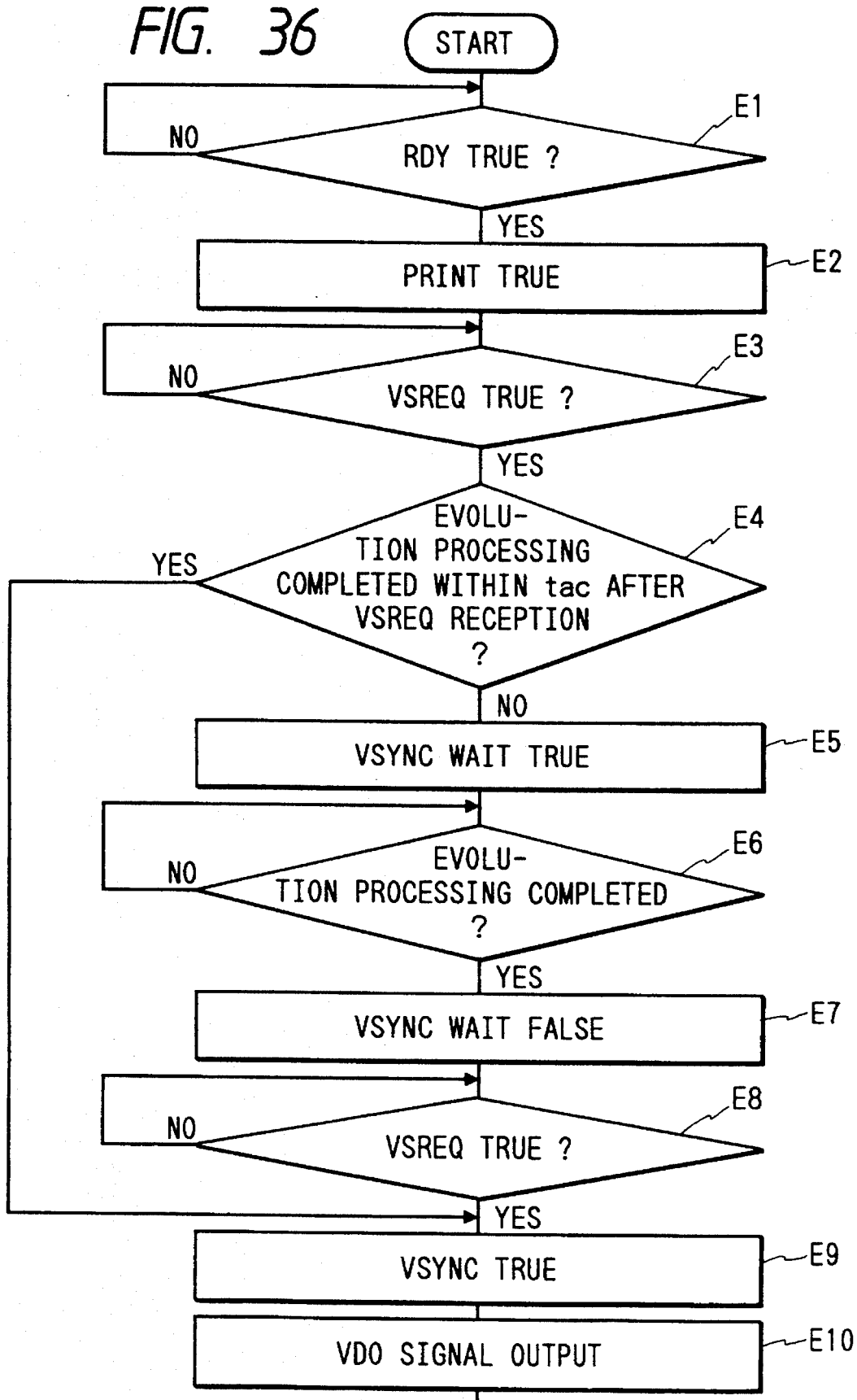

FIG. 35 shows the function of the printer control unit 226 shown in FIG. 23, while FIG. 36 shows the function of the video controller 228 shown in FIG. 24.

At first, in a step Si in FIG. 35, the printer control unit 226 shifts the RDY signal to true when the printing is enabled.

On the other hand, the video controller 228, after confirming the true state of the RDY signal in a step E1 in FIG. 36, shifts the PRINT signal to the true state (step E2).

After the shifting of the RDY signal to true state (step S1) and after confirming the true state of the PRINT signal (step S2), the printing control unit 226 activates the main motor 45 (step S3), then supplies high voltages to the primary charger 5, developing unit 6 and transfer charger 34 (step S4), and activates the laser scan motor 47 (step S5).

Then, after a time t11 enough for the laser scan motor 47 to reach constant revolution, the paper feed clutch 48 is turned on to drive the sheet feed roller 12, thereby feeding the recording sheet 13 toward the registration rollers 11. At a t11+t12 when the leading end of the sheet 13 reaches the registration rollers 11, the paper feed clutch 48 is turned off (step S6). In the meantime, a high voltage sequence is conducted on the photosensitive drum 2 for maintaining the image quality. Thereafter the VSREQ signal is shifted to true state (step S7), and the true state of the VSYNC signal from the video controller 228 is awaited.

The video controller 228, if capable of releasing the VDO signal by completing the conversion of the image information into dot data, namely if capable of releasing the VSYNC signal with a predetermined time $t_a c$ after the reception of the VSREQ signal in the step E3, proceeds from a step E4 to E9 to shift the VSYNC signal to the true state, and to start the release of the VDO signal of a page after a time $t_v 1$ (step E10). In this case, the printer control unit 226 proceeds from step S8 to S18 for effecting the recording on the sheet 13 as will be explained later.

Figure 37:
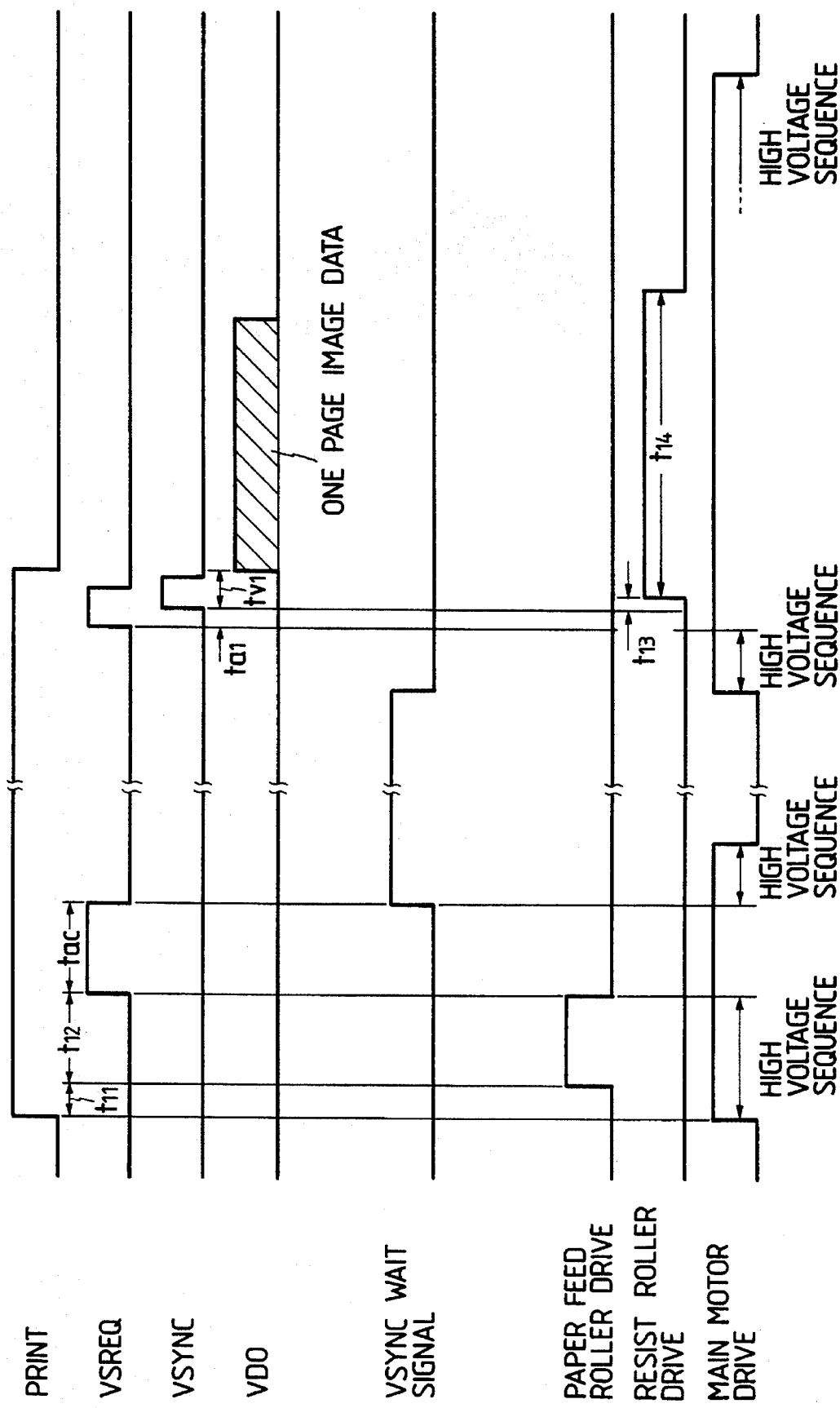
FIG. 37 is a timing chart showing an example of the function of the ninth embodiment.

On the other hand, if the video controller 228 is incapable of releasing the VSYNC signal as the image evolution is not completed within the time $t_a c$ from the reception of the VSREQ signal at the step E3 as shown in FIG. 37, the sequence proceeds from the step E4 to E5 in which the video controller 228 shifts the VSYNC WAIT signal to the true state.

After shifting the VSREQ signal to true and upon receiving the VSYNC WAIT signal of the true state, the printer control unit 226 proceeds from steps S8, S23 to a step S10 for shifting the VSREQ signal to false. Then, after the high-voltage sequence, it terminates the high voltages in succession (step S11), and stops the main motor 45 (step S12), whereby the photosensitive drum 2 is also stopped. The printer control unit 226 and the image forming unit 68 enter the standby state and await the VSYNC WAIT signal to assume the false state again (step S24).

The video controller 228, if capable of releasing the VDO signal after the image evolution, namely if capable of releasing the VSYNC signal, proceeds from a step E6 to E7 for shifting the VSYNC WAIT signal to false. Then, when the VSREQ signal of the true state is received in a step E8, the VSYNC signal is shifted to true after a time $t_a 1$, shorter than $t_a c$. In synchronization therewith and after a time $t_v 1$, there is started the release of the VDO signal consisting of image data of a page (hatched portion in FIG. 37) (step E10).

On the other hand, upon receiving the VSYNC WAIT signal of the false state in a step S24, the printer control unit 226 activates the main motor 45 (step S14), and activates the high voltages in succession thereby starting the high voltage sequence (step S15). After this high voltage sequence, the printer control unit 226 shifts the VSREQ signal to true (step S16) and awaits the entry of the VSYNC signal of the true state (step S17).

The printer control unit 226, after confirming the true state of the VSYNC signal, shifts the VSREQ signal to false (step S18), and, after a time t13, turns on the registration roller clutch 49 thereby activating the registration rollers 11 and advancing the recording sheet 13 to the image forming unit 68. Then, at time t13+t14, the registration roller clutch 49 is turned off (step S19).

In the step S19, the printer control unit 226 sends the HSYNC signal to the video controller 228 at a predetermined timing synchronized with the scanning of the laser beam, and modulates the laser beam from the semiconductor laser 53 according to the VDO signal, thereby effecting the image recording by the image forming unit 68.

Subsequently, after the high voltage sequence, the high voltages are terminated in succession (step S20). When the rear end of the sheet 13 passes through the sheet discharge sensor 70, the main motor 45 is stopped (step S21). Subsequently the laser scan motor 47 is stopped (step S22), whereby the function of the printer is terminated.

In the present 9th embodiment, if the image evolution in the video controller requires a long time, namely if there is a long interval from the release of the VSREQ signal by the printer control unit 226 to the release of the VSYNC signal by the video controller 228, the photosensitive drum 2 is stopped by a signal from the video controller 228. It is therefore rendered possible to avoid unnecessary rotation of the photosensitive drum 2, thereby minimizing the abrasion thereof.

[Embodiment 10]

The foregoing 8th and 9th embodiments are to avoid abrasion of the photosensitive drum 2 by stopping the drum after the feeding of the recording sheet 13 in the case where image evolution requires a long time. However, if the image evolution requires an extremely long time, the recording sheet 13 may develop curling, as shown in FIG. 14, or distortion by the contact of the registration rollers 11. Such sheet deformation may lead to sheet jamming. The present 10th embodiment is to resolve such drawback, by prohibiting the image formation on the recording sheet 13 already fed in case the time required for image evolution exceeds a certain predetermined time.

The structure of the 10th embodiment will not be explained as it is same as that of the foregoing 6th embodiment shown in FIGS. 19 to 24, and, in the following, there will be explained the function of the 10th embodiment, in which the signals RDY, PRINT, VSREQ, VSYNC, HSYNC and VDO are active in the low-level and are represented by $\overline{RDY}$, $\overline{PRINT}$, $\overline{VSREQ}$, $\overline{VSYNC}$, $\overline{HSYNC}$ and $\overline{VDO}$.

Figure 38:
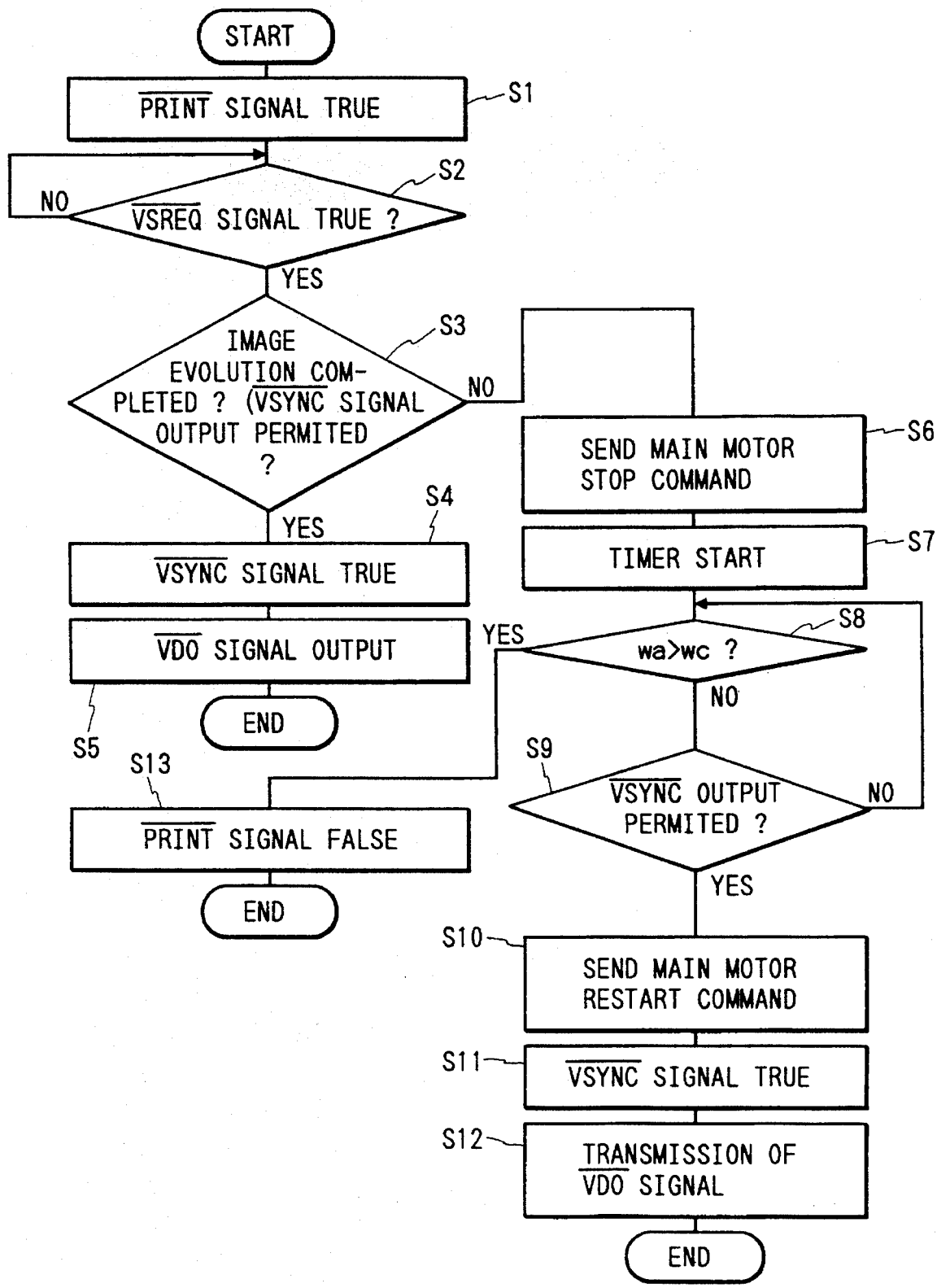
FIGS. 38 and 39 are flow charts showing the function of a tenth embodiment.
Figure 39:
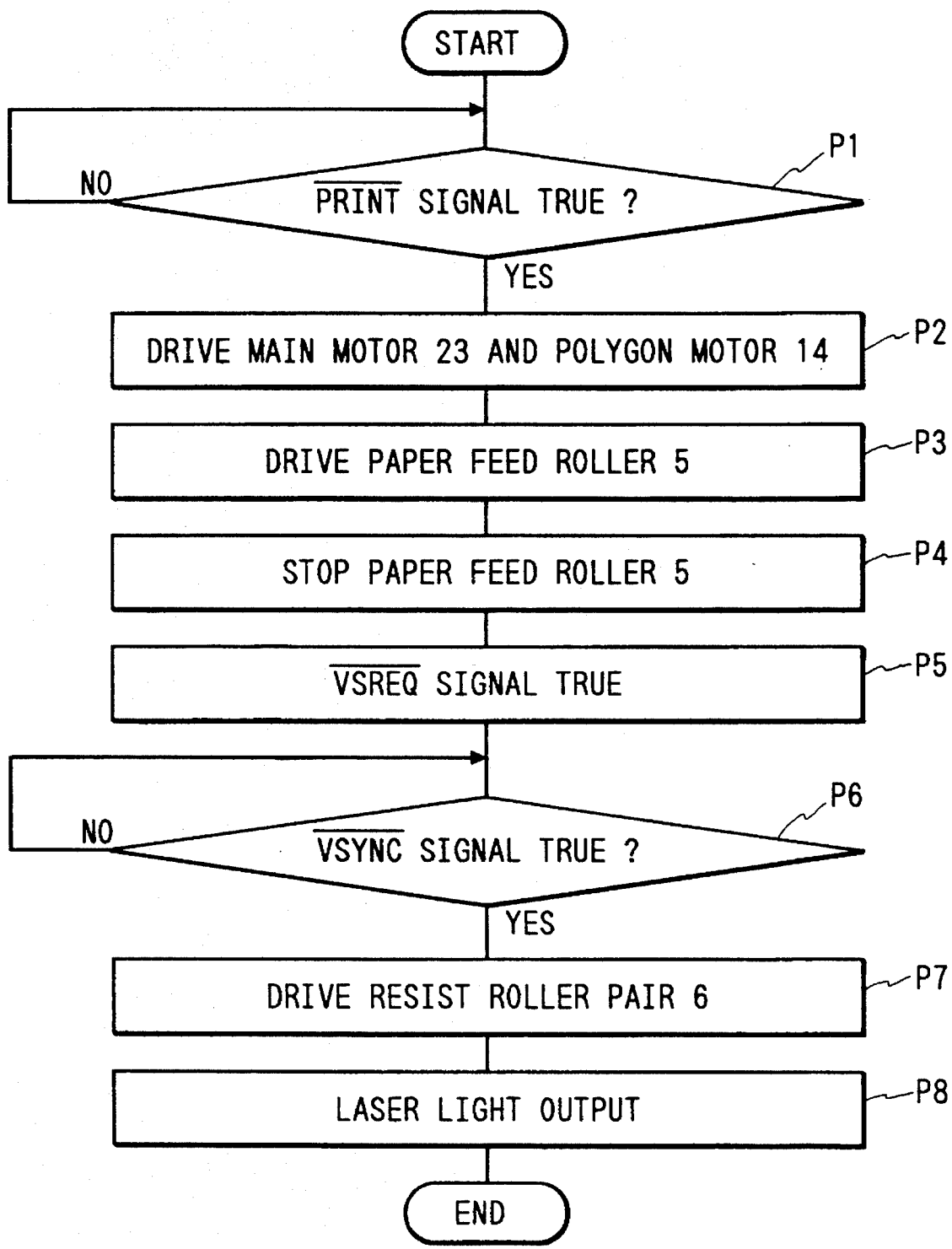
Figure 40:
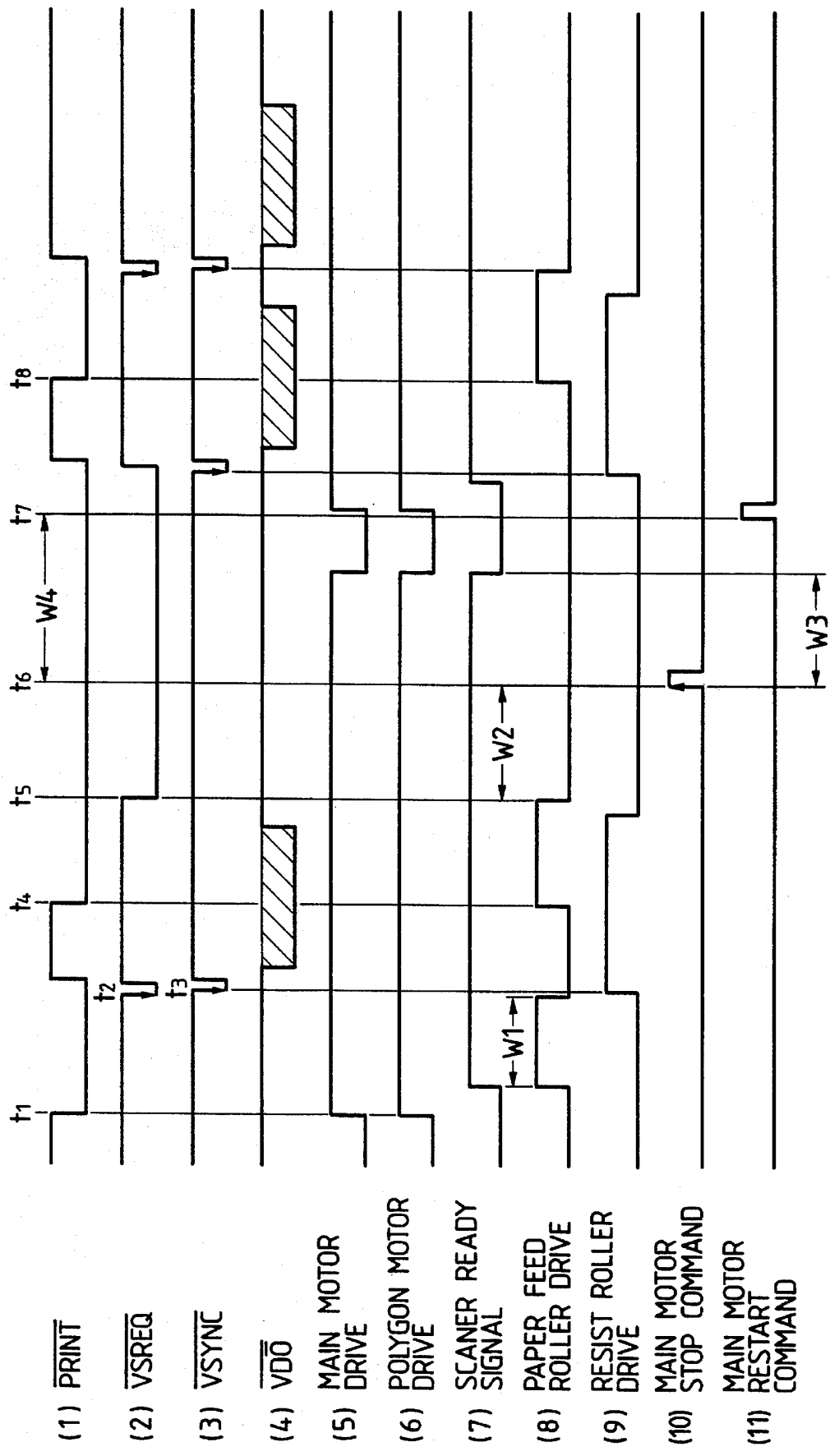
FIGS. 40 and 41 are timing charts showing an example of the function of the tenth embodiment.
Figure 41:
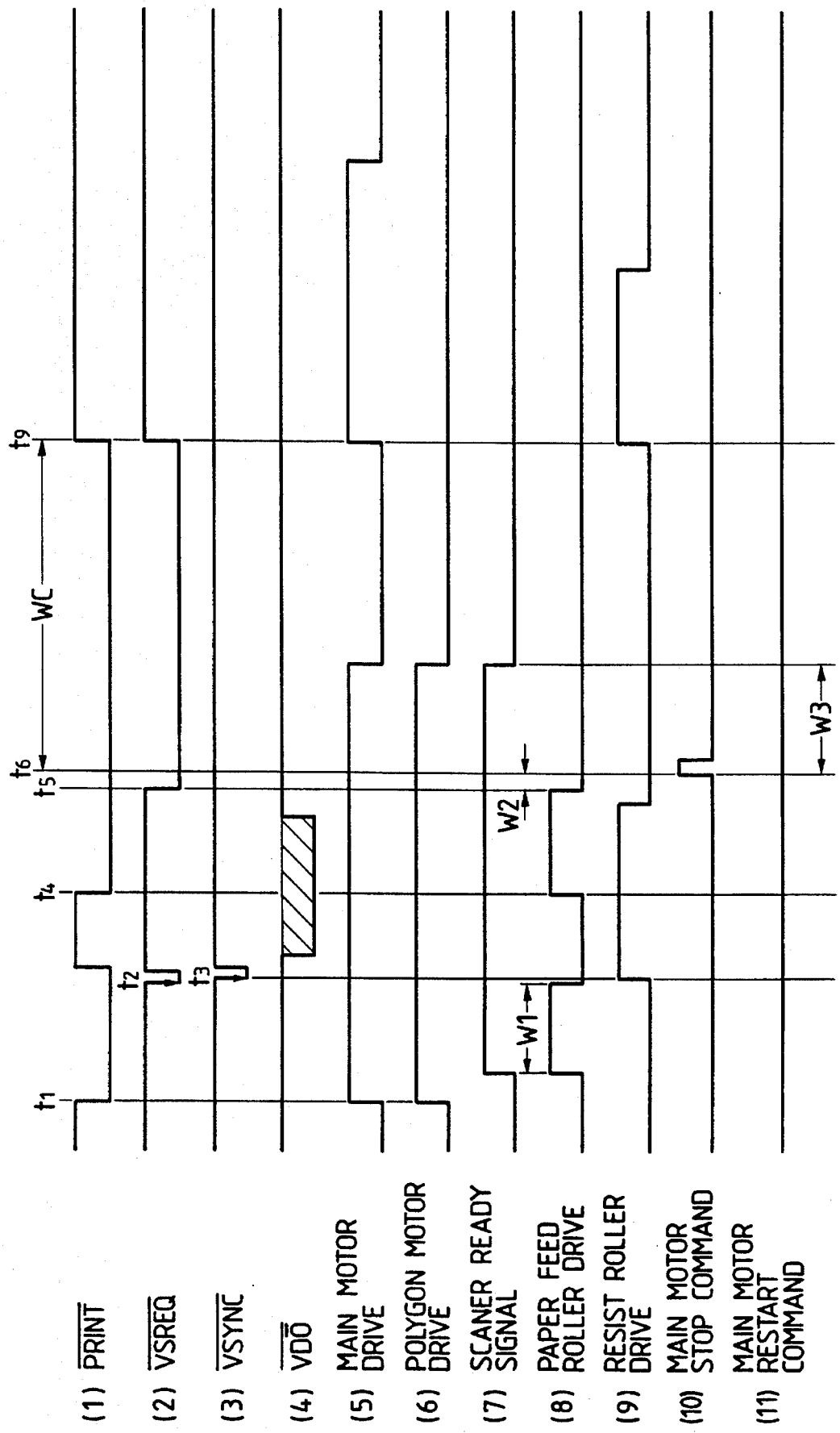

FIGS. 38 and 39 are flow charts respectively showing the functions of the video controller 228 and the printer control unit 226 of the 10th embodiment, and FIGS. 40 and 41 are corresponding timing charts.

In a step S1 in FIG. 38, the video controller 228 shifts the $\overline{PRINT}$ signal to the true state at a time $t_1$, in response to a print command from an external apparatus 230 and the $\overline{RDY}$ signal from the printer control unit 228 ((1) in FIG. 40). In response, the printer control unit 226 proceeds from a step P1 in FIG. 39 to P2 for activating the main motor 45 and the laser scan motor 47 ((5) and (6) in FIG. 40), thereby rotating the photosensitive drum 2, fixing roller in the fixing unit 15 and discharge rollers 16, and also starting the high voltages in succession for the primary charger 5, developing unit 6 and transfer charger 34 (hereinafter called high-voltage sequence). When the laser scan motor 47 reaches a constant revolution, a scanner ready signal supplied to the printer control unit 226 is shifted to the true state ((7) in FIG. 40), and the paper feed clutch 48 is turned on in synchronization to drive the sheet feed roller 12 (step P3 in FIG. 39; (8) in FIG. 40) thereby feeding the recording sheet 13 toward the registration rollers 11. Upon arrival of the leading end of the sheet 13 at the registration rollers 11 after a time w1 from the start of the sheet feed roller 12, the printer control unit 226 stops the sheet feed roller 12 (step P4 in FIG. 39), and shifts the $\overline{VSREQ}$ signal to the true state at a time t2 (step P5 in FIG. 39; (2) in FIG. 40).

After confirming the true state of the $\overline{VSREQ}$ signal (step S2 in FIG. 38), the video controller 228 proceeds to a step S3 for discriminating whether the aforementioned image evolution has been completed. If completed, the $\overline{VSYNC}$ signal is shifted to true at t3 as shown in (3) in FIG. 40 (step S4 in FIG. 38), and the release of the $\overline{VDO}$ signal is started after a predetermined time from t3 (step S5 in FIG. 38).

Upon confirming the true state of the $\overline{VSYNC}$ signal at t3 (step P7 in FIG. 39; (9) in FIG. 40), the printer control unit 226 activates the registration rollers 11 (step P7 in FIG. 39; (9) in FIG. 40), and irradiates the photosensitive drum 2 with the modulated laser beam in a step P8. The registration rollers continue to rotate until the rear end of the sheet 13 passes through these rollers 11. The print of the 1st page is conducted in this manner.

In the present 10th embodiment, the printing operation for the next page is started in the course of release of the VDO signal, in order to improve the maximum throughput. More specifically, at a time t4 in the course of release of the VDO signal, the video controller 228 again starts the sequence from the step S1, thereby shifting the $\overline{PRINT}$ signal to the true state.

The printer control unit 226 executes the above-explained steps P1 to P5, and shifts the $\overline{VSREQ}$ signal to true at t5.

After the confirmation of the true state of the $\overline{VSREQ}$ signal, if the image evolution is not complete yet so that the $\overline{VDO}$ signal cannot be released subsequent to the $\overline{VSYNC}$ signal, the video controller 228 proceeds from the step S3 to S6 to release a main motor stop command ((10) in FIG. 40) at a time t6.

The period w2 from t5 to t6 may be measured by a counter incorporated in the video controller 228 or realized on the software, or by a delay circuit. Also the main motor stop command may be immediately released after the reception of the $\overline{VSREQ}$ signal, if the video controller 228 identifies that the image evolution is impossible or requires a long time. In this manner the unnecessary rotation of the photosensitive drum 2 can be minimized.

Upon receiving the main motor stop command, the printer control unit 226 drives the high voltage output circuit 51, laser scan motor 47 and main motor 45 for a period w3 as post-treatment for removing uneven position on the photosensitive drum 2, and then deactivates these components.

On the other hand, simultaneous with the release of the main motor stop command, the video controller 228 activates a timer (step S7). If the aforementioned period w2 is measured with a timer, the function thereof may be continued or started anew.

Then a step S8 compares the time was measured by the above-mentioned timer since t6 with a predetermined time wc, and, if wa≦wc, a step S9 discriminates whether the image evolution has been completed to enable the release of the $\overline{\text{VSYNC}}$ signal, and, if not, the sequence returns to the step S8. For example, if the image evolution is completed at wa=w4 (<wc), the video controller 28 proceeds from the steps S8, S9 to a step S10 to release a main motor re-start command at a time t7 ((11) in FIG. 40).

In response to the main motor re-start command, the printer control unit 226 starts the main motor 45, laser scan motor 47 etc.

After a predetermined time from t7, the video controller 228 shifts the $\overline{\text{VSYNC}}$ signal to true (step S11), and starts the release of the $\overline{\text{VDO}}$ signal (step S12), thereby effecting the printing operation. At a time t8, the $\overline{\text{PRINT}}$ signal is shifted to the true state, in order to start the printing operation for the next page.

As explained in the foregoing, if the $\overline{\text{VSYNC}}$ signal cannot be released within the period w2 in which the $\overline{\text{VSREQ}}$ signal is in the true state, the main motor stop command is released to stop the photosensitive drum until the main motor re-start command is released, so that the deterioration of the photosensitive drum 2 resulting from unnecessary rotation thereof can be prevented.

Also if the video controller 228 does not complete the image evolution after the period wc from the time t6, the sequence proceeds from the steps S8, S9 to a step S13 to shift the $\overline{\text{PRINT}}$ signal to the false state at a time t9, as shown in FIG. 41.

Upon confirming the false state of the $\overline{\text{PRINT}}$ signal, the printer control unit 226 shifts the $\overline{\text{VSREQ}}$ signal to the false state, and turns on the main motor 45 and the clutch 49 to drive the registration rollers 11, thereby discharging the recording sheet 13 without printing operation.

Thus, in the present embodiment, image transfer failure and sheet jamming resulting from change in the characteristics of the recording sheet 13 can be prevented, as the already fed sheet is discharged if the image evolution is not completed within a period wc from the release of the main motor stop command.

[Embodiment 11]

Figure 42:
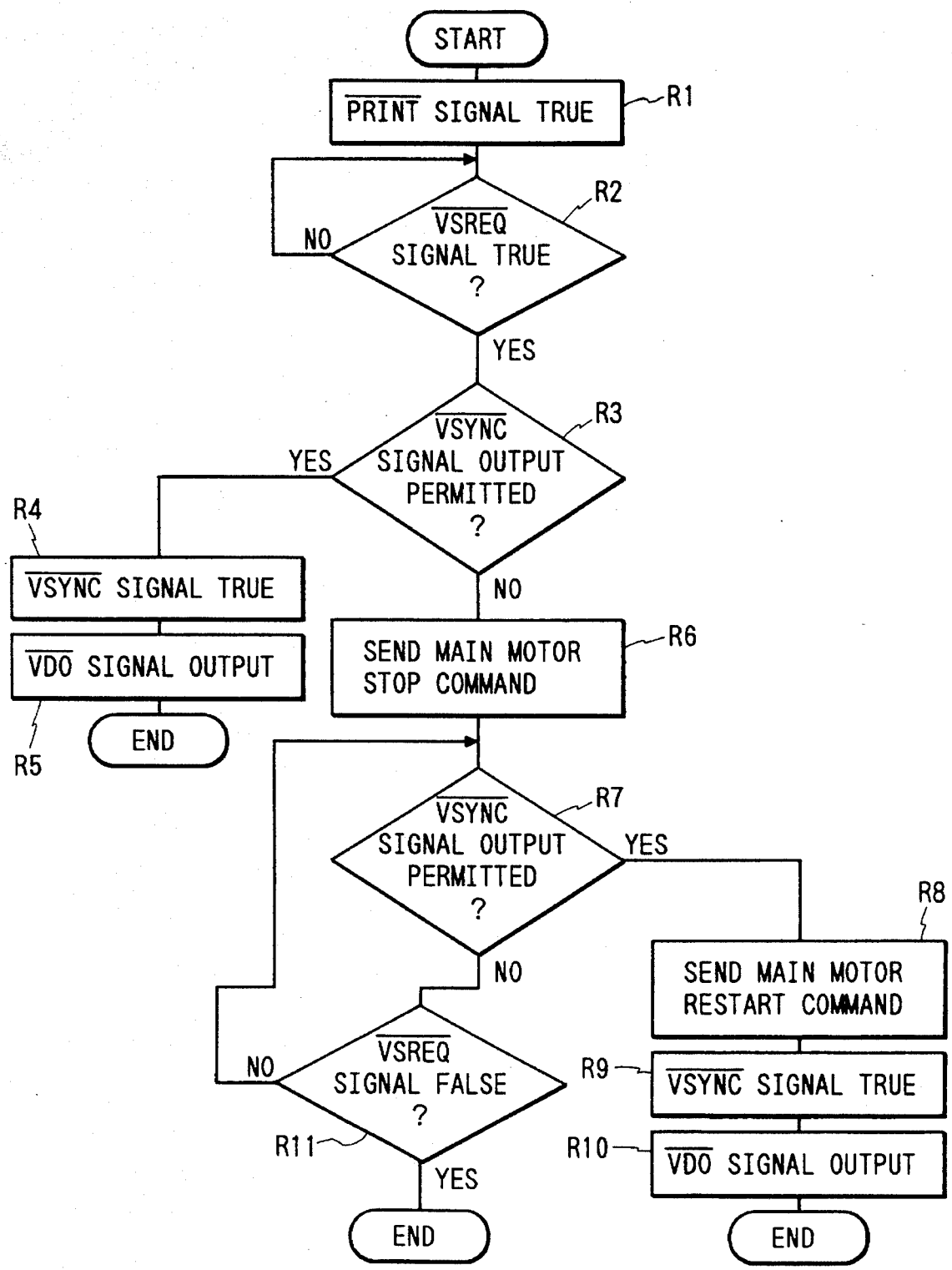
FIGS. 42 and 43 are flow charts showing the function of an eleventh embodiment.
Figure 43:
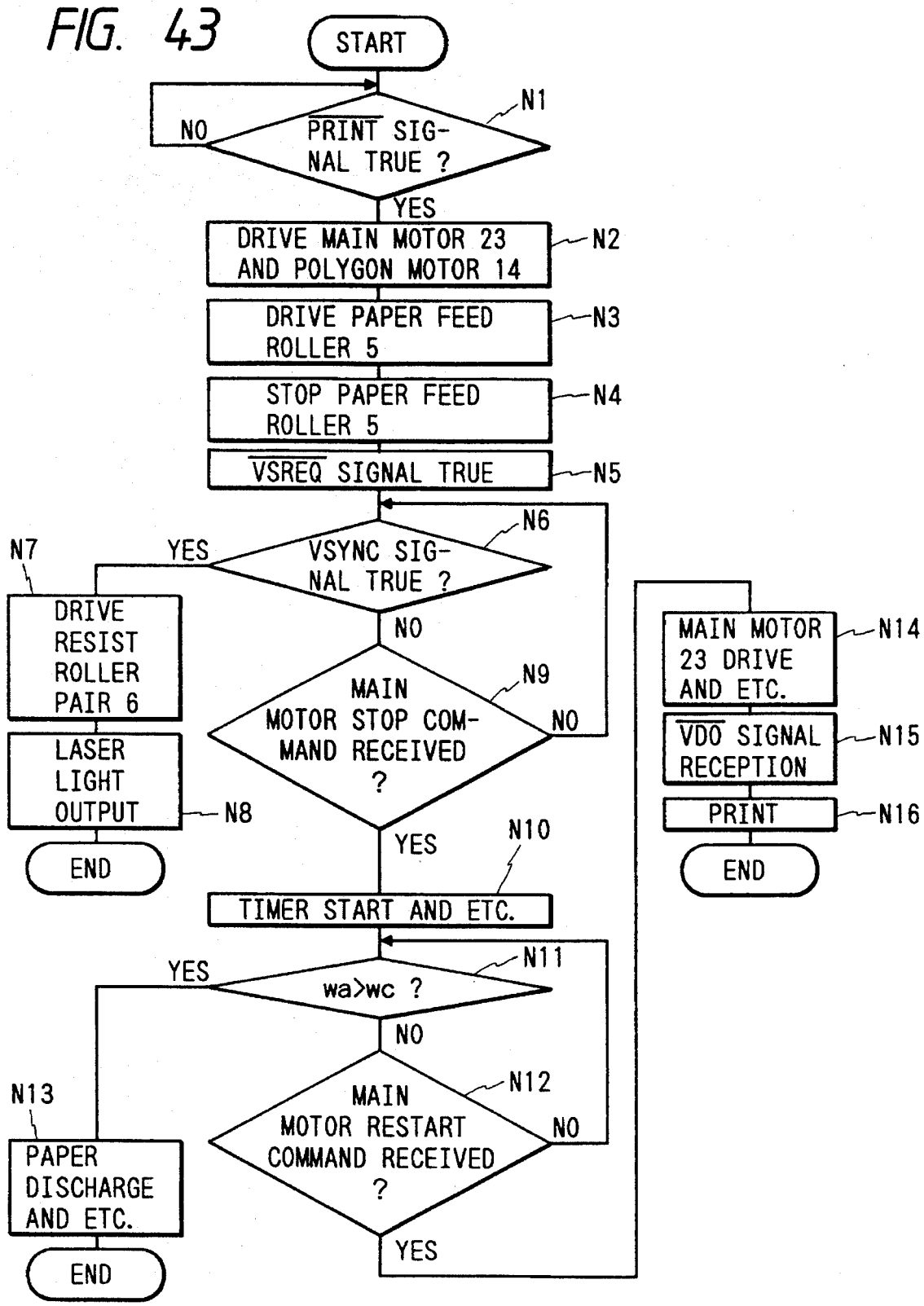

FIGS. 42 and 43 are flow charts of the control sequences respectively of the video controller 28 and the printer control unit 226 of the 11th embodiment. The electric structure of the present 11th embodiment will not be explained as it is same as that of the foregoing 10th embodiment, and, in the following the function of the 11th embodiment will be explained with reference to FIGS. 42 and 43. The 11th embodiment is featured by the presence, in the printer control unit 226, of a timer for measuring the time after the reception of the main motor stop command.

In a step R1 in FIG. 42, the video controller 228 shifts the $\overline{\text{PRINT}}$ signal to the true state in response to a print command from an external apparatus 230 and the $\overline{\text{RDY}}$ signal from the printer control unit 228. In response, the printer control unit 226 proceeds from a step N1 in FIG. 43 to N2 for activating the main motor 45 and the laser scan motor 47, thereby rotating the photosensitive drum 2, fixing roller in the fixing unit 15 and discharge rollers 16, and also effecting the high voltage sequence. When the laser scan motor 47 reaches a constant revolution, a scanner ready signal supplied to the printer control unit 226 is shifted to the true state, and the paper feed clutch 48 is turned on in synchronization to drive the sheet feed roller 12 (step N3 in FIG. 43), thereby feeding the recording sheet 13 toward the registration rollers 11. Upon arrival of the leading end of the sheet 13 at the registration rollers 11 after a time W1 from the start of the sheet feed roller 12, the printer control unit 226 stops the sheet feed roller 12 (step N4 in FIG. 43), and shifts the $\overline{\text{VSREQ}}$ signal to the true state (step N5 in FIG. 43).

After confirming the true state of the $\overline{\text{VSREQ}}$ signal (step R2 in FIG. 42), the video controller 228 proceeds to a step R3 for discriminating whether the aforementioned image evolution has been completed. If completed, the sequence proceeds to a step R4 to shift the $\overline{\text{VSYNC}}$ signal to the true state, and the output of the $\overline{\text{VDO}}$ signal is started after a predetermined time (step R5 in FIG. 42).

Upon confirming the true state of the $\overline{\text{VSYNC}}$ signal (step N6 in FIG. 43), the printer control unit 226 activates the registration rollers 11 (step N7 in FIG. 43), and irradiates the photosensitive drum 2 with the modulated laser beam in a step N8. The registration rollers 11 continue to rotate under the rear end of the sheet 13 passes through these rollers 11. The image recording on the sheet 13 is conducted in this manner.

In the present 11th embodiment, the printing operation for the next page is started in the course of output of the VDO signal, in order to improve the maximum throughput. More specifically, in the course of output of the $\overline{\text{VDO}}$ signal, the video controller 228 again starts the sequence from the step R1, thereby shifting the $\overline{\text{PRINT}}$ signal to the true state.

The printer control unit 226 executes the above-explained steps N1 to N5, and shifts the $\overline{\text{VSREQ}}$ signal to the true state.

After the confirmation of the true state of the $\overline{\text{VSREQ}}$ signal, if the image evolution is not complete yet so that the $\overline{\text{VDO}}$ signal cannot be released subsequent to the $\overline{\text{VSYNC}}$ signal, the video controller 228 proceeds from the step R3 to R6 to release the main motor stop command.

The period from the shift to the true state of the VSREQ signal to the output of the main motor stop command may also be measured for example with a delay circuit. Also the main motor stop command may be released immediately after the reception of the $\overline{\text{VSREQ}}$ signal wherein the video controller 228 identifies that the image evolution is impossible or requires a long time. In this manner the unnecessary rotation of the photosensitive drum 2 can be minimized.

Upon receiving the main motor stop command in a step N9, the printer control unit 226 activates an incorporated timer, then drives the high voltage output circuit 51, laser scan motor 47 and main motor 45 for a predetermined period as the post-process explained before, and then deactivates these components (step N10).

Then a step N11 compares the time wa measured by the above-mentioned timer with a predetermined time wc, and, if wa≦wc, a step N12 discriminates whether the main motor re-start command has been received, and, if not, the sequence returns to the step N11. For example if the image evolution is completed at wa=w4 (<wc), the video controller 228 proceeds from the step R7 to R8 for releasing the main motor re-start command.

In response to the main motor re-start command, the printer control unit 226 starts the main motor 45, laser scan motor 47 etc. (step N14).

After a predetermined time from the output of the main motor re-start command, the video controller 228 shifts the $\overline{\text{VSYNC}}$ signal to true (step R9), and starts the output of the $\overline{\text{VDO}}$ signal (step R10). The printer control unit 226 receives the VDO signal (step N15) and effects the printing operation (step N16).

As explained in the foregoing, if the $\overline{\text{VSYNC}}$ signal cannot be released within the predetermined period after the shift to the true state of the $\overline{\text{VSREQ}}$ signal, the main motor stop command is released to stop the photosensitive drum 2 until the main motor re-start command is released, so that the deterioration of the photosensitive drum 2 resulting from unnecessary rotation thereof can be prevented.

Also if the video controller 228 does not complete the image evolution even when the measured time wa exceeds the time wc in the step N11, the printer control unit 226, not receiving the main motor re-start command, proceeds to a step N13 for shifting the $\overline{\text{VSREQ}}$ signal to false and activating the main motor 45 and the clutch 49, thereby rotating the registration rollers 11 and discharging the sheet without printing operation.

Thus, in the present embodiment, image transfer failure and sheet jamming resulting from changes in the characteristics of the recording sheet 13 can be prevented, as the already fed sheet is discharged if the image evolution is not completed within a period wc from the output of the main motor stop command.

The above-explained embodiment can eliminate abrasion of the photosensitive drum 2 for example with the cleaner blade 9a, thereby allowing to extend the service life of the drum, since the drum is not driven unnecessarily, even when the image evolution requires a long time.

In the course of image evolution, the recording sheet 13 is stopped with the leading end thereof pinched by the registration rollers 11, and the pinched portion of the sheet 13 is wound on one of the registration rollers 11 in order to correct the skewed sheet feeding. Thus, depending on the time required for image evolution and on the ambient conditions such as humidity, the pinched portion of the sheet may develop curling, eventually leading to sheet jamming, or a change in the electric resistance giving rise to defective image transfer. In the foregoing embodiment these drawbacks are avoided by discharging the recording sheet 13 when the image evolution is extended. Recently, with the advent of postscript function, the image evolution may require about one hour in certain cases, and the present invention is particularly advantageously applicable to such image forming apparatus. Besides, in the 11th embodiment, the main motor stop command and the re-start command are transmitted by handshake serial communication, so that increase in the signal lines is not required.

It is also possible to effect the processes of the video controller 228 by an external apparatus 230, and to effect communication between such external apparatus 230 and the printer control unit 226 through the interface 227, 227a or 227b.

Although the foregoing embodiments 6 to 11 have been limited to the application of the present invention to a laser beam printer, the present invention is likewise applicable to an LED printer or a liquid crystal printer. Also in these embodiments, the sheet feed roller 12, registration rollers 11, photosensitive drum 2, fixing roller 15, discharge rollers 16 etc. are driven by the main motor 45 through clutches, but these components may also be driven by separate motor. Also the sheet feeding may be conducted immediately after the discharge of a preceding sheet, or after the output of the $\overline{\text{VSYNC}}$ signal.

The foregoing embodiments have been limited to an electrophotographic printer, but the present invention is also applicable to other page printers such as a thermal transfer printer or an ink jet printer. Also such printers are not limited to those for computer output but also for facsimile, copying machine or other applications.

Furthermore, the present invention is not limited by the foregoing embodiments but is subject to various modifications within the scope and spirit of the appended claims.

What is claimed is:

1. An image forming apparatus comprising:
   an image forming device for forming an image on a recording medium based on pixel information converted from encoded character or graphic information; and
   a feeder for feeding the recording medium to said image forming device, said feeder comprising sheet feed rollers which feed, one by one, plural recording media stacked on a recording medium stacker, and registration rollers provided at the downstream side of said sheet feed rollers,
   wherein said feeder is adapted to feed said recording medium to a predetermined position upstream of said registration rollers prior to a completion of the pixel information conversion of a page, and to cause said recording medium to impinge on said registration rollers and to drive said registration rollers to feed said recording medium to said image forming device after the completion of the pixel information conversion of a page.

2. An image forming apparatus according to claim 1, further comprising
   a data receiver adapted to receive encoded character or graphic information in the unit of a page from the outside;
   a pixel converter which converts said encoded character or graphic information into pixel information,
   wherein said feeder is adapted to feed the recording medium to the predetermined position in response to the reception of encoded character or graphic information of a page by said data receiver.

3. An image forming apparatus according to claim 1, wherein said image forming device comprises a latent image forming device which forms an electrostatic latent image on a photosensitive member based on said pixel information, a developing device which develops said electrostatic latent image into a toner image, and a transfer device which transfers the toner image formed on said photosensitive member onto the recording medium.

4. An image forming apparatus according to claim 3, wherein at least one of said latent image forming device, developing device and transfer device is activated for image formation after the completion of pixel conversion of a page.

5. An image forming apparatus according to claim 3, wherein said transfer device is a pressure transfer device which presses the recording medium to the photosensitive member on which the toner image is formed, thereby transferring the toner image onto the recording medium.

6. An image forming apparatus according to claim 5, wherein said pressure transfer device is a transfer roller or a transfer belt.

7. An image forming apparatus according to claim 3, wherein said latent image forming device comprises a charger which charges the surface of the photosensitive member, and a modulated optical scanner which scans the photosensitive member with modulated light; and
   wherein the distance $l_1$ from the scanning position with said modulated light to the transfer device along the surface of the photosensitive member is larger than the distance $l_2$ from said predetermined position of the recording medium to the transfer device.

8. An image forming apparatus comprising:
   a data receiver which receives encoded character or graphic information in the unit of a page from the outside;

a pixel converter which converts said encoded character or graphic information into pixel information;

a rotated photosensitive member;

a latent image forming device which forms an electrostatic latent image on said photosensitive member based on said pixel information;

a developing device which develops said electrostatic latent image into a toner image;

a transfer device which transfers said toner image, formed on said photosensitive member, onto a recording medium; and a feeder which feeds the recording medium to said transfer device and is adapted to feed the recording medium to a predetermined position prior to the completion of pixel conversion of a page by said pixel converter, wherein at least said transfer device is not activated from the feeding operation to the predetermined position until the completion of a pixel conversion of a page by said pixel converter.

9. An image forming apparatus according to claim 8, wherein said latent image forming device and developing device are activated after the completion of pixel conversion of a page.

10. An image forming apparatus according to claim 8, wherein said feeder and said photosensitive member are driven by a single power source.

11. An image forming apparatus according to claim 8, further comprising raster converter which converts the pixel information, converted by said pixel converter, into raster data, said raster converter being activated after pixel information of a page is obtained.

12. An image forming apparatus according to claim 8, wherein said transfer device is a pressure transfer device which presses the recording medium to the photosensitive member on which the toner image is formed, thereby transferring the toner image onto said recording medium.

13. An image forming apparatus according to claim 12, wherein said pressure transfer device is a transfer roller or a transfer belt.

14. An image forming apparatus according to claim 8, wherein said feeder comprises a sheet feeder which feed, one by one, plural recording media stacked on a recording medium stacker, and registration rollers provided at the downstream side of said sheet feeder.

15. An image forming apparatus according to claim 14, wherein said feeder is adapted to feed said recording medium by said sheet feeder to a position impinging on said registration rollers prior to the completion of the pixel conversion of a page by said pixel converter, and to drive said registration rollers to feed said recording medium to said image forming device after the completion of said pixel conversion of a page.

16. An image forming apparatus according to claim 14, wherein said feeder is adapted to feed said recording medium to a position upstream of said registration rollers prior to the completion of pixel conversion of a page by said pixel converter, and to cause said recording medium to impinge on said registration rollers and to drive said registration rollers to feed said recording medium to said image forming device after the completion of said pixel conversion of a page.

17. An image forming apparatus according to claim 14, wherein said feeder is adapted to feed said recording medium by said sheet feeder and said registration rollers to a position pinched by said registration rollers prior to the completion of pixel conversion of a page by said pixel converter, and to drive said registration rollers to feed said recording medium to said image forming device after the completion of said pixel conversion of a page.

18. An image forming apparatus comprising:

a data receiver which receives encoded character or graphic information in the unit of a page from the outside;

a pixel converter which converts said encoded character or graphic information into pixel information;

a rotated photosensitive member;

a latent image forming device which forms an electrostatic latent image on said photosensitive member based on said pixel information;

a developing device which develops said electrostatic latent image into a toner image;

a transfer device which transfers said toner image, formed on said photosensitive member, onto a recording medium; and a feeder which feeds the recording medium to said transfer device and is adapted to feed the recording medium to a predetermined position prior to the completion of pixel conversion of a page by said pixel converter;

wherein said photosensitive member is stopped if said pixel conversion of a page is not completed within a predetermined first time from said feeding of the recording medium to the predetermined position, and the image formation on said recording medium already fed by said feeder is prohibited if the stopped state of said photosensitive member continues for a predetermined second time.

19. An image forming apparatus comprising:

a first controller including:

a data receiver which receives encoded character or graphic information in the unit of a page from the outside; and a pixel converter which converts said encoded character or graphic information into pixel information;

a rotated photosensitive member;

a latent image forming device which forms an electrostatic latent image on said photosensitive member based on said pixel information;

a developing device which develops said electrostatic latent image into a toner image;

a transfer device which transfers said toner image, formed on said photosensitive member, onto a recording medium;

a feeder which feeds the recording medium to said transfer device; and a second controller which controls said photosensitive member, latent image forming device, developing device, transfer device and feeder;

wherein said second controller is adapted to feed the recording medium to a predetermined position prior to the completion of the pixel conversion of a page by said pixel converter, then stops said photosensitive member if said pixel conversion of a page is not completed within a predetermined first time thereafter, and discharges the recording medium, already fed by said feeder, without image formation if the stopped state of said photosensitive member continues in excess of a predetermined second time.

20. An image forming apparatus according to claim 19, wherein said first controller is adapted to release a sheet discharge command signal for instructing the discharge of the recording medium already fed.

21. An image forming apparatus according to claim 19, wherein said second controller comprises a timer for measuring said first and second predetermined times, and is adapted to re-start the drive of said photosensitive member if said pixel conversion of a page is completed before the lapse of said second predetermined time, or to discharge the already fed recording medium if said pixel conversion of a page is not completed.

22. An image forming apparatus comprising:
 a data receiver which receives encoded character or graphic information from the outside;
 a pixel converter which converts said encoded character or graphic information into pixel information;
 an image forming device which forms an image on a recording medium based on said pixel information;
 a feeder which feeds the recording medium to said image forming device and is adapted to feed the recording medium to a predetermined position, prior to the completion of the pixel conversion of a page by said pixel converter; and
 a discharge device which discharges the recording medium subjected to image formation by said image forming device, said discharge means being adapted to discharge said recording medium without image formation if said pixel conversion of a page is not completed within a predetermined time from said feeding of the recording medium to the predetermined position.

23. An image forming apparatus according to claim 22, wherein said image forming device comprises a latent image forming device which forms an electrostatic latent image on a photosensitive member based on said pixel information, a developing device which develops said electrostatic latent image into a toner image, and a transfer device which transfers the toner image formed on said photosensitive member onto the recording medium.

24. An image forming apparatus comprising:
 an image forming device for forming an image on a recording medium based on pixel information converted from encoded character or graphic information; and
 a feeder for feeding the recording medium to said image forming device,
 wherein said feeder is adapted to feed said recording medium to a predetermined position prior to a completion of the pixel information conversion of a page, and to feed said recording medium to said image forming device after the completion of the pixel information conversion of a page, and
 wherein the image formation on said recording medium is prohibited when said pixel information conversion of a page is not completed within a predetermined time from said feeding of the recording medium to the predetermined position.

25. An image forming apparatus according to claim 24, further comprising:
 a sheet discharger for discharging the recording medium subjected to image formation by said image forming device,
 wherein said sheet discharger is adapted to discharge said recording medium without image formation when said pixel information conversion of a page is not completed within a predetermined time from said feeding of the recording medium to the predetermined position.

26. An image forming apparatus according to claim 24, further comprising:
 a data receiver adapted to receive encoded character or graphic information in the unit of a page from the outside; and
 a pixel converter which converts said encoded character or graphic information into pixel information,
 wherein said feeder is adapted to feed the recording medium to the predetermined position in response to the reception of encoded character or graphic information of a page by said data receiver.

27. An image forming apparatus according to claim 24, wherein said image forming device comprises a latent image forming device which forms an electrostatic latent image on a photosensitive member based on said pixel information, a developing device which develops said electrostatic latent image into a toner image, and a transfer device which transfers the toner image formed on said photosensitive member onto the recording medium.

28. An image forming apparatus according to claim 27, wherein at least one of said latent image forming device, developing device and transfer device is activated for the image forming after the completion of pixel conversion of a page.

29. An image forming apparatus according to claim 27, wherein said transfer device is a pressure transfer device which presses the recording medium to the photosensitive member on which the toner image is formed, thereby transferring the toner image onto the recording medium.

30. An image forming apparatus according to claim 29, wherein said pressure transfer device is a transfer roller or a transfer belt.

31. An image processing apparatus for sending pixel information to a printing unit adapted to feed a recording medium to a predetermined position in response to a sheet feed command signal from the image processing apparatus, comprising:
 a data receiver which receives encoded character or graphic information in the unit of a page from the outside;
 a pixel converter which converts said encoded character or graphic information into pixel information; and
 a data sender which is adapted to send the pixel information to the printing unit,
 wherein said image processing apparatus transmits the sheet feed command signal prior to the completion of the pixel conversion of a page by said pixel converter, and
 wherein said apparatus transmits the sheet feed command signal to said printing unit through an exclusive line.

32. An image processing apparatus according to claim 31, wherein the printing unit comprises a photosensitive member, and
 wherein said image processing apparatus includes means for outputting to the printing unit a control signal for stopping the drive of said photosensitive member unit until the completion of pixel conversion of a page by said pixel converter.

33. An image processing apparatus according to claim 32, wherein said image processing apparatus transmits the photosensitive member control signal to the printing unit through an exclusive line.

34. An image processing apparatus according to claim 32, wherein said image processing apparatus is adapted to supply the printing unit with a start command signal for instructing the start of an image forming operation and a vertical synchronization signal.

35. An image processing apparatus according to claim 34, wherein said image processing apparatus is adapted to receive from the printing unit a vertical synchronization request signal for requesting said vertical synchronization signal; and said apparatus is further adapted, after the reception of the vertical synchronization request signal, to send the photosensitive member control signal on a same line as that for said start command signal.

36. An image processing apparatus according to claim 34, wherein said image processing apparatus is adapted, prior to the output of the start command signal, to send said sheet feed command signal on a same line as that for the vertical synchronization signal.

37. An image processing apparatus according to claim 31, further comprising the printing unit.

38. An image processing apparatus according to claim 37, wherein said printing unit comprises:

a rotatable photosensitive member;

a latent image forming device which forms an electrostatic latent image on said photosensitive member based on said pixel information;

a developing device which develops said electrostatic latent image into a toner image;

a transfer device which transfers said toner image formed on said photosensitive member onto a recording medium;

a feeder which feeds the recording medium to said transfer device; and a controller which controls said photosensitive member, latent image forming device, developing device, transfer device and feeder.

39. An image forming apparatus comprising;

an image forming device for forming an image on a recording medium based on pixel information converted from encoded character or graphic information; and a feeder for feeding the recording medium to said image forming device, wherein said feeder feeds said recording medium to predetermined position prior to a completion of the pixel information conversion of a page when a sheet feed command signal sent from a pixel information source is received, and wherein the sheet feed command signal is received through an exclusive line.

40. An image forming apparatus according to claim 39, wherein said image forming device comprises:

a rotatable photosensitive member;

a latent image forming device which forms an electrostatic latent image on said photosensitive member based on said pixel information;

a developing device which develops said electrostatic latent image into a toner image;

a transfer device which transfer said toner image formed on said photosensitive member onto a recording medium, wherein said feeder feeds the recording medium to said transfer device; and a controller which controls said photosensitive member, latent image forming device, developing device, transfer device and feeder.

41. A printing apparatus comprising:

means for inputting code information from an external apparatus;

means for converting the input code information into pixel information;

means for forming an image onto a sheet in accordance with the pixel information;

means for feeding a sheet to said image forming means; and means for discriminating whether a next page of the code information is inputted, wherein said inputting means has provision for inputting at least the next page of code information during processing of a current page and said feeding means has provision for starting feeding of the next sheet during printing of the current page when said discriminating means discriminates that input of the code information of the next page has been completed.

42. An image forming apparatus according to claim 41, wherein said image forming means comprises latent image forming means for forming a latent image on a photosensitive member by scanning a light modulated based on pixel information, developing means for developing said latent image into a toner image, and transferring means for transferring the toner image on said photosensitive member onto the sheet, and wherein said feeding means starts to feed the next page during formation of the latent image of the current page when said discriminating means discriminates that the input of the code information of the next page has been completed.

43. An image forming apparatus according to claim 42, wherein said feeding means stops feeding the sheet at a predetermined position, and resumes conveying the sheet to said image forming means after converting the input code information into pixel information by said converting means is completed, and wherein drive of said photosensitive member is stopped before the converting to the pixel information is completed even if a predetermined time has elapsed after the sheet is stopped at the predetermined position.

44. An image forming apparatus according to claim 43, further comprising means for indicating the drive of the stopped photosensitive member.

45. An image forming apparatus according to claim 42, further comprising sheet discharging means for discharging the sheet subjected to image formation by said image forming means, wherein said sheet discharging means is adapted to discharge said sheet without image formation when said conversion of the next page is not completed within a predetermined time from a start of said feeding of the sheet from the predetermined position.

46. An image forming apparatus according to claim 42, wherein said transferring means is one of a transfer roller and a transfer belt.

47. An image forming apparatus according to claim 42, wherein a distance $l_1$ from the scanning position with said modulated light to the transfer position along the surface of the photosensitive member is larger than a distance $l_2$ from said predetermined position of the recording medium to the transferring means.

48. An image forming apparatus according to claim 42, wherein at least one of said latent image forming means, developing means and transferring means is activated for the image forming after the completion of pixel conversion of a page.

49. An image forming apparatus according to claim 41, wherein said feeding means stops feeding the sheet at a predetermined position, and resumes conveying the sheet to said image forming means after converting the input information into pixel information by said converting means is completed.

50. An image forming apparatus according to claim 49, wherein said image forming means forms an image on the sheet by electrophotographic recording, and said apparatus is capable of starting the feeding of the next sheet even during the formation of the latent image of the current page when said discriminating means discriminates that the input of the code information has been completed.

* * * * *

UNITED STATES PATENT AND TRADEMARK OFFICE
CERTIFICATE OF CORRECTION

PATENT NO. : 5,455,603            Page 1 of 3
DATED : October 3, 1995
INVENTOR(S) : KENJIRO HORI, ET AL.

It is certified that error appears in the above-indentified patent and that said Letters Patent is hereby corrected as shown below:

Figure 5A,
    "ROUTIN" should read --ROUTINE--.
Figure 7,
    "LASAER" should read --LASER--.
Figure 8,
    "RECEPSION" should read --RECEPTION--.
Figure 13,
    "SCANER" should read --SCANNER--.
Figure 19,
    "ENTERNAL" should read --EXTERNAL--.
Figure 30,
    "PEADY" should read --READY--.
Figure 31,
    "SCANER" should read --SCANNER--, and "TRUEE" should read --TRUE--.
Figure 35,
    "SCANER" (both occurrences) should read --SCANNER--.
Figure 38,
    "(VSYNC" should read --$\overline{VSYNC}$--, and "PERMITED" (both occurrences) should read --PERMITTED--.

UNITED STATES PATENT AND TRADEMARK OFFICE
CERTIFICATE OF CORRECTION

PATENT NO. : 5,455,603
DATED : October 3, 1995
INVENTOR(S) : KENJIRO HORI, ET AL.

It is certified that error appears in the above-indentified patent and that said Letters Patent is hereby corrected as shown below:

<u>Column 3,</u>
　　line 17, "these" should read --there--.
<u>Column 5,</u>
　　line 48, "evolution,)" should read --evolution)--.
<u>Column 6,</u>
　　line 63, "the-code" should read --the code--.
<u>Column 11,</u>
　　line 56, "is" should be deleted.
<u>Column 17,</u>
　　line 43, "tile" should read --the--.
<u>Column 21,</u>
　　line 62, "embodiments" should read --embodiment--.
<u>Column 22,</u>
　　line 4, "step Si" should read --step S1--.
<u>Column 23,</u>
　　line 61, "RDY" should read --$\overline{RDY}$--.
<u>Column 24,</u>
　　line 30, "VDO" should read --$\overline{VDO}$--; and
　　line 32, "VDO" should read --$\overline{VDO}$--.

UNITED STATES PATENT AND TRADEMARK OFFICE
CERTIFICATE OF CORRECTION

PATENT NO. : 5,455,603
DATED : October 3, 1995
INVENTOR(S) : KENJIRO HORI, ET AL.

It is certified that error appears in the above-indentified patent and that said Letters Patent is hereby corrected as shown below:

<u>Column 25,</u>
    line 42, "controller 28" should read --controller 228--.
<u>Column 26,</u>
    line 21, "VDO" should read --$\overline{VDO}$--;
    line 34, "VSREQ" should read --$\overline{VSREQ}$--; and
    line 38, "wherein" should read --whenever--.
<u>Column 28,</u>
    line 28, "outside;" should read --outside; and--.
<u>Column 29,</u>
    line 32, "comprising" should read --comprising a--; and
    line 45, "feed," should read --feeds,--.

Signed and Sealed this

Thirteenth Day of February, 1996

Attest:

BRUCE LEHMAN

*Attesting Officer*     *Commissioner of Patents and Trademarks*